Inventor
C. F. Richard
By
Cameron, Kerkam & Sutton.
Attorneys

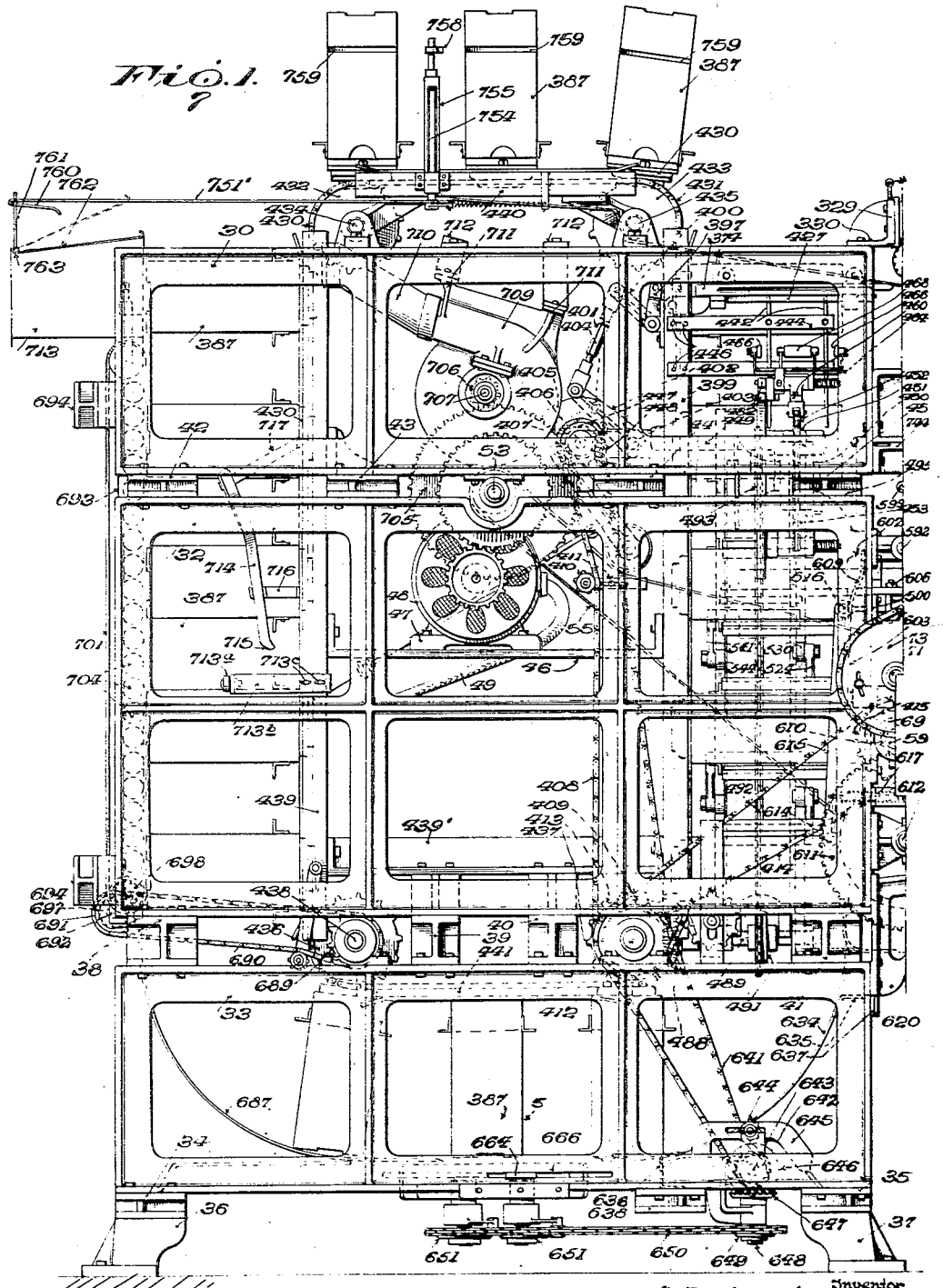

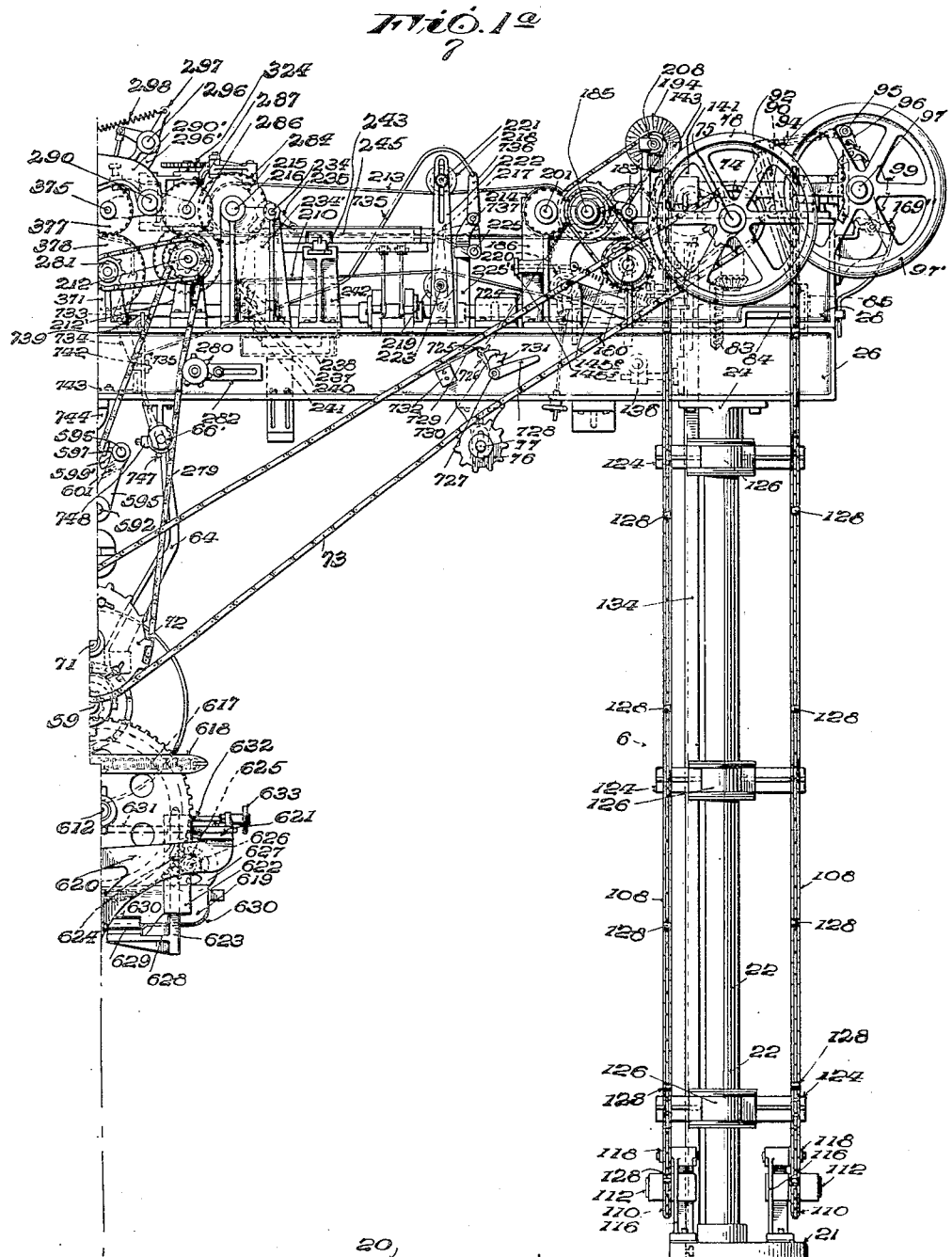

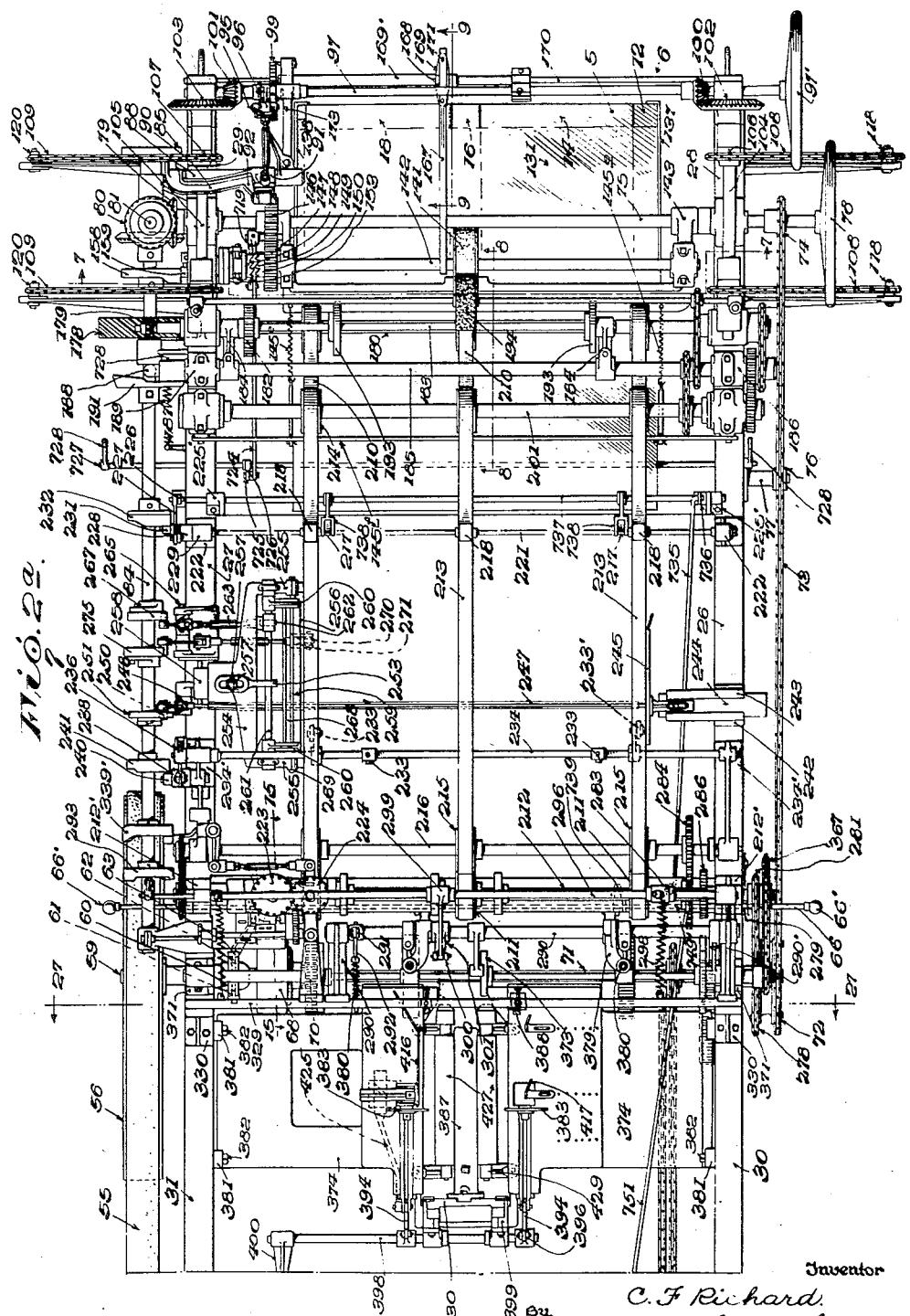

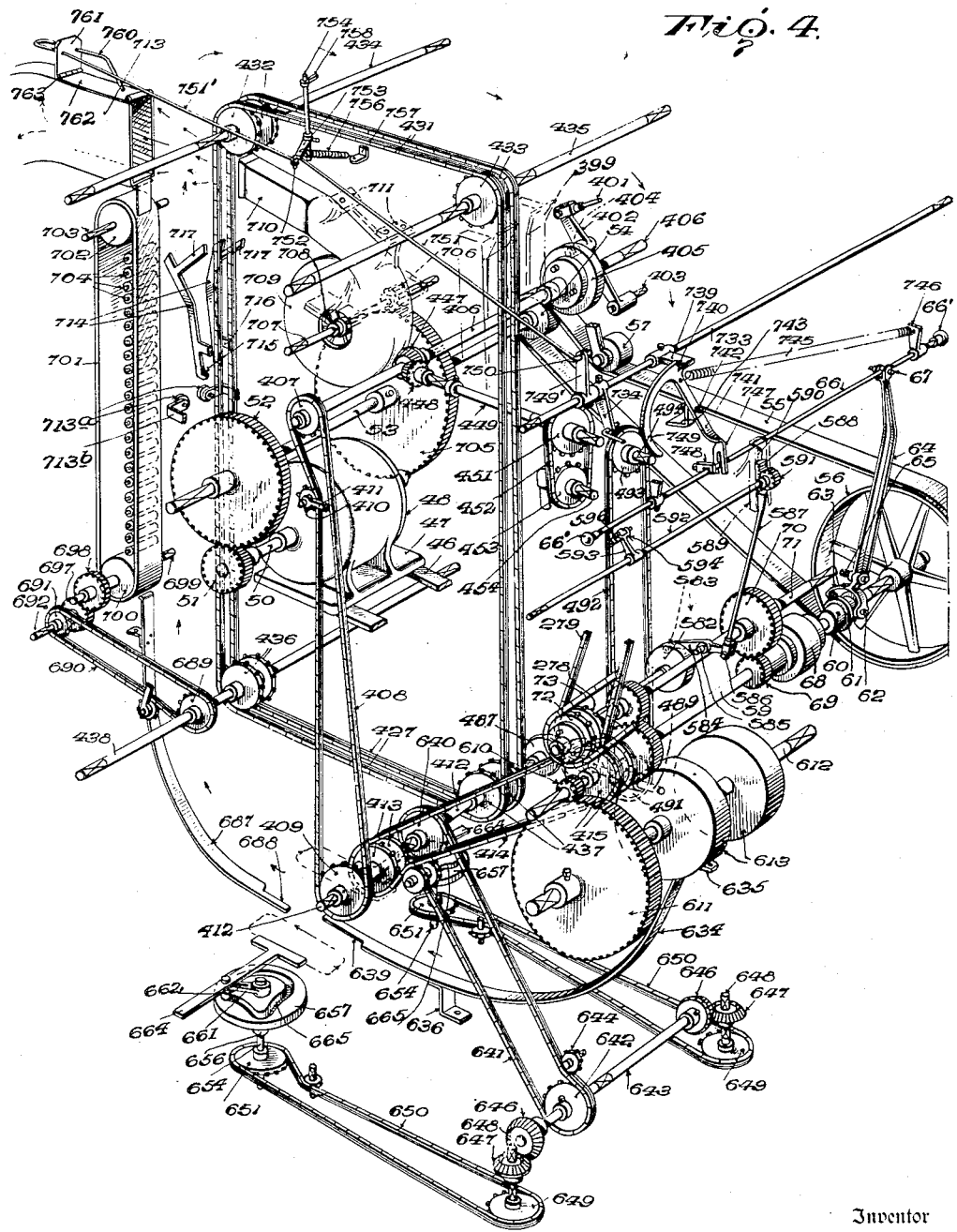

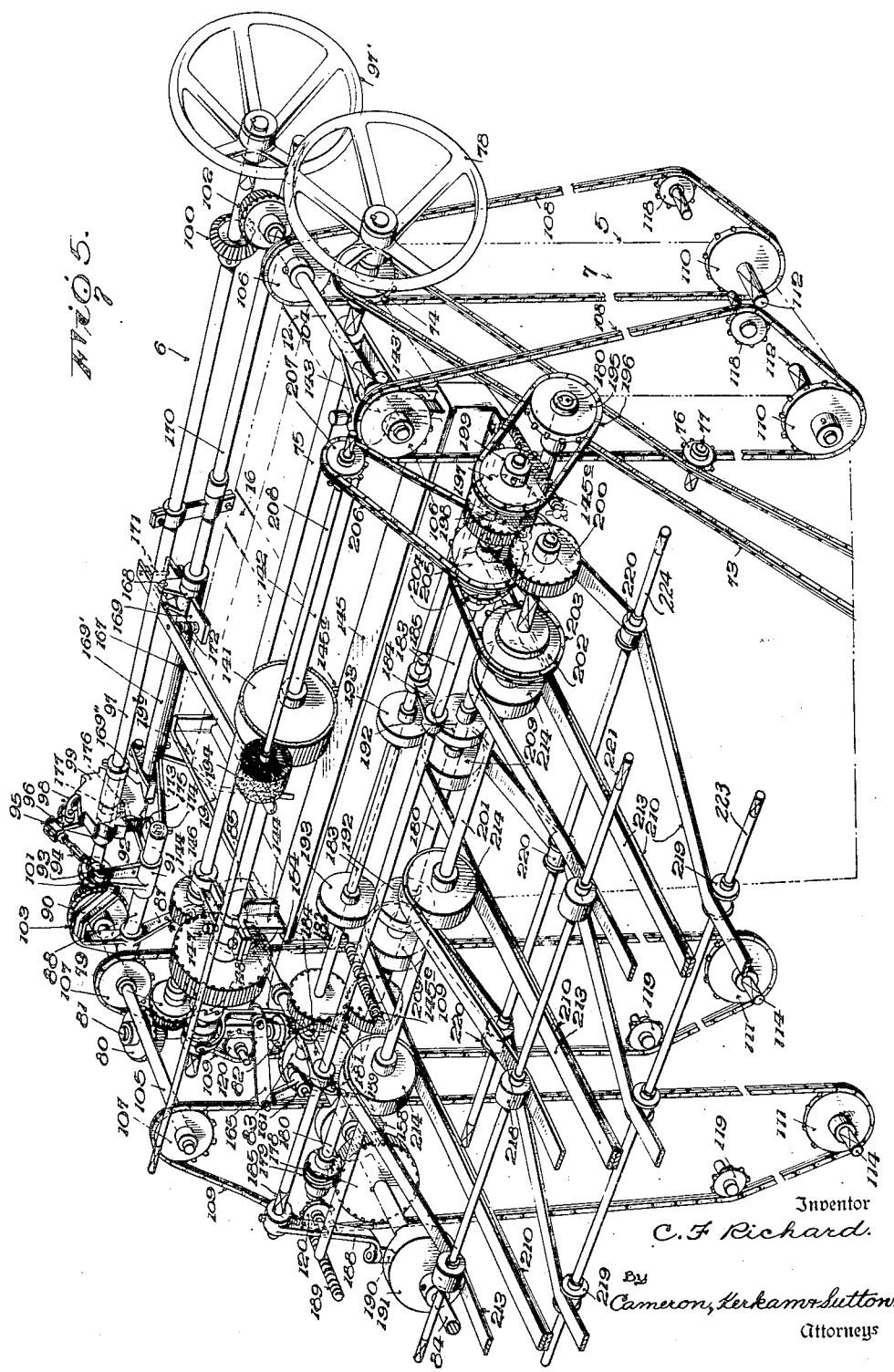

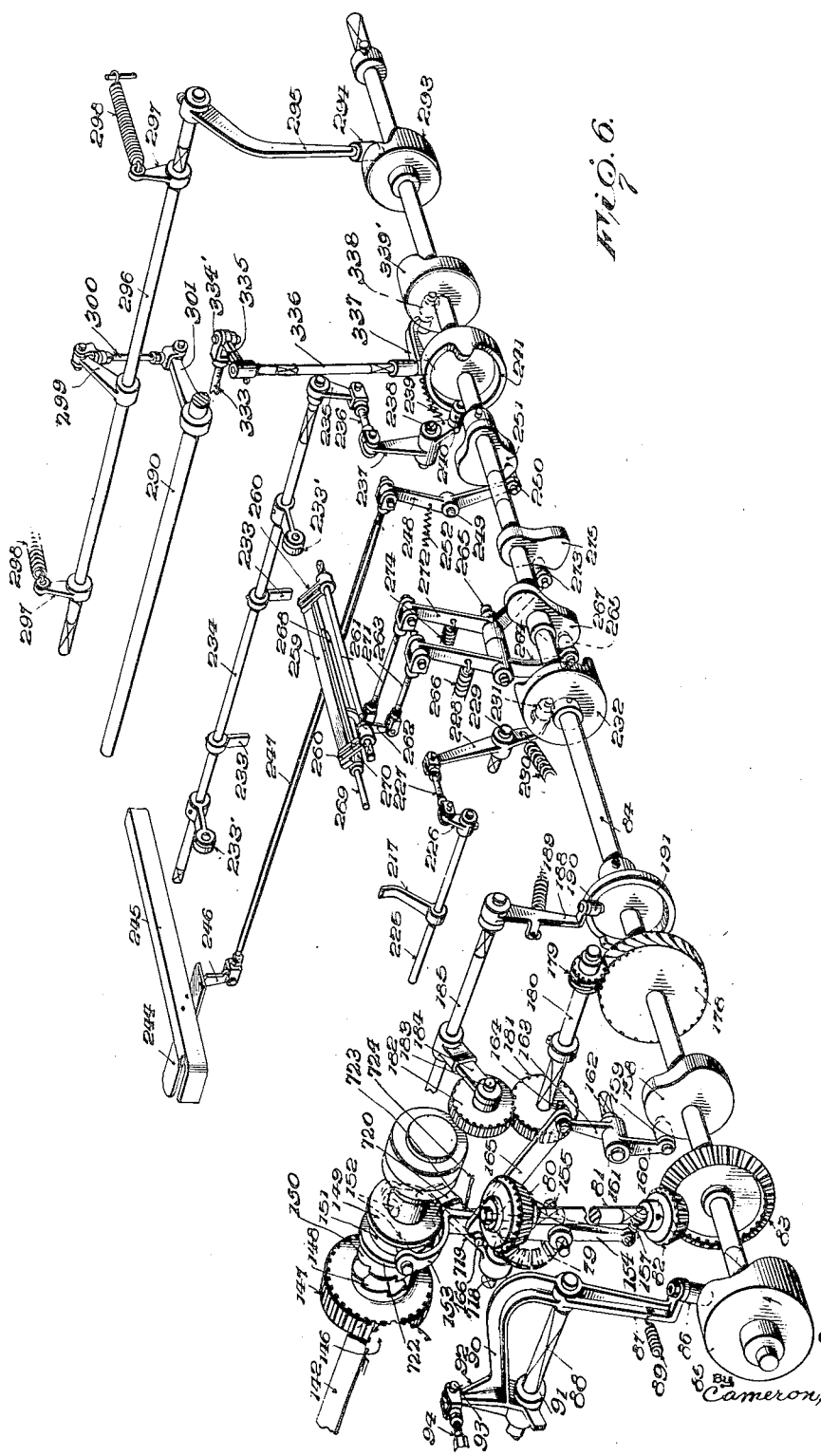

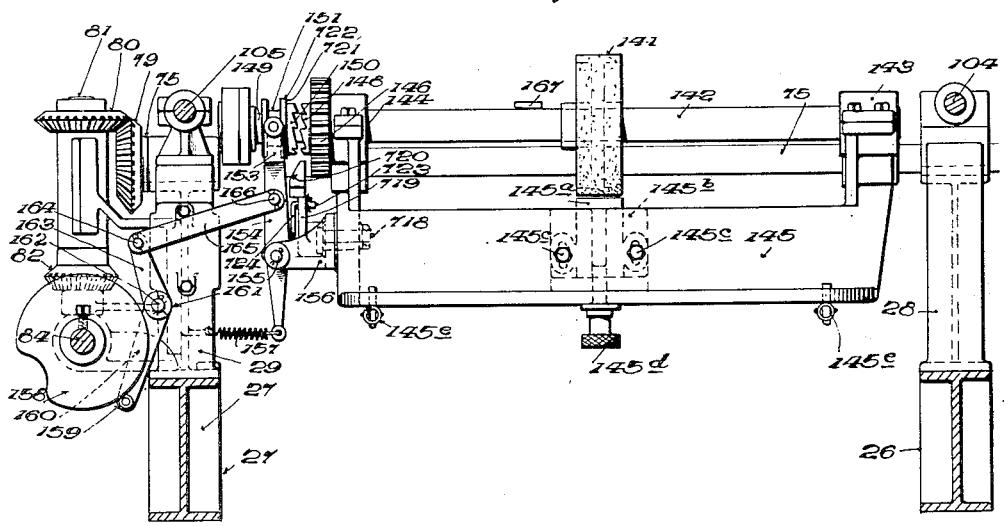
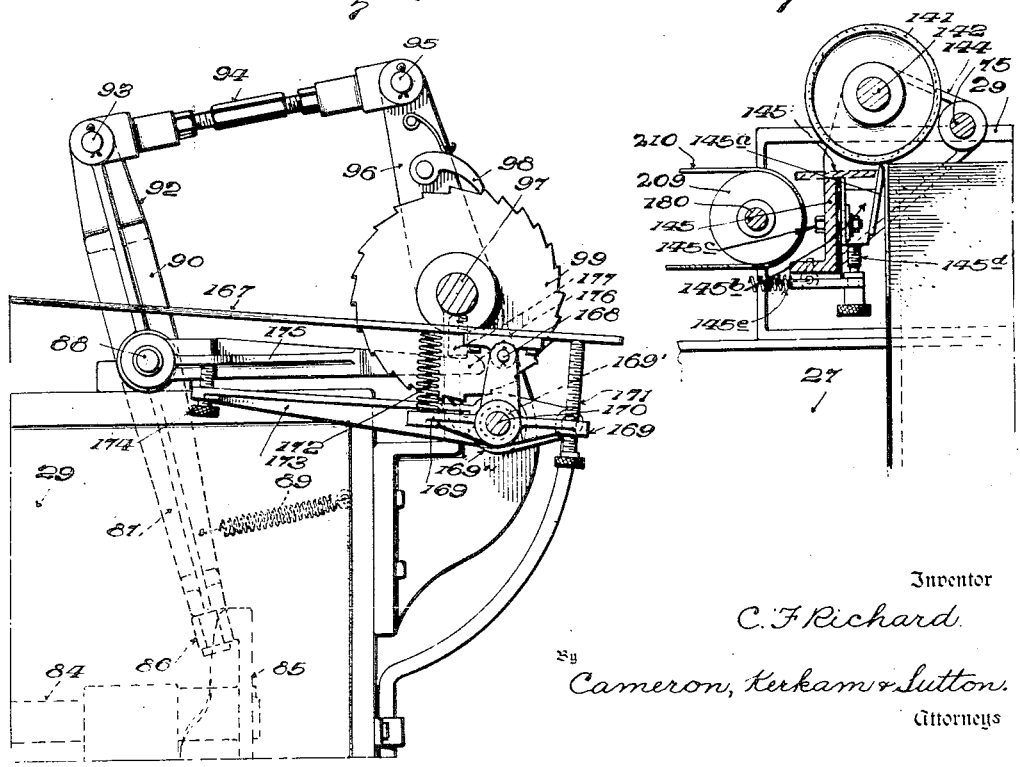

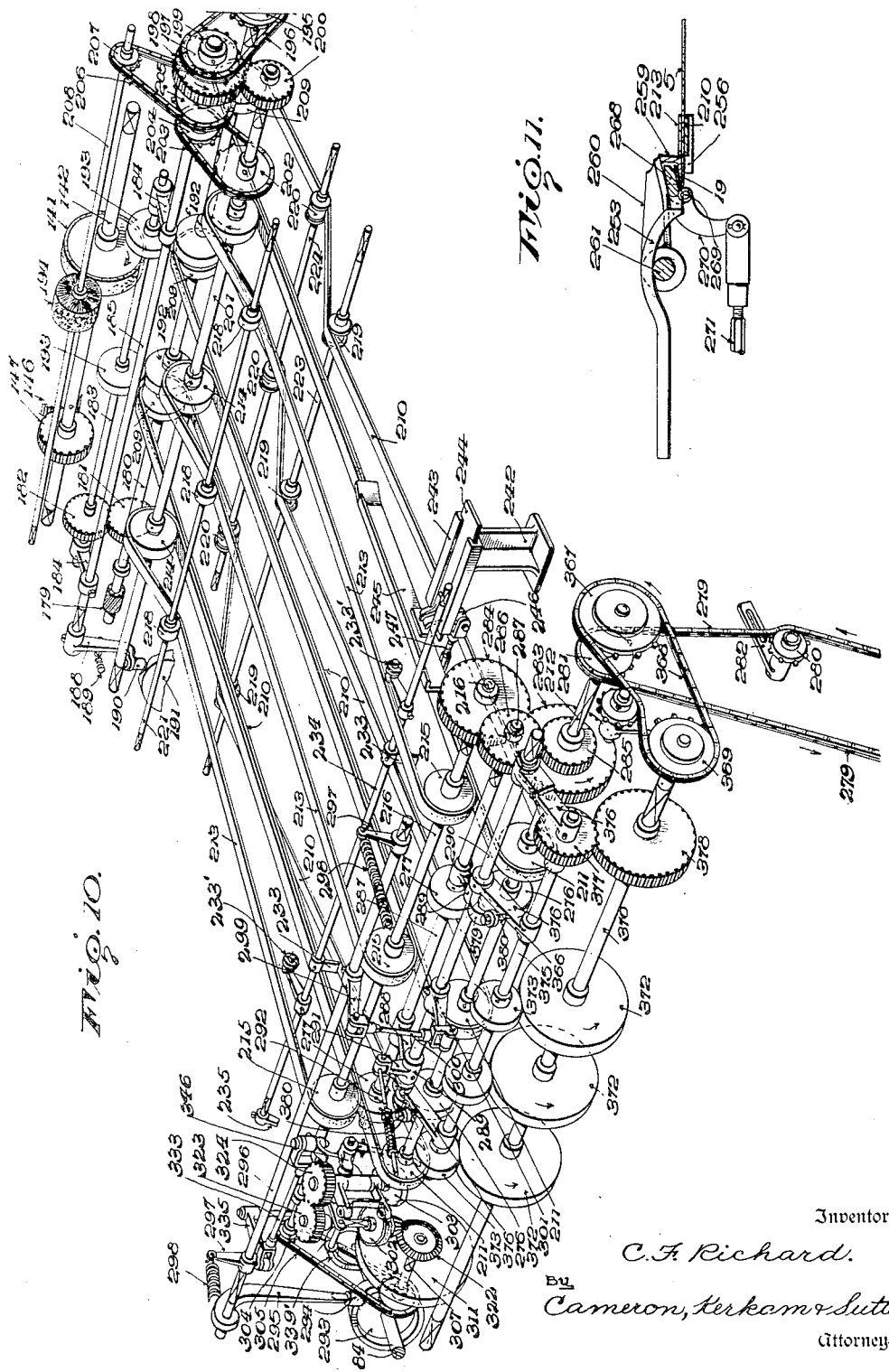

May 8, 1934.　　　　C. F. RICHARD　　　　1,957,613
CARTON MAKING MACHINE
Filed Jan. 3, 1930　　　23 Sheets-Sheet 11
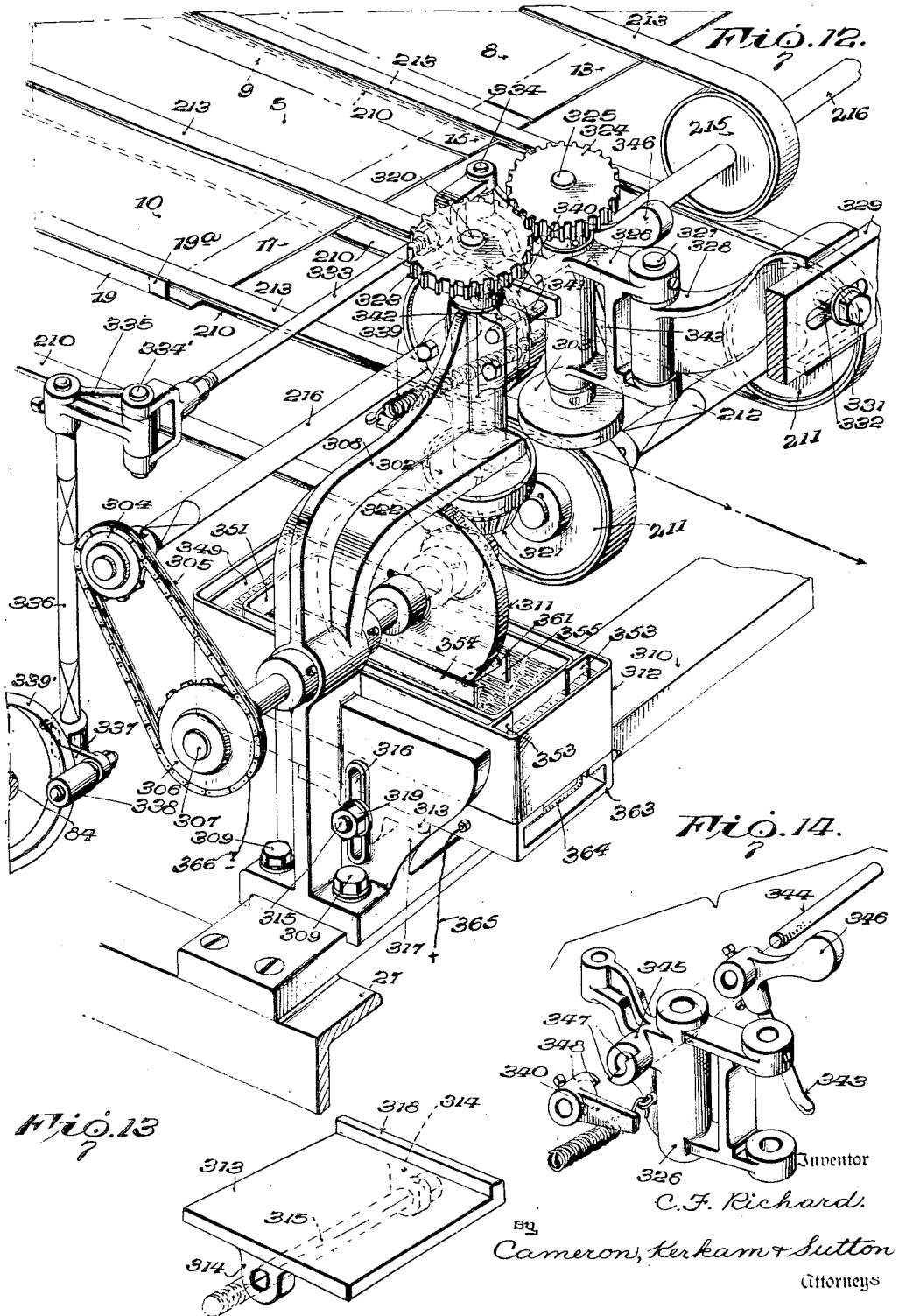

May 8, 1934.  C. F. RICHARD  1,957,613
CARTON MAKING MACHINE
Filed Jan. 3, 1930   23 Sheets-Sheet 12

Inventor
C. F. Richard.
By Cameron, Kerkam & Sutton
Attorneys

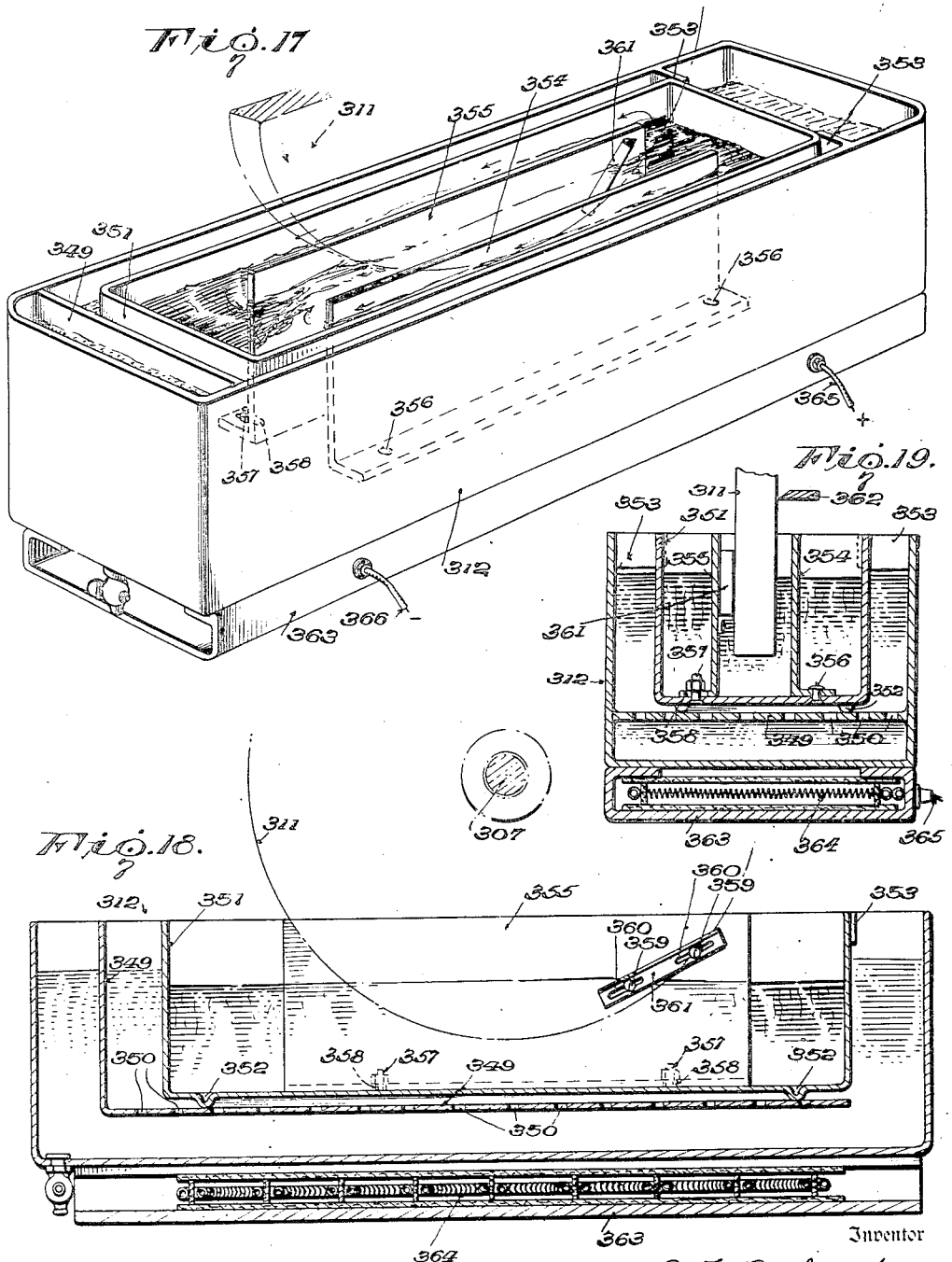

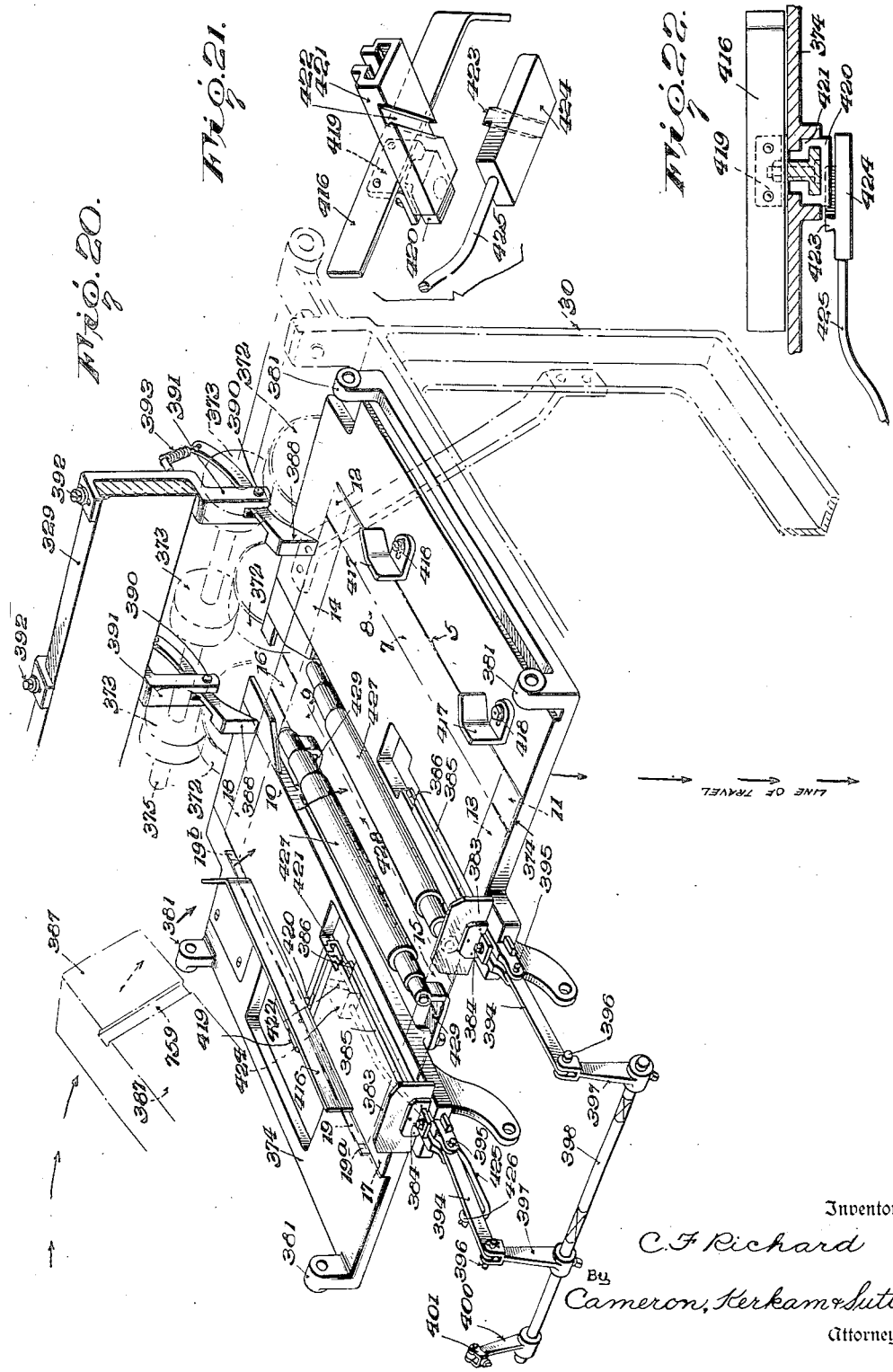

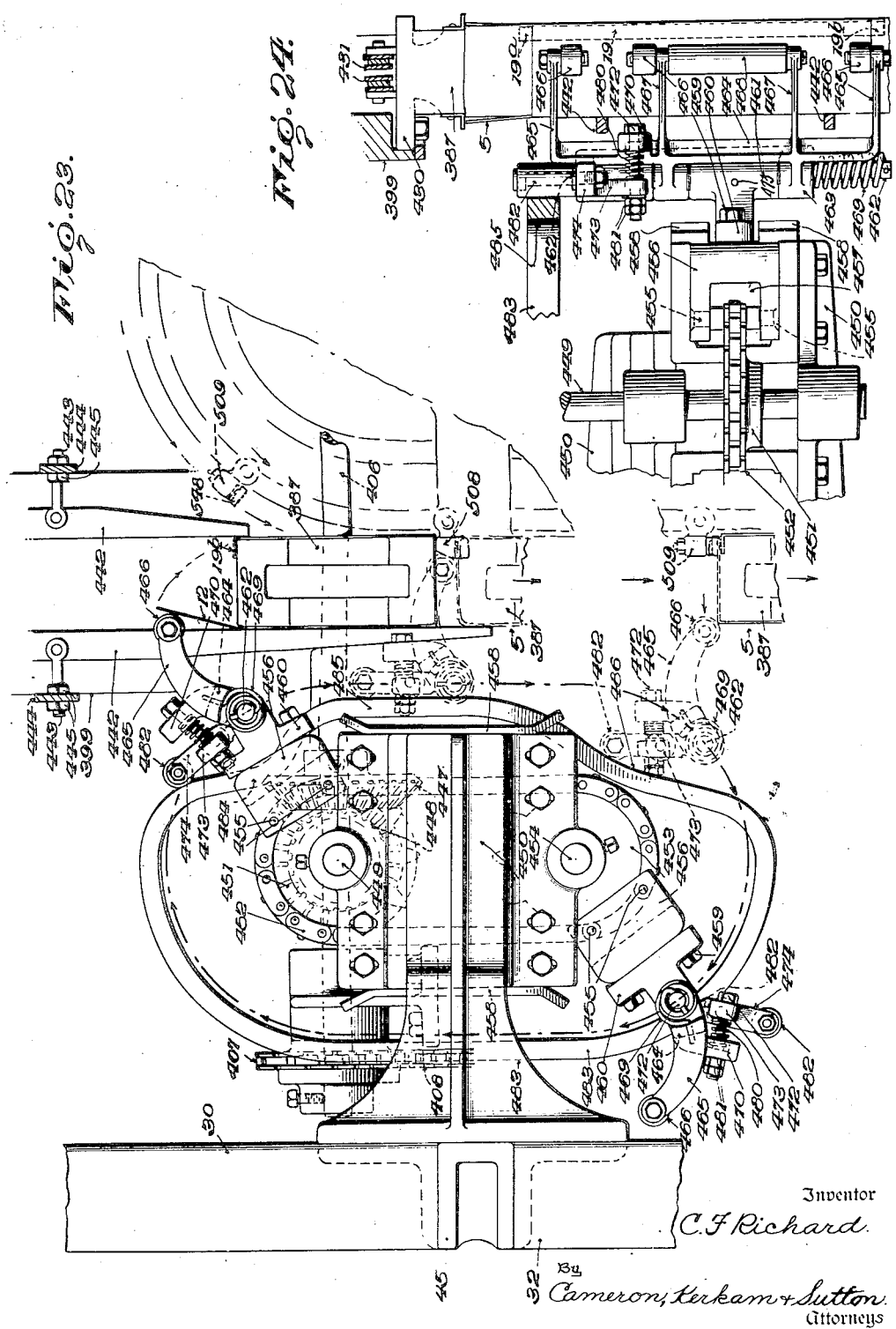

May 8, 1934.  C. F. RICHARD  1,957,613
CARTON MAKING MACHINE
Filed Jan. 3, 1930   23 Sheets-Sheet 16
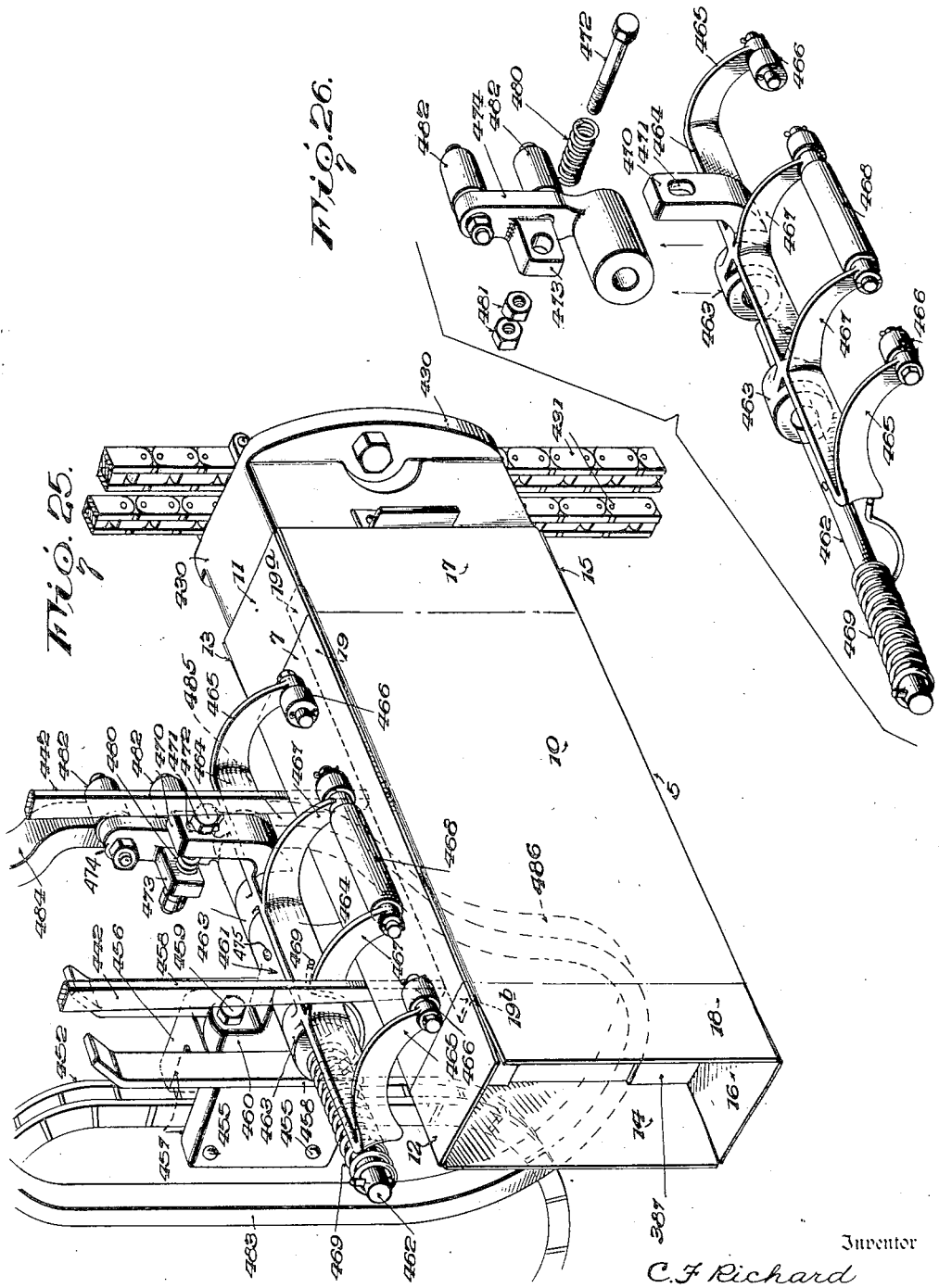
Inventor
C. F. Richard
By Cameron, Kerkam & Sutton
Attorneys

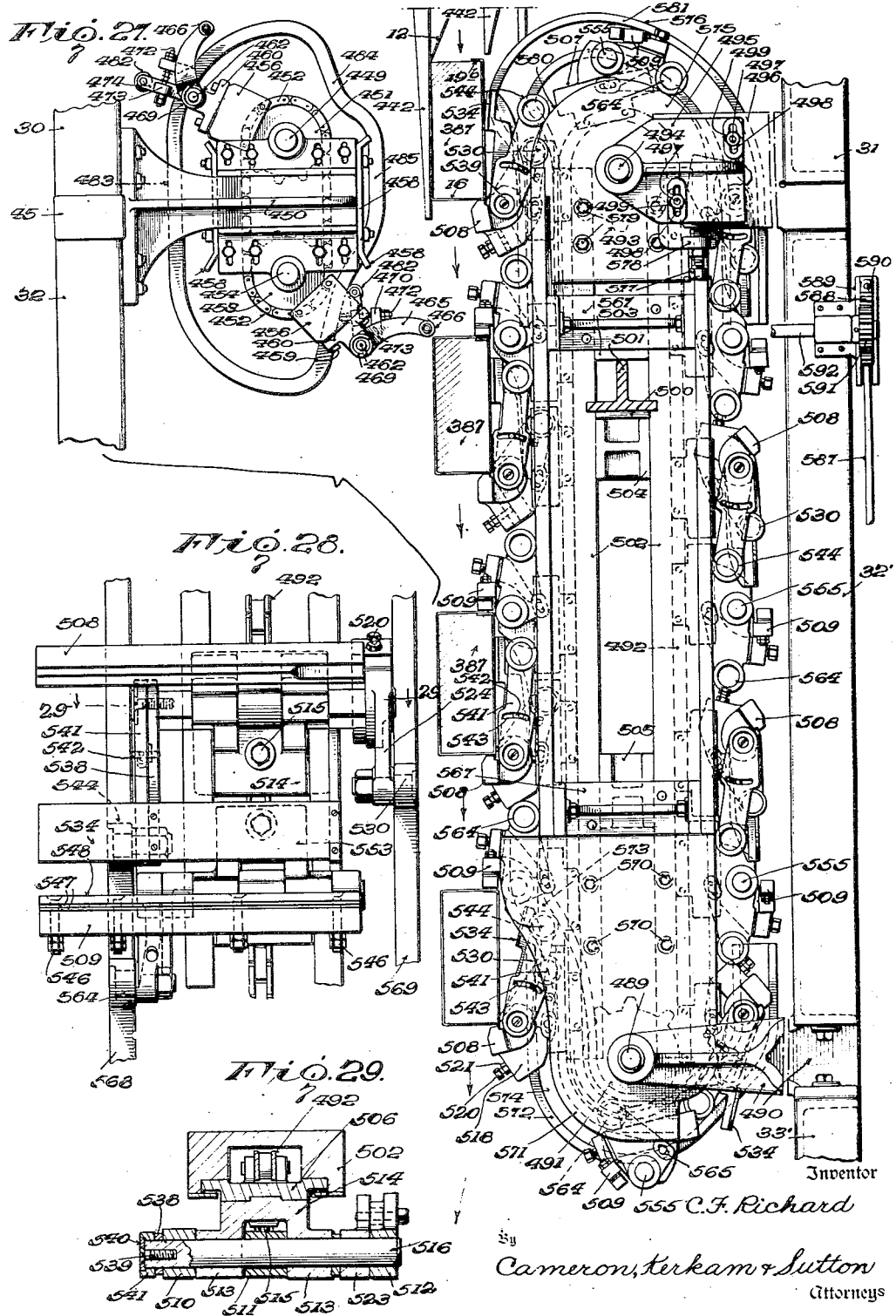

May 8, 1934.　　　　C. F. RICHARD　　　1,957,613
CARTON MAKING MACHINE
Filed Jan. 3, 1930　　　23 Sheets-Sheet 18
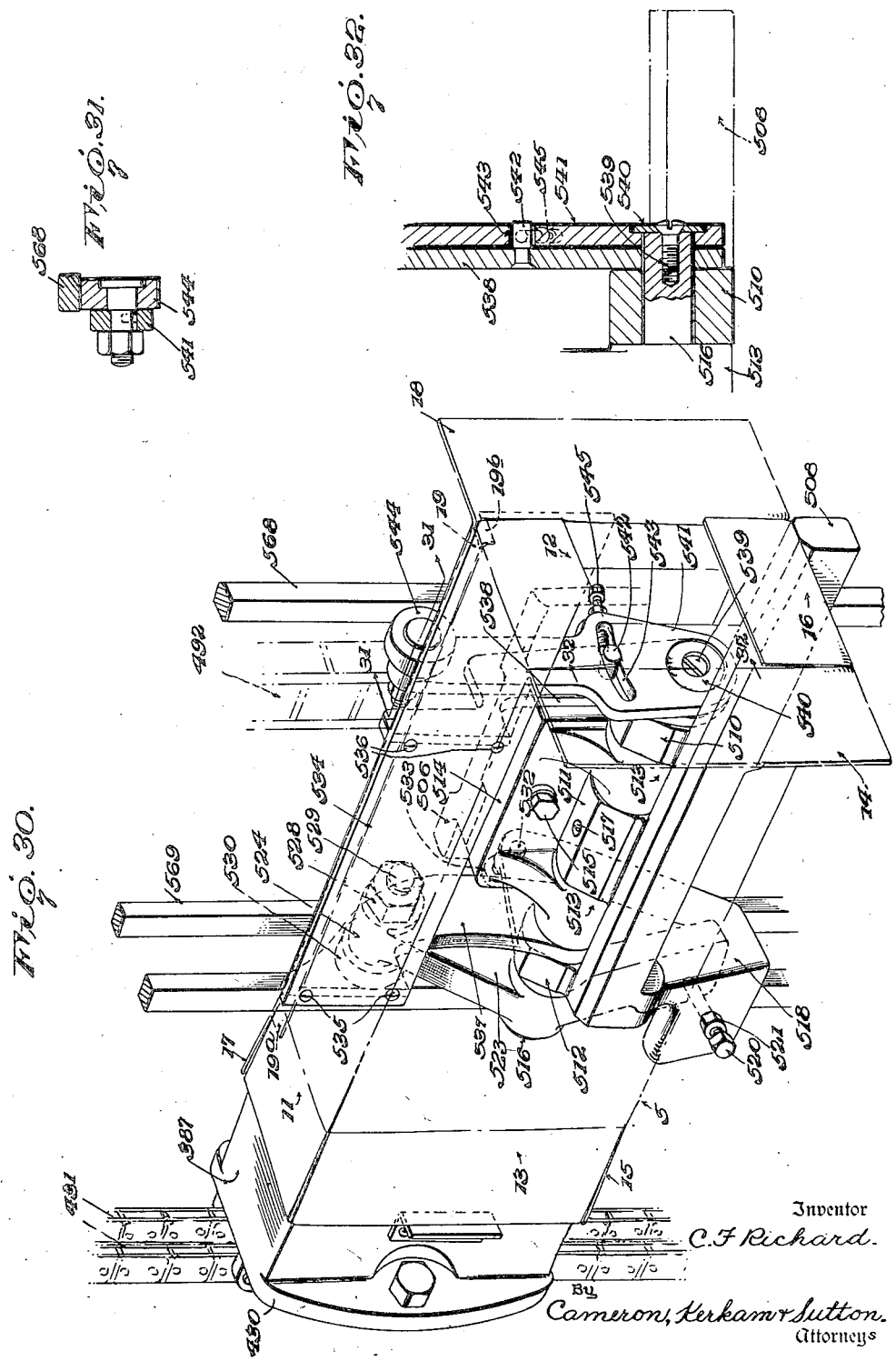

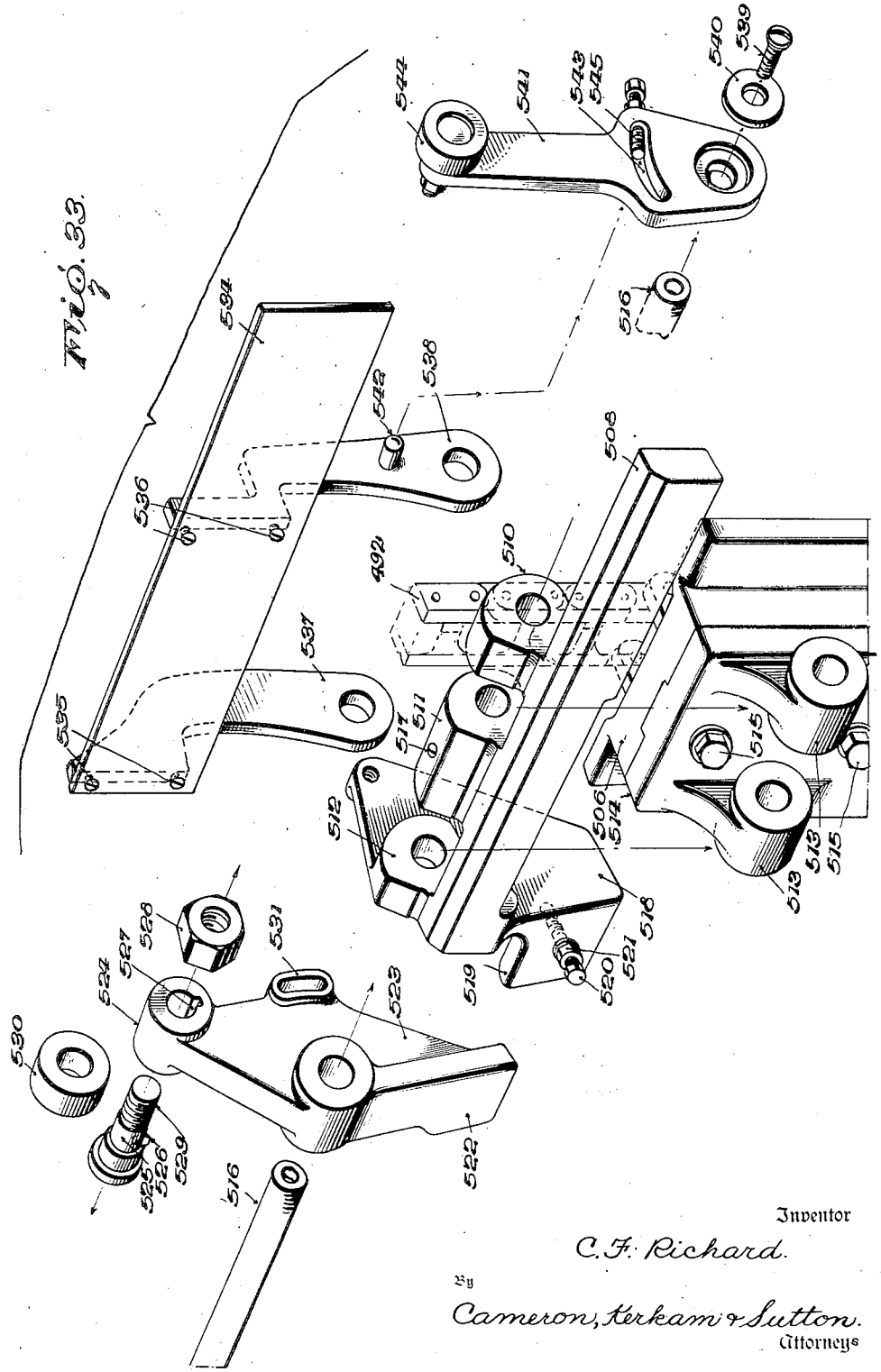

May 8, 1934.  C. F. RICHARD  1,957,613
CARTON MAKING MACHINE
Filed Jan. 3, 1930  23 Sheets-Sheet 20
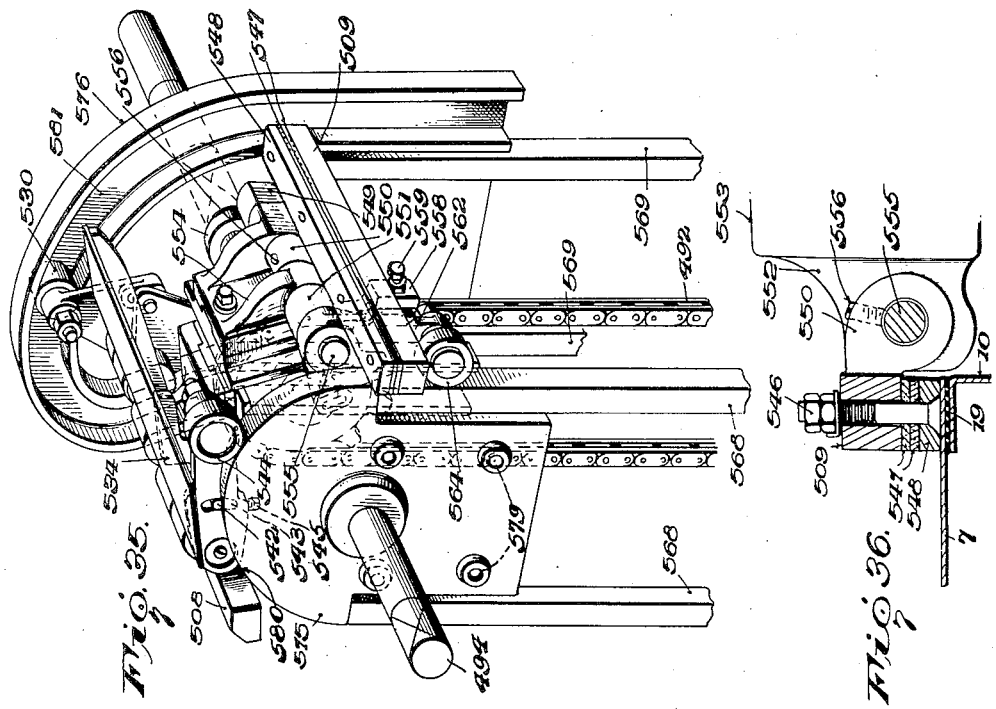
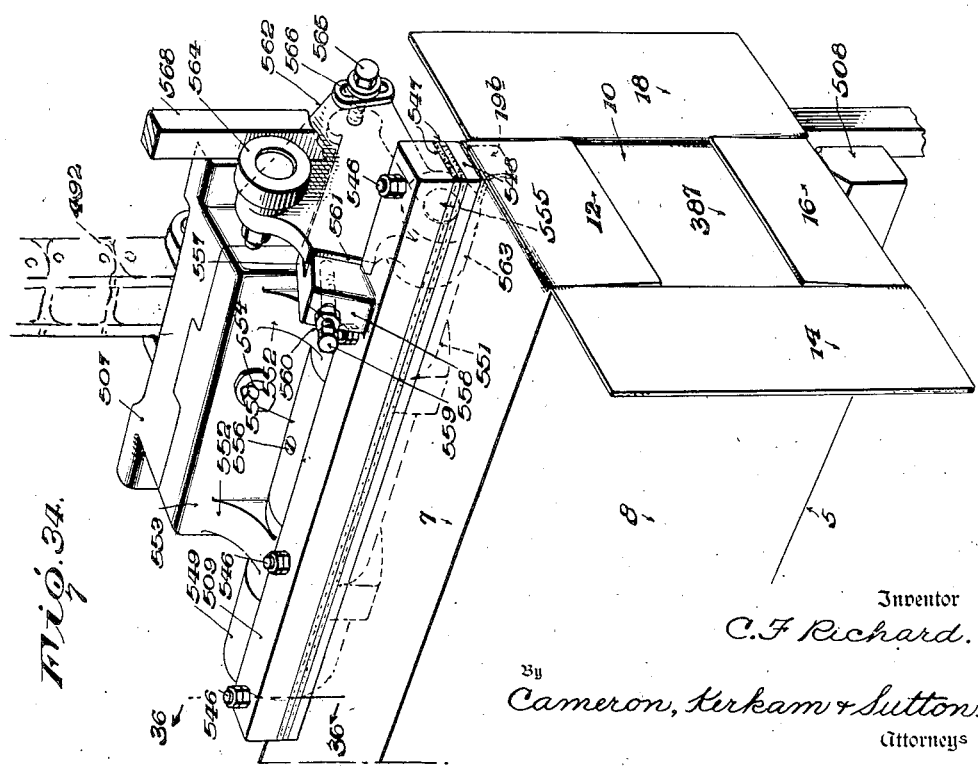
Inventor
C. F. Richard.
By Cameron, Kerkam & Sutton.
Attorneys May 8, 1934.   C. F. RICHARD   1,957,613
CARTON MAKING MACHINE
Filed Jan. 3, 1930   23 Sheets-Sheet 21
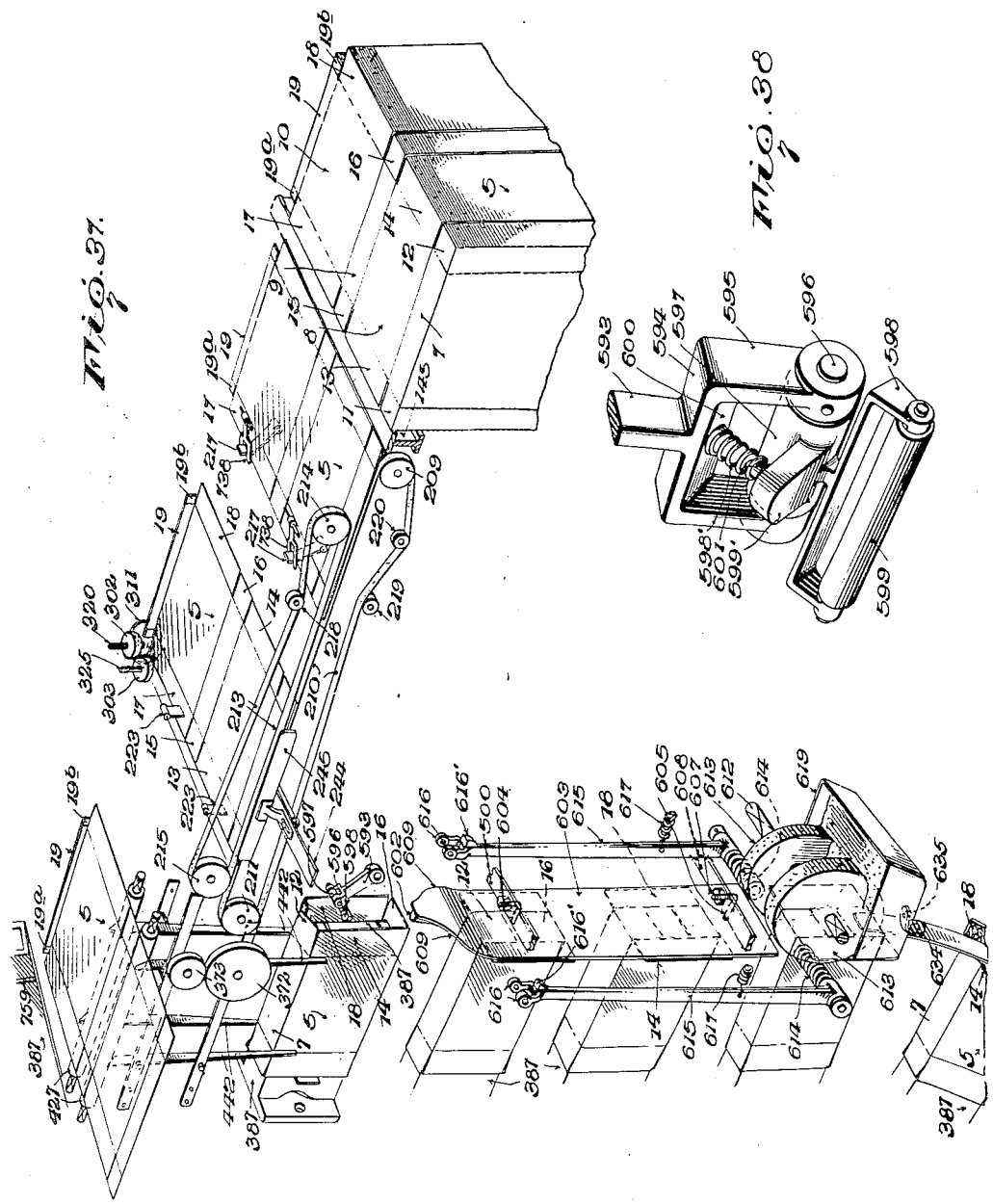
Inventor
C. F. Richard
By Cameron, Kerkam & Sutton
Attorneys

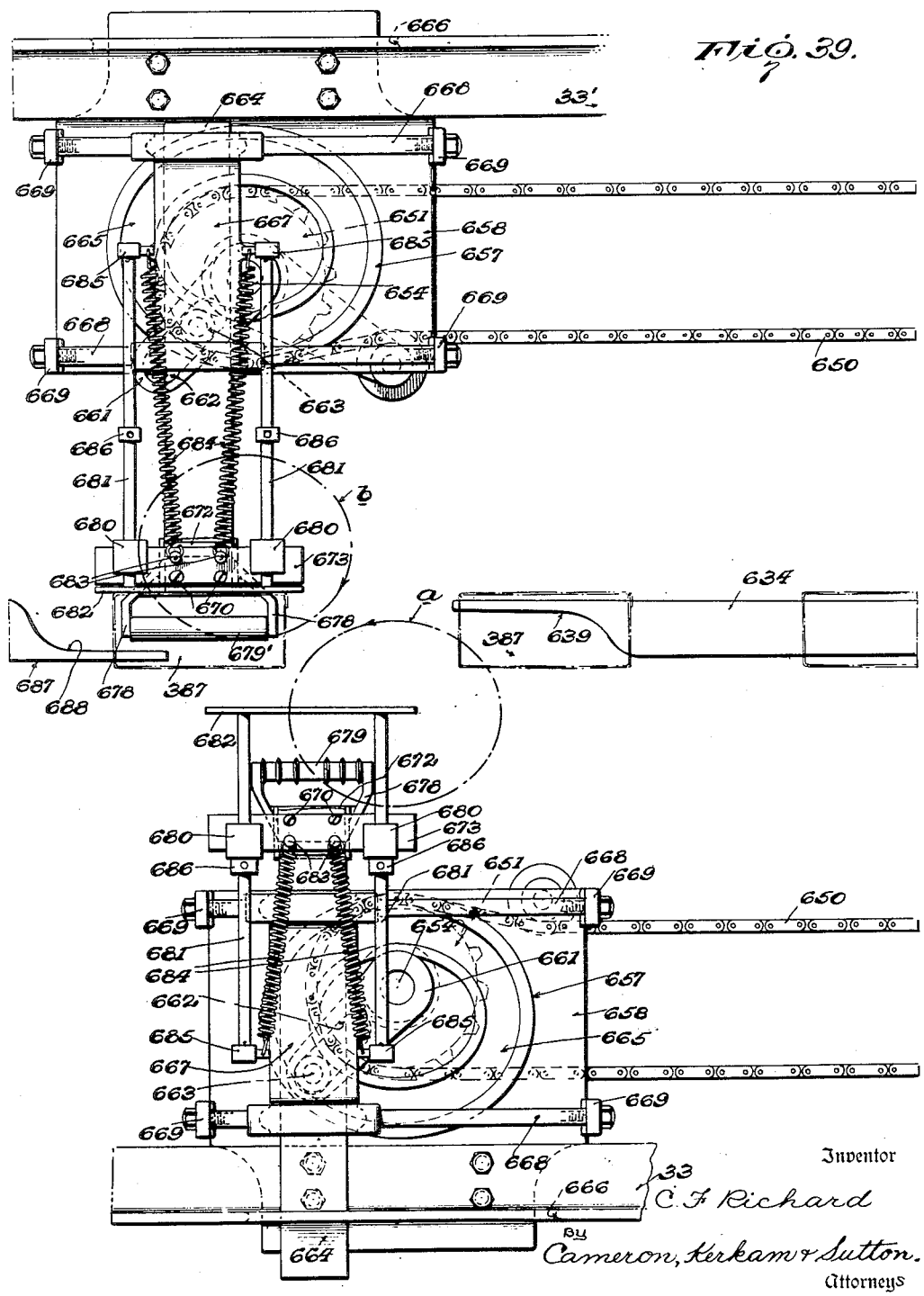

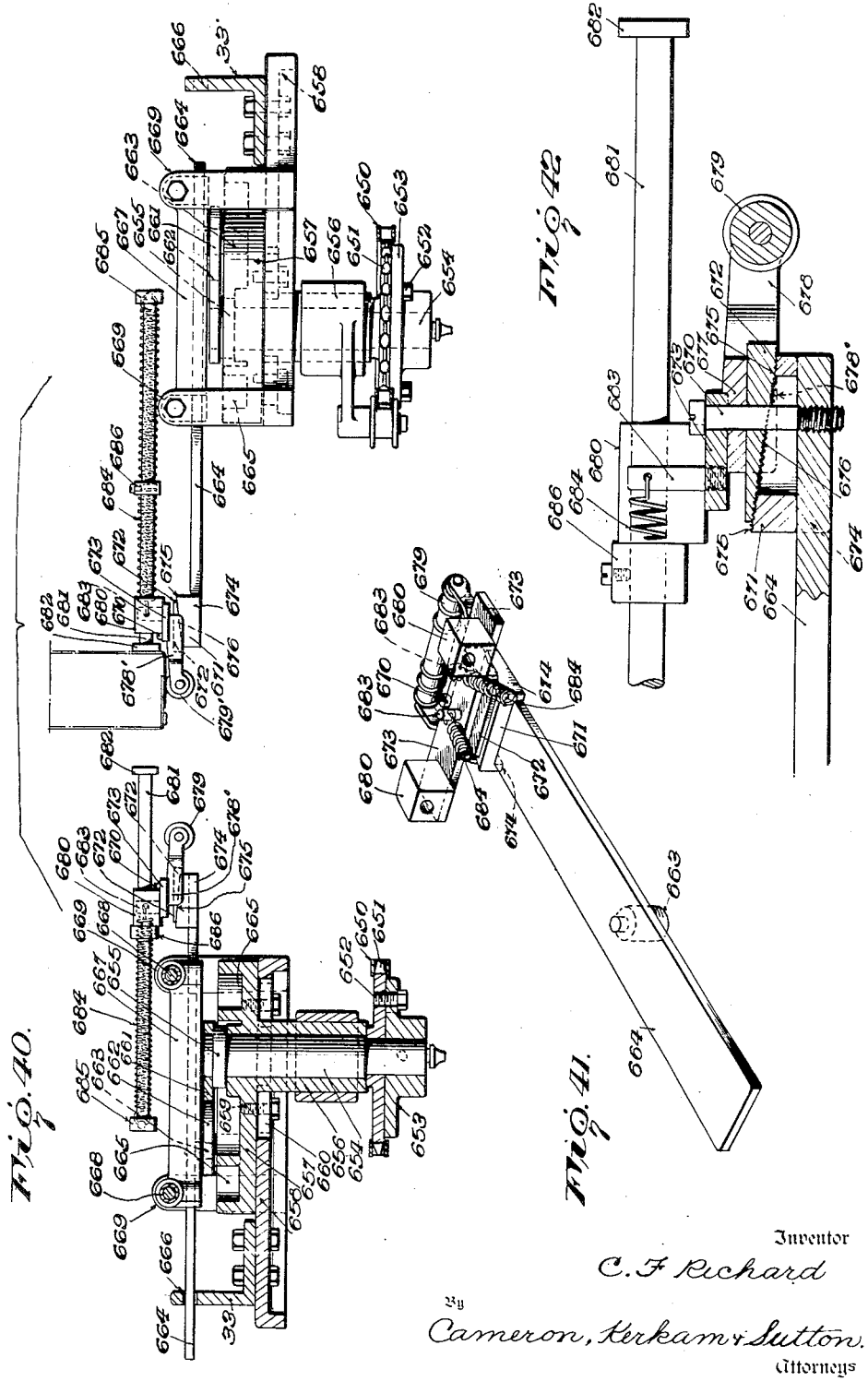

Patented May 8, 1934

UNITED STATES PATENT OFFICE 1,957,613

CARTON MAKING MACHINE

Charles F. Richard, Battle Creek, Mich., assignor to Johnson Automatic Sealer Co., Ltd., Battle Creek, Mich., a limited partnership of Michigan Application January 3, 1930, Serial No. 418,349

62 Claims. (Cl. 93—44)

This invention relates to carton making machines, and while capable of general use, is particularly adapted for making bottom sealed cartons from flat carton blanks or the like.

This invention is an improvement on the machine disclosed in Patent No. 1,674,921, granted to G. A. Robinson, June 26, 1928, and one object of the present invention is to provide a carton making machine of the general type shown in said patent but wherein the parts are arranged so as to eliminate the necessity for turning the carton blanks from a horizontal position to a vertical position during their travel to the forms or devices around which said blanks are wrapped or folded.

Another object of the invention is to provide an improved carton making machine which embodies carton feeding, folding, pressing and forming devices compactly arranged as a unit occupying a minimum amount of floor space.

Another object of the invention is to provide a carton making machine which includes devices arranged in a novel manner and operating at high speed to increase the efficiency and production of machines of this character.

Another object of the invention is to provide a carton making machine which includes a novel arrangement of forms and devices for registering carton blanks with respect thereto.

Another object of the invention is to provide a carton making machine which embodies improved means for folding or wrapping blanks around the forms thereof.

Another object of the invention is to provide a carton making machine which embodies improved mechanism for clamping and pressing the cartons on the forms therefor.

Another object of the invention is to provide a carton making machine which includes a novel arrangement of forms, flap tuckers, and devices for gluing and folding flaps of the cartons carried on said forms.

Another object of the invention is to provide a carton making machine which embodies improved means for bending out the unsealed top flaps of the carton after it has been bottom sealed, in order to facilitate subsequent filling of the carton.

Another object of the invention is to provide an improved carton making machine which is simple in construction, efficient in operation, and inexpensive to manufacture, install, and maintain in operation.

These and other objects of the invention will appear as the following description thereof proceeds, and in order to more clearly understand said invention, reference may be had to the appended drawings which illustrate one embodiment of the inventive idea.

In said drawings:

Figs. 1 and 1a are complementary side elevations of a carton making machine embodying the present invention;

Figs. 2 and 2a are substantially complementary top plan views of the machine shown in Figs. 1 and 1a, the blank supporting table illustrated in Fig. 2a being omitted in Fig. 1a;

Fig. 4 is a detail perspective view of driving mechanism for various movable parts of the machine;

Fig. 5 is an enlarged detail perspective view of the pile elevator and operating mechanism therefor, showing blank separating means and a portion of a conveyor receiving blanks therefrom;

Fig. 6 is an enlarged detail perspective view of the main cam shaft and associated devices operated thereby;

Fig. 7 is an enlarged transverse vertical sectional view with parts omitted, on the line 7—7 of Fig. 2a;

Fig. 8 is a vertical longitudinal sectional view, with parts omitted, on the line 8—8 of Fig. 2a;

Fig. 9 is an enlarged vertical longitudinal sectional view with parts omitted, on the line 9—9 of Fig. 2a;

Fig. 10 is an enlarged detail perspective view of the blank conveyor and associated registering, gluing, and feeding devices shown in Figs. 1a and 2a;

Fig. 11 is an enlarged transverse vertical sectional view of a flap bender shown in Figs. 2a and 6;

Fig. 12 is an enlarged detail perspective view of the side sealing flap gluing mechanism, looking from the cam shaft side of the machine.

Figs. 13 and 14 are detail perspective views of a glue box supporting shelf, and a blank operated detector mechanism, respectively;

Fig. 15 is an enlarged vertical longitudinal sectional view, with parts omitted, on the line 15—15 of Fig. 2a;

Fig. 17 is an enlarged detail perspective view of the glue box for the side sealing flap gluing mechanism;

Figs. 18 and 19 are vertical longitudinal and transverse sectional views, respectively, of said glue box;

Fig. 20 is an enlarged detail perspective view of a blank supporting table and devices carried thereby for registering the blanks with respect to forms around which they are folded;

Fig. 21 is a detail perspective view, with parts separated, of one of said blank registering devices;

Fig. 22 is a side elevation of the blank registering device shown in Fig. 21;

Figs. 23 and 24 are enlarged rear end and top plan views, respectively, of panel folding devices;

Fig. 25 is an enlarged detail perspective view of one of the panel folding devices and operating mechanism therefor shown in Fig. 23;

Fig. 26 is a detail perspective view of one of said panel folding devices, the parts of which are shown separated for purposes of clearer illustration;

Fig. 27 is an enlarged transverse vertical sectional view, with parts omitted, taken approximately on the line 27—27 of Fig. 2a;

Fig. 28 is an enlarged fragmentary side elevation looking from the right of Fig. 27 and illustrating one of a plurality of sets of press jaws shown therein;

Fig. 29 is a transverse horizontal sectional view on the line 29—29 of Fig. 28;

Fig. 30 is an enlarged perspective view of a solid press jaw and operating devices therefor;

Figure 2:
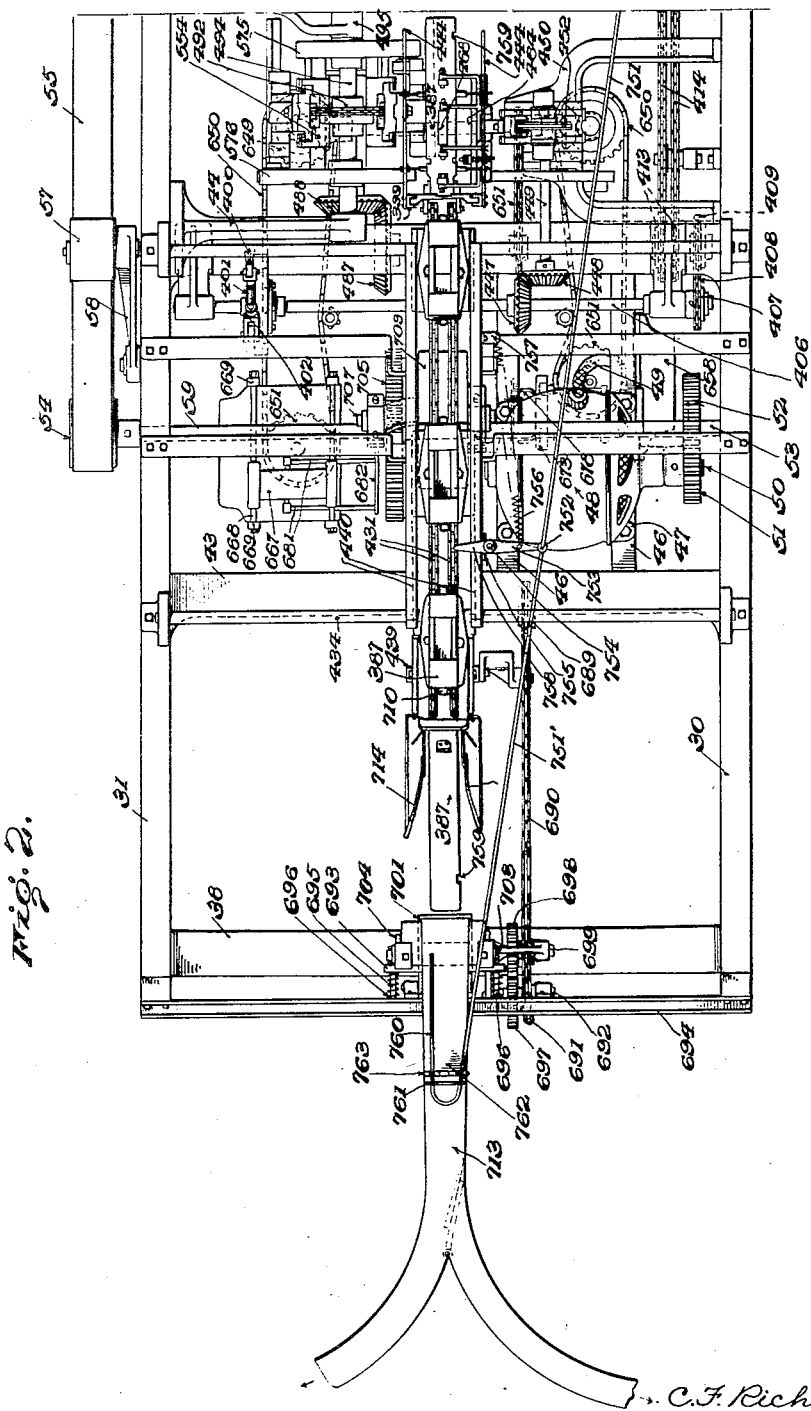

Figs. 31 and 32 are horizontal and vertical sectional views, respectively, on the lines 31—31 and 32—32 of Fig. 30;

Fig. 33 is an enlarged perspective view, with parts separated, of the solid press jaw shown in Fig. 30;

Fig. 34 is an enlarged detail perspective view of a yieldable press jaw and operating devices therefor;

Fig. 35 is an enlarged detail perspective view of one set of press jaws and associated operating devices therefor;

Fig. 36 is a transverse vertical sectional view on the line 36—36 of Fig. 34;

Fig. 37 is a diagrammatic perspective view of blanks travelling through the machine, showing various devices that act on the blanks to make cartons thereof;

Fig. 38 is an enlarged detail perspective view of an end flap tucking device;

Fig. 39 is an enlarged top plan view of end flap folding devices and operating mechanism therefor;

Fig. 40 is a rear end view, partly in section, of the flap folding devices and operating mechanism shown in Fig. 39;

Fig. 41 is a detail perspective view of one of the flap folding devices; and

Fig. 42 is an enlarged rear end view, partly in section, of supporting and adjusting means for said flap folding device.

Referring to the drawings, wherein like reference characters designate like parts throughout the several views, the carton blanks 5 (Fig. 37) are stacked vertically on an elevator indicated broadly at 6 (Fig. 3), and are each scored along parallel lines to provide panels 7, 8, 9, and 10 having end flaps 11 and 12, 13 and 14, 15 and 16, 17 and 18, respectively. The panel 10 is provided with a side flap 19 for securing said panel to the panel 7 when the blank has been fed from the stack on the elevator 6 and folded into tubular form in the machine by devices hereinafter described for these purposes. The side flap 19 is preferably provided at its opposite ends with small flaps 19$^a$, 19$^b$ which are folded over and secured to the end flaps 11 and 12, respectively, when a carton formed from the carton blank is sealed at opposite ends thereof. These devices, together with the elevator 6, are supported on a machine framework that is preferably constructed as follows.

Figure 3:
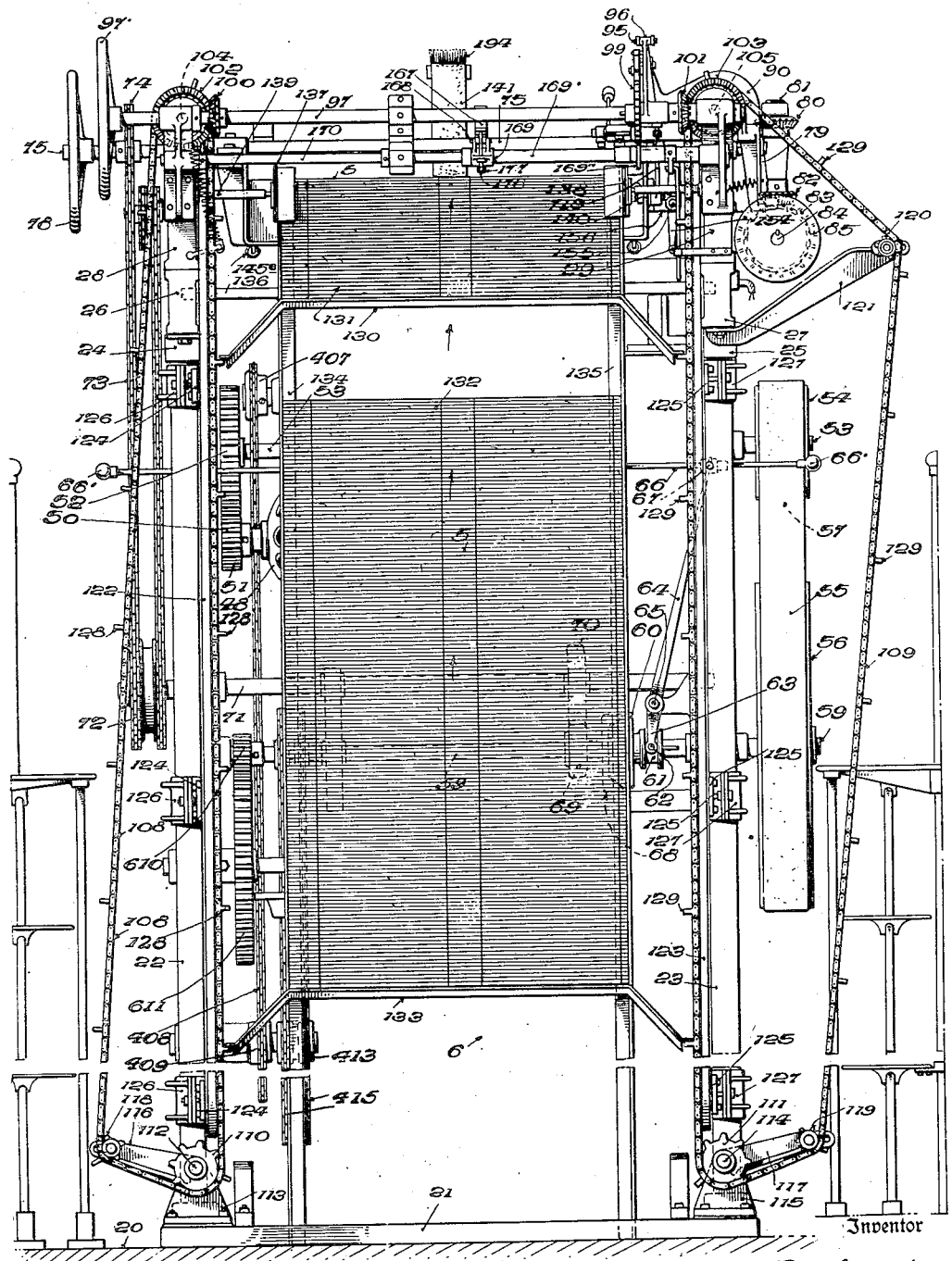
Fig. 3 is an enlarged end view of the machine, looking from the right of Fig. 1a, showing an elevator for a stack or pile of carton blanks.

*Machine framework—Figs. 1 to 3, inclusive, and 27*

Bolted or otherwise suitably secured to the machine foundation 20, is a base plate 21 which extends under the pile elevator 6. This base plate has bolted or otherwise suitably secured thereto, a pair of vertical standards 22, 23 disposed in spaced relation at opposite sides of the base plate, respectively. Rigidly secured on the upper ends of the standards 22, 23, are brackets 24, 25, respectively, that have bolted or otherwise suitably secured thereto, frame members 26, 27 which extend horizontally from the standards 22, 23 toward the front of the machine. These frame members have bolted or otherwise suitably secured on the rear portions thereof, vertical frames 28, 29, respectively, which carry the elevator 6 and various other movable parts of the machine.

The front ends of the frame members 26, 27 are bolted or otherwise suitably secured on the rear ends of a pair of top frames 30, 31, respectively, that form part of a supporting framework for various movable parts of the machine hereinafter described. The framework just referred to includes at the opposite sides thereof, intermediate frames 32, 32' and bottom frames 33, 33' (Figs. 1, and 27). The bottom frames have bolted or otherwise suitably secured thereto, cross members 34, 35 and are supported on legs such as indicated at 36, 37, respectively. These legs are bolted or otherwise suitably secured to the cross members 34, 35 and to the machine foundation 20, respectively. The bottom frames 33, 33' are also connected together by spacers 38, cross members 39, 40, and spacers 41, that extend between said bottom frames and the intermediate frames and are bolted or otherwise suitably secured thereto. The intermediate frames 32, 32' are also connected together by spacers 42, cross members 43, 44, and spacers 45, which extend between said intermediate frames and the top frames 30, 31, and are bolted or otherwise suitably secured thereto.

The framework just described has mounted thereon the main driving mechanism for the various movable parts of the machine, and said mechanism is preferably constructed and operated as follows.

*Main driving mechanism—Figs. 1 to 2a, inclusive, and 4*

Bolted or otherwise suitably secured to conveyor ways 399, 439 hereinafter referred to, are a pair of U-shaped brackets 46 that are arranged in spaced relation between the intermediate frames 32, 32'. These brackets have bolted or otherwise suitably secured thereto, a frame or support 47 (Figs. 1 and 4) for an electric motor 48 which is supplied with electrical current from any suitable source through a line 49 connected with said motor and controlled by a switch (not shown).

The armature shaft 50 of the motor 48, has fixed thereon a spur pinion 51 which meshes with a spur gear 52 that is fixed on one end of a shaft 53 extending transversely of the machine and journaled in suitable bearings on the top frames 30, 31 at the under sides thereof. The shaft 53 has fixed on its opposite end a pulley 54 around which passes a belt 55 that also passes around a pulley 56. Tension may, if desired, be maintained on the belt 55 by a roller 57 engaged therewith and journaled on an arm 58 pivoted in any suitable manner on the top frame 31. The pulley 56 is fixed on a shaft 59 which extends transversely of the machine and is journaled in suitable bearings on the intermediate frames 32, 32' thereof. The shaft 59 constitutes the main drive shaft of the machine and is continuously driven through the described driving connections for said shaft with the motor 48.

Keyed to and slidable along the shaft 59, is a cone clutch member 60 provided circumferentially thereof with a groove 61 having engaged therein pins 62 which project inwardly from a yoke 63 formed on the lower end of a clutch operating lever 64. This lever 64 is pivoted at 65 on the intermediate frame 32', and said lever may be swung in opposite directions about the pivot 65 by a rod 66 which is pivotally connected at 67 with the lever 64. The rod 66 extends transversely of the machine and is arranged for reciprocating movement in suitable bearings carried by the frames 26, 27. The rod 66 projects from both sides of the machine and is provided on its opposite ends with handles 66', by means of which the rod can be moved from either side of the machine to actuate the clutch operating lever 64.

The cone clutch member 60 is adapted to be engaged by the lever 64, with a cone clutch member 68 that is loosely mounted on the shaft 59 and prevented from endwise movement thereon in any suitable manner. The clutch member 68 has secured to or formed integrally therewith, a spur pinion 69 which meshes with a spur gear 70 fixed on one end of a shaft 71 that is driven from the shaft 59 when the clutch parts 60, 68 are connected. The shaft 71 extends transversely of the machine and is journaled in suitable bearings on the intermediate frames 32, 32'. Fixed on the shaft 71 is a sprocket 72 for driving the pile elevator 6. This pile elevator is preferably operated and constructed as follows.

*Pile elevator—Figs. 1a, 2a, 3, and 5 to 9, inclusive*

The sprocket 72 for driving the pile elevator may be adjusted on and secured to the shaft 71 in any suitable manner. Passing around the sprocket 72 is a chain 73 that also passes around a sprocket 74 (Fig. 5) which is fixed on a shaft 75 extending transversely of the machine and journaled in suitable bearings on the frames 28, 29 at the tops thereof. Tension on the chain 73 may, if desired, be maintained by a sprocket 76 carried loosely on a stub shaft 77 adjustably mounted in any suitable manner on the frame member 26. The shaft 75 has fixed on one end thereof, a hand wheel 78, and fixed on the opposite end of said shaft is a bevel gear 79. The bevel gear 79 meshes with a similar gear 80 that is fixed on the upper end of a vertical shaft 81 journaled in suitable bearings on the frame 29. Fixed on the lower end of the shaft 81 is a bevel gear 82 that meshes with a bevel gear 83 (Figs. 6 and 7) which is fixed on the continuously driven main cam shaft 84 of the machine. This cam shaft extends lengthwise of the machine and is journaled in suitable bearings secured on, and extending outwardly from, the frame member 27.

Fixed on the cam shaft 84, at the rear end thereof, is a cam 35 which is continuously driven by the shaft 84. This cam engages a roller 86 which is journaled on an arm 87 fixed on a rock shaft 88 (Figs. 6 and 9). The rock shaft 88 is journaled in a suitable bearing on the top of the frame 29 and extends transversely thereof. A spring 89, which has its opposite ends connected with the arm 87 and a part of the frame 29 rearwardly thereof, tends to maintain the roller 86 in engagement with the cam 85 so that the arm 87 is thus rocked thereby. Secured to or formed integrally with the arm 87, is a yoke 90 which terminates at one end in a sleeve 91 that is also fixed on the rock shaft 88 at the end thereof opposite that carrying the arm 87. This sleeve 91 has secured to or formed integrally therewith, an arm 92 that is pivotally connected at 93 with one end of a rod 94. The opposite end of the rod 94 is pivotally connected at 95, with an arm 96 that is loosely mounted on a shaft 97 provided at one end thereof with a band wheel 97'. This shaft 97 extends transversely of the machine and is journaled in suitable bearings on the frames 28, 29. The arm 96 is adapted to be rocked through the described connections therefor with the cam actuated arm 87. This arm 96 carries a spring-pressed pawl 98 which, when the arm 96 is rocked, engages and rotates a ratchet 99 that is fixed on the shaft 97. The shaft 97 is thus rotated, and acts to operate the elevator 6 which, together with operating mechanism therefor, will now be described in detail.

Fixed on the shaft 97 are bevel gears 100, 101 disposed in spaced relation on said shaft and meshing with similar gears 102, 103, repectively. The bevel gears 102, 103 are fixed on the rear ends of shafts 104, 105 which extend lengthwise of the machine and are journaled in suitable bearings on the frames 28, 29 at the tops thereof. The shafts 104, 105, have fixed thereon, sprockets 106, 107, respectively, around which pass chains 108, 109. Chains 108, 109 also pass around sprockets 110, 111, respectively. The sprockets 110 are fixed on shafts 112 extending lengthwise of the machine and journaled in suitable bearings on brackets 113 that are bolted or otherwise suitably secured to the base plate 21. The sprockets 111 are fixed on shafts 114 which also extend lengthwise of the machine and are journaled in suitable bearings on brackets 115 that are bolted or otherwise suitably secured to the base plate 21.

Secured to or formed integrally with the brackets 113, 115 and projecting outwardly therefrom, are arms 116, 117, respectively. Journaled on the arms 116, 117, at the outer ends thereof, are idler sprockets 118, 119 around which pass the chains 108, 109, respectively. The chains 109 also pass around idler sprockets 120 journaled on arms 121. The arms 121 are bolted or otherwise suitably secured on the frame member 27 at the bottom thereof, and said arms project outwardly from said frame member to support the sprockets 120 in engagement with the chains 109 so that the latter clear the various movable devices supported adjacent the chains 109 by the frame member 27 and the frame 29.

The opposed, inner, vertical reaches of the chains 108, 109 are retained in parallel alinement by guides 122, 123 which engage said chains, respectively. The guides 122, 123 are bolted or otherwise suitably secured to horizontally extending bars 124, 125, respectively. The bars 124, 125, in turn, are bolted or otherwise suitably secured on brackets 126, 127, respectively, said brackets being secured in spaced relation on the vertical standards 22, 23. The chains 108, 109 have bolted or otherwise suitably secured thereon at intervals along the same, horizontally extending flights or shelves 128, 129, respectively. The flights or shelves on the inner reaches of said chains are alined transversely of the machine in pairs each adapted to support a pile board 130. The pile board 130 is moved into and out of the elevator through the rear thereof and is adapted to carry a vertical stack 131 of carton blanks 5 fed upwardly in the machine by the elevator and separated in succession from the top of the stack by means to be hereinafter described.

The stack 131 is fed upwardly by the elevator as the blanks are successively separated from the top of said stack, and during this time a second stack of blanks 132 may be placed in the elevator under the stack 131. The stack 132 is supported on a pile board 133 which, in turn, is supported on a pair of the transversely alined flights or shelves 128, 129. When the stack 131 has been fed upwardly and the blanks are separated therefrom so that the stack is depleted, the pile board 130 is removed from the machine through the rear open end of the elevator, and the pile 132 is run up, as by turning the hand wheel 97', until the pile 132 is in position to have the blanks separated from the top thereof. It will thus appear, that no time is lost in supplying the elevator with blanks to be separated, conveyed, folded, and formed into cartons as hereinafter described.

During upward movement of the stack of blanks, the same is guided by guide members 134, 135 that engage the front corners of the stack and extend vertically in spaced parallel relation at the front of the elevator. These guide members 134, 135 are bolted or otherwise suitably secured to the base plate 21 and to a cross member 136 that is bolted or otherwise suitably secured to the frame members 26, 27. The stack of blanks may be further guided if desired by plates 137, 138, which engage the opposite sides of the stack and are carried by arms 139, 140 respectively, mounted in any suitable manner on the frames 28, 29.

*Blank separator, and pile elevator control—Figs. 1a, 2a, 3, 5, 6, 7, 8 and 10*

The blanks 5 are separated successively from the top of the stack, by a friction roller 141 which is preferably rubber covered and always maintained in positive contact with the top of the stack of blanks. The roller 141 is fixed on a shaft 142 that rotates intermittently in bearings formed on the L-shaped arms 143, 143', and 144, 144', of a yoke 145 which, together with the shaft 142, is mounted for swinging movement on the shaft 75 through the medium of said L-shaped arms (Figs. 5, 7 and 8). The yoke 145 extends across the front of the stack of blanks adjacent the top of said stack, and the intermittently driven feed roller 141 is pressed into engagement with the top of the stack by the weight of said yoke. The roller 141 which separates the blanks successively from the stack at the top thereof, feeds said blanks over a plate 145ª on the yoke 145, to a blank conveyor to be hereinafter described. This plate 145ª (Figs. 7 and 8) prevents the separation of more than one blank at a time from the stack by the roller 141. The plate 145ª is mounted on a bracket 145ᵇ secured for vertical adjustment, as at 145ᶜ, to the yoke 145. Said plate and said bracket may be adjusted vertically as desired, by a thumb screw 145ᵈ journaled on the yoke 145 and having threaded connection with the bracket 145ᵇ. The yoke 145 has connected therewith, springs 145ᵉ which extend forwardly and upwardly from said yoke and are connected with a cross member 145ᶠ (Fig. 2a). The cross member 145ᶠ is connected with brackets 186, 187 hereinafter referred to.

The intermittent rotation of the feed roller 141 is obtained through the medium of the following described devices. Fixed on the shaft 75 is a gear 146 that meshes with a gear 147 which is mounted loosely on shaft 142 and provided with a toothed clutch member 148. The gear 147 and the clutch member 148 are therefore continuously rotated by the gear 146 and the shaft 75. A clutch sleeve 149 (Fig. 6) keyed to and slidable along the shaft 142, carries a toothed clutch member 150 adapted to engage at proper intervals with the clutch member 148. The sleeve 149 is provided with an annular groove 151 into which extend pins 152 that engage the walls of said groove while at the same time providing for rotation of said sleeve. These pins are carried on the arms of a yoke 153 that is secured to or formed integrally with a lever 154. This lever 154 is pivoted at 155 on an extension 156 (Figs. 6 and 7) of the yoke 145. A spring 157, which has its opposite ends connected with the lever 154 and the frame 29, normally tends to swing the lever 154 about its pivot 155 so that the clutch members 148, 150 are engaged to rotate the shaft 142 and the feed roller 141. The clutch members 148, 150, however, are intermittently separated by a cam 158 and devices operated thereby and connected with the lever 154. The cam 158 is fixed on the continuously driven cam shaft 84, and engages a roller 159 that is journaled on one arm 160 of a double arm lever 161. This lever 161 is pivoted at 162 on the frame 29, and the other arm 163 of said lever is pivotally connected at 164 with one extremity of a link 165. The opposite extremity of the link 165 is pivotally connected at 166, with the lever 154. It will thus appear that during rotation of the shaft 84, the cam 158 and the spring 157 act to intermittently engage and disengage the clutch parts 148, 150 so that the shaft 142 and the roller 141 are intermittently driven by the described driving connections therefor with the shaft 75.

The stack of blanks on the elevator, is raised at intervals to compensate for feeding of the blanks off the top of the stack by the roller 141. The upward feed of the elevator is controlled by the action of a detector mechanism including a lever 167 the forward end of which engages the shaft 142 so that said lever is rocked up and down in accordance with the rising and lowering movements of the shaft 142 and the feed roller 141. The lever 167 is pivotally mounted at 168, on a plate 169 secured to or formed integrally with a sleeve 169' that is pivotally mounted on a stay shaft 170. This shaft 170 extends transversely of the machine and is secured in any suitable manner to the frames 28, 29. The stay shaft 170 has mounted thereon, a manually controlled pawl 169'' which may be engaged with the ratchet 99 or disengaged therefrom, as desired. The plate 169 carries rearwardly thereof, a thumb screw 171 which is rotatably retained on the plate in any suitable manner and bears against the rear extremity or end of the lever 167 opposite that engaged with the shaft 142. The forward end of the plate 169 has mounted thereon a spring 172 that engages the lever 167. Automatic control of the elevator 6 through engagement of separator 141 with the stack, may be regulated, as desired, by adjusting the screw 171.

The sleeve 169' is rocked by the lever 167, through engagement of the latter with the shaft 142 and rising and lowering movements of said shaft and the feed roller 141. This sleeve 169' has fixed on one end thereof an arm 173 provided on its free end with a set screw 174. When the feed roller 141 is raised by like movement of the elevator and stack of blanks, the sleeve 169' is rocked in a clockwise direction (Fig. 5), thereby raising the arm 173 so that the pin 174 thereon engages an arm 175 pivotally mounted on shaft 88. A hook 176 of arm 175 is thus brought into engagement with a pin 177 (Fig. 9) on the arm 96 and prevents the roller 86 on arm 87 from following the cam 85 through the action of the spring 89. Movement of the arm 96 and the pawl and ratchet mechanism 98 and 99 is thus prevented so that the latter, in turn, is prevented from operating the elevator to move the stack of blanks thereon upwardly.

When a number of blanks have been fed off the top of the stack by the feed roller 141, said roller through the weight of the yoke 145, is lowered a slight distance, thus lowering the forward end of the lever 167 the weight of which causes it to descend in engagement with the shaft 142. The sleeve 169' is thus rocked in a counterclockwise direction (Figs. 5 and 9) so that the arm 173 is lowered and the hook 176 is disengaged from the pin 177. The spring 89 and the cam 85 then act through the described connections between the latter and the pawl and ratchet mechanism 98, 99, to operate said mechanism so that the shaft 97 is rotated to raise the elevator and the stack of blanks thereon. The feed roller 141 is thus raised sufficiently by the upwardly moving stack, to lift the arm 173 and again engage the hook 176 with the pin 177. Engagement of said hook with pin 177 will, as before described, prevent operation of the pawl and ratchet mechanism 98, 99 and stop the upward travel of the elevator. When the feed roller 141 again feeds off a sufficient number of blanks from the top of the stack to lower said roller and the arm 167 so that the hook 176 is disengaged from the pin 177, the elevator is again operated to raise the stack, and is thereafter stopped as before described. These operations are repeated intermittently until all of the blanks of the stack have been fed or separated therefrom successively by the roller 141, whereupon another stack of b'anks previously placed in the machine as before described, is ready for automatic separation and elevation, as before described.

The feed roller 141 is preferbly rotated only a sufficient amount to partially withdraw the topmost blank from the stack, and additional means are preferably provided to withdraw the blank completely from the stack after said feed roller has stopped rotating. This additional means is preferably operated and constructed as follows. Fixed on the cam shaft 84, is a spiral gear 178 that meshes with a spiral pinion 179 which is fixed on a shaft 180 extending transversely of the machine and journaled in suitable bearings on the frames 28, 29 near the forward ends thereof.

Fixed on the shaft 180 is a spur gear 181 which meshes with a spur gear 182 that is fixed on a shaft 183. This shaft 183 is journaled in suitable bearings on arms 184 that are fixed in spaced relation on a shaft 185 which extends transversely of the machine and is journa'ed in suitable bearings on brackets 186, 187. These brackets are bolted or otherwise suitably secured on the frame members 26, 27, respectively, and carry the cross memer 145' previously referred to. Fixed on the shaft 185 at one end thereof, is an arm 188 which is connected with one extremity of a spring 189. The opposite extremity of the spring 189 is secured in any suitable manner to the frame member 27. Journaled on the lower end of the arm 188 is a roller 190, the spring 189 acting to continuously maintain said ro'ler 190 in engagement with a cam 191 that is fixed on the cam shaft 84. It will thus appear, that through the arm 188 and roller 190, the spring 189 and the cam 191 act to rock the shaft 185 so that the gear 182 is raised and lowered into and out of engagement with the gear 181 to intermittently drive the shaft 183.

The continuously rotating shaft 180 has fixed thereon at intervals, blank feeding rollers 192 that receive the forward edge of each blank fed by the feed roller 141. Fixed on the shaft 183 are drop rollers 193 which, when a blank is separated by the feed roller 141 and forwarded over the feed rol'er 192, are lowered to engage said blank with the feed rollers 192 which then act to completely withdraw the blank from the stack and deliver it to a blank conveyor to be presently described.

*Feed roller brush, blank conveyor, stop fingers, and side sealing flap bender—Figs. 1a, 2a, 3, 5, 6, 10 and 11*

It has been found that the rubber covered separating and feeding roller 141 becomes coated with fibers, dust, or the like, during its prolonged use in separating and feeding the blanks. Coating of said rol'er in this manner tends to reduce the friction of the surface thereof and to impair the feeding action of the roller. A brush 194 is therefore preferably provided to rotate in engagement with the rubber covered periphery of the roller 141 and thus clean said roller and keep the same clear of particles of fiber, dust, and other extraneous matter. The brush 194 is preferably operated and mounted as follows.

Fixed on the shaft 180 is a sprocket 195 around which passes a chain 196 and also passes around a sprocket 197. The sprocket 197 is secured to or formed integrally with a gear 198 which, together with the sprocket 197, is loosely mounted on the shaft 185. The gear 198 meshes with a gear 200 which is fixed on a shaft 201 that extends transversely of the machine and is journaled in suitable bearings on the brackets 186, 187. Fixed on the shaft 201, is a sprocket 202 around which passes a chain 203 that also passes around a sprocket 204. The sprocket 204 has formed integrally therewith a sprocket 205 which, together with the sprocket 204, is loosely mounted on the shaft 185 and retained against endwise displacement therefrom in any suitable manner. A chain 206 which passes around the sprocket 205, also passes around a sprocket 207 that is fixed on and drives a shaft 208. This shaft 208, which has fixed thereon the brush 194, extends transversely of the machine and is journaled in suitable bearings on the frames 28, 29.

The blank conveyor above referred to, includes pulleys 209 which are loosely mounted on the continuously rotating shaft 180 and retained against endwise displacement therealong in any suitable manner. Passing over the pulleys 209 are tapes 210 which also pass over pulleys 211 that are fixed on a shaft 212 driven by mechanism to be hereinafter described. This shaft 212 extends transversely of the machine and is journaled in suitable bearings on brackets 212' secured to the frame members 26, 27 near the forward ends thereof. The endless elements 210, herein designated as the lower tapes, act in conjunction with a set of upper tapes 213, to feed the blanks forwardly from the feed rollers 192 and the drop rollers 193.

The upper tapes 213 pass around pulleys 214 that are loosely mounted on the shaft 201 and retained against endwise displacement therealong in any suitable manner. Said upper tapes also pass around pulleys 215 which are fixed on a shaft 216 that is driven from the shaft 212 by gearing hereinafter described. The shaft 216 extends transversely of the machine and is journaled in suitable bearings on the brackets 234'. Tapes 210, 213 which, as clearly shown in the drawings, are arranged in substantially horizontal planes, carry the blanks in succession forwardly past blank registering flap bending, and glue applying devices that will be hereinafter described.

After each blank has been separated from the stack and advanced forwardly between the feed tapes 210, 213 said blank is carried in the same direction by the tapes into contact with fingers 217 which stop the movement of the blank at a first registering position in order to get it in timed relation with the machine. It was previously pointed out that the tapes 210, 213 both cooperate in the feeding of the blanks. In order to insure this cooperation of the tapes, tension is maintained thereon by rollers 218, 219 and 220. The rollers 218 bear on the upper reaches of the tapes 213 and are mounted on a shaft 221 at spaced intervals along the same. This shaft 221 is adjustably mounted in brackets such as indicated at 222 (Fig. 1a), said brackets being bolted or otherwise suitably secured on the frame members 26, 27. The rollers 219 engage the lower reaches of the tapes 210 at the under side thereof, and are mounted on a shaft 223 at intervals along the same. The shaft 223 is journaled in brackets 222 and extends below and in parallel relation with the shaft 221. The rollers 220 are mounted on a shaft 224 at intervals therealong, the shaft 224 extending transversely of the machine and being adjustable vertically on, and journaled in, suitable bearings on the brackets 186, 187.

The stop fingers 217 above referred to are withdrawn from the front of the blank at the proper time, to allow the tapes to advance the blank into a second registering position. Said stop fingers are mounted on a rock shaft 225 which extends transversely of the machine and is rocked through the medium of the following devices. The rock shaft 225, see Fig. 6, which is journaled in suitable bearings on brackets 225' secured to the frame members 26, 27, carries at one end an arm 226. The arm 226 has pivotally connected therewith one end of a link 227 the opposite end of which is pivotally connected with the upper extremity of a lever 228. The lever 228 is pivotally mounted in a bracket 229 secured on the frame member 27, and connected with said lever below the pivot therefor, is one extremity of a spring 230. The opposite extremity of spring 230 is secured in any suitable manner to the frame member 27, and said spring acts to hold a roller 231 on the lower end of lever 228, in engagement with a cam 232 that is fixed on the cam shaft 84. It will thus appear that the spring 230 and the cam 232 act, through the described connections for the latter with the shaft 225, to rock said shaft and raise and lower the fingers 217 into and out of the path of travel of the blanks advanced by the conveyor tapes 210, 213.

Movement of the stop fingers 217 is so timed that after a blank is separated from the stack and advanced therefrom to the feed tapes, said fingers move upwardly to engage the front edge of the blank and, as before stated, to stop the blank until it is in timed relation with the various other instrumentalities of the machine. After the blank is so stopped, and at the proper time, the fingers 217 are lowered, whereupon the tapes 210, 213 carry the blank forwardly until its leading edge strikes against stops 233 mounted at the second registering position above referred to. These stops 233 prevent further forward movement of the blank until it has been side registered with respect to, and acted upon by, a flap bender to be hereinafter described. The stops 233 are fixed on a rock shaft 234 which extends transversely of the machine and is journaled in suitable bearings in brackets 234' secured on the frame members 26, 27. The rock shaft 234 also has fixed thereon arms that carry rollers 233' which, during the normal operation of the machine, bear on the lower reaches of the two outer tapes 213 and thus assist in maintaining frictional engagement between the outermost tapes 210, 213 and the blanks, to insure against slippage of the blanks as they are advanced by said tapes.

The shaft 234 is rocked in opposite directions at proper intervals to depress and elevate the stop fingers 233, through the medium of the following devices. Fixed on the rock shaft 234, at one end thereof, is an arm 235 having pivotally connected therewith one end of a link 236. The opposite end of the link 236 is pivotally connected with the extremity of an arm 237 that is pivotally mounted at 238 on one of the brackets 234'. A spring 239, which has its opposite ends connected with the arm 237 and the frame member 27, respectively, acts to hold a roller 240 on the lower end of said arm in engagement with a cam 241 that is fixed on the shaft 84. The above described operating mechanism for the stop fingers 233 is timed to hold said fingers in engagement with the leading edge of the blank until it has been side registered on the tapes 210, 213 and acted upon by the flap bender above referred to.

The blank is side registered to bring it in proper position to be acted upon by the flap bender, and the side registering mechanism is preferably constructed and operated as follows. Bolted or otherwise suitably secured on the frame member 26 is a bracket 242 which is provided at its upper end with a transversely extending guide 243. Mounted in the guide 243 for reciprocating movement transversely of the machine, is a slide 244 that carries on its inner end a longitudinally extending and vertically disposed plate 245. Each blank fed by the tapes 210, 213 projects from one side thereof to engage plate 245 and be side registered thereby after said blank is stopped by the fingers 233. In order to side register the blank, the slide 244 and the plate 245 carried thereby are moved at the proper time by the following devices. Bolted or otherwise suitably secured to, and depending from the forward end of the slide 244, is an arm 246 (Fig. 6) which is pivotally connected with one extremity of a link 247 that extends transversely of the machine. The opposite extremity of the link 247 is pivotally connected with the upper end of an arm 248. The arm 248 is pivotally mounted at 249 on the frame member 27, and said arm has journaled on its lower end a roller 250. The roller 250 engages a cam 251 which is fixed on the cam shaft 84, a spring 252 acting to maintain said roller continuously in engagement with said cam so that the latter acts to rock the lever 248 at proper intervals to move the side registering plate 245 inwardly and outwardly of the machine. The spring 252 has one end connected with the arm 248 above the pivot 249 therefor, the opposite end of said spring being secured in any suitable manner to the frame member 27.

After the blank has been stopped by the fingers 233, the plate 245 is operated by the described connections therefor with the cam 251, to push the blank laterally of the machine against a stop 253 and thereby position the blank in proper relation with the flap bender. Said flap bender then acts to bend up the side sealing flap 19 of the blank for the subsequent application of glue or other adhesive thereto. The stop 253 is mounted on a yoke 254 (Fig. 2a) provided at its opposite ends with arms 255. The arms 255 project inwardly of the machine and are connected together by a plate 256 that extends under one of the sets of tapes 210, 213. The plate 256 is bent upwardly at one side thereof to support the portion of the blank that projects from the adjacent tapes, and assures engagement of the adjacent edge of the blank with the stop 253. The yoke 254 is adjustably mounted at 257 on the top of a bracket 258 that is bolted or otherwise suitably secured to the frame member 27.

After the blank has been registered against the stop 253, a clamp 259 (Figs. 6 and 11) descends and holds or clamps the blank against the turned up edge of the plate 256, thus insuring against accidental displacement of the blank during the operation of the flap bender. The clamp 259 is mounted on arms 260 which are fixed on a rock shaft 261 that is journaled in suitable bearings on the yoke arms 255. The shaft 261 is rocked at proper intervals in opposite directions, to raise and lower the clamp 259, and for this purpose the shaft 261 has fixed thereon an arm 262 that is pivotally connected with one extremity of a link 263. The opposite extremity of the link 263 is pivotally connected with the upper end of an arm 264 that is pivotally mounted at 265 on the frame member 27. The arm 264 has journaled on the lower end thereof a roller 265 which, through the action of a spring 266, is continuously maintained in engagement with a cam 267 that is fixed on the cam shaft 84. The spring 266 is connected with the arm 264 above the pivot 265 therefor, and one end of said spring is secured in any suitable manner to the frame member 27.

The flap bender 268 is fixed on a shaft 269 which, when the blank is clamped on the plate 256, is rocked to move said flap bender upwardly to turn or bend the side sealing flap 19 of the blank angularly with respect to the blank body. Rocking movement of the flap bender is preferably obtained through the medium of the following devices. Fixed on the rock shaft 269 is an arm 270 that has pivotally connected therewith one extremity of a link 271. The opposite extremity of the link 271, Figs. 6 and 11, is pivotally connected with the upper end of an arm 272 pivoted at 265 on the frame member 27. The arm 272 has journaled on the lower end thereof a roller 273 which, through the medium of a spring 274, is continuously maintained in engagement with a cam 275 that is fixed on the shaft 84. The spring 274 has its opposite ends connected with the arm 272 and the frame member 27, respectively.

The described operating devices for the side register plate 245, the clamp 259, and the flap bender 268, are so timed with respect to each other that after said plate registers the blank, the member 259 descends to clamp it on the plate 256, whereupon the flap bender 268 moves upwardly and turns the side sealing flap 19 of the blank in like manner angularly with respect to the blank body. Thereafter, the side register plate 245 moves outwardly of the machine in position to engage the next blank, whereupon the flap bender 268 descends and the clamp 259 is raised. The stops 233, through the action of their described operating devices, then move out of engagement with the front edge of the blank and the rollers 233' are moved into contact with tapes 213 so that said blank, with the side sealing flap 19 thereof turned up, is advanced by the tapes 210, 213 to mechanism for applying glue to the turned up side sealing flap of the blank.

*Low speed feed and drop rollers, and side sealing flap gluing mechanism—Figs. 1a, 2a, 6, 10, and 12 to 19, inclusive*

The carton blank is carried forwardly by the tapes 210, 213, to feed and drop rollers 276 and 277, respectively, which feed the blank at low speed past mechanism hereinafter described that acts to apply glue to the bent up, side sealing flap 19 of the blank. The feed rollers 276 are preferably operated and mounted as follows. Fixed on the shaft 71 (Fig. 4) is a sprocket 278 around which passes a chain 279 that also passes around an idler sprocket 280 (Fig. 10) and a third sprocket 281. The idler sprocket 280 is journaled on an arm 282 that is bolted or otherwise adjustably secured to the frame member 26, and said idler sprocket serves to maintain proper tension on the chain 279. The sprocket 281 is fixed on the shaft 212 which is thus driven by the connections for said shaft with the shaft 71. This shaft 212 has fixed thereon the tape pulleys 211, and said shaft therefore serves to drive the lower conveyor tapes 210. The feed rollers 276 are fixed on the shaft 212 and are also driven thereby.

Fixed on the shaft 212 is a spur gear 283 which meshes with a similar gear 284 that is fixed on the shaft 216. The shaft 216 has fixed thereon the pulleys 215, and it will thus appear that said pulleys and the upper conveyor tapes 213 are driven by the shaft 216 through the described connections therefor with the shaft 212. The shaft 212 also has fixed thereon a spur gear 285 with which is intermittently brought into mesh a spur gear 286. The spur gear 286 is fixed on a shaft 287 that also has fixed thereon the intermittently driven drop rollers 277 which, when lowered, cooperate with the feed rollers 276 to feed the blanks. The shaft 287 is journaled in suitable bearings in the arms 288 of bell cranks 289 fixedly mounted on a shaft 290. This shaft 290 extends transversely of the machine and is mounted for rocking movement in suitable bearings formed in brackets 290'. The brackets 290' are secured on a cross member 329 which, in turn, is secured on brackets 330 carried by the frames 30, 31. The arm 291 of the bell cranks 289 has pivotally connected therewith a spring pressed rod 292 that is suitably guided in the cross member 329 and normally tends to rock the shaft 290 so that the drop rollers 277 are lowered. The drop rollers 277 are raised to receive the blank, however, through the medium of devices that are preferably constructed and operated as follows.

Fixed on the cam shaft 84 is a cam 293 which engages a roller 294 that is journaled on the lower end of an arm 295. The arm 295 is fixed on a rock shaft 296 which extends transversely of the machine and is journaled in suitable bearings on extensions 296' of the brackets 290'. This rock shaft 296 has fixed thereon arms 297 with which are connected the rear ends of springs 298 that act to continuously maintain the roller 294 in engagement with the cam 293. The forward ends of the springs 298 are secured in any suitable manner to the cross member 329. Fixed on the rock shaft 296 is an arm 299 that is pivotally connected with one end of a link 300. The opposite end of the link 300 is pivotally connected with an arm 301 that is fixed on the rock shaft 290. When the low part of the cam 293 engages the roller 294, the arm 295 is rocked by the springs 298 and acts through the described connections for said arm with the arm 301, to rock the shaft 290 and raise the drop rollers 277. At this time, a blank is delivered by the conveyor tapes 210, 213 between the feed and drop rollers 276 and 277, respectively. The roller 294 then rides off the low part of the cam 293, whereupon the arm 295 and the rock shafts connected therewith are rocked in the opposite direction by the high part of cam 293, to lower the drop rollers 277 so that the latter and the feed rollers 276 feed the blank at low speed past the glue applying mechanism now to be described.

Figure 15:
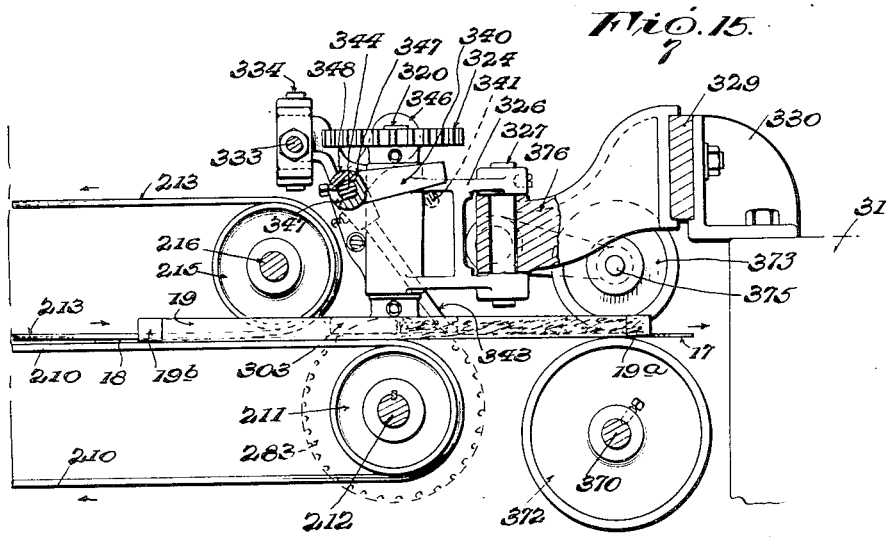
Figure 16:
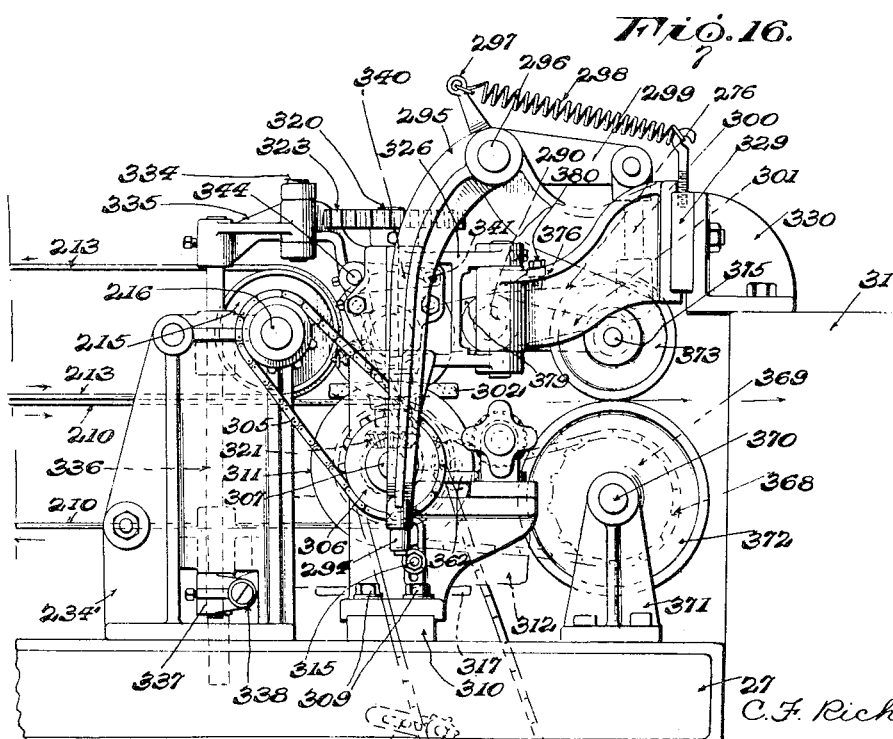
Fig. 16 is an enlarged side elevation of the side sealing flap gluing mechanism, looking from the cam shaft side of the machine.

This glue applying mechanism is arranged forwardly of the tape conveyor 210, 213 and adjacent one end of the feed and drop rollers 276 and 277. These feed and drop rollers operate at low speed to carry the blank in a path such that the angularly bent side sealing flat 19 passes between a glue roller 302 and a pressure roller 303 (Figs. 12, 15 and 16). As the side sealing flap 19 enters between said glue and pressure rollers, the pressure roller 303 moves toward the glue roller 302 and presses the side sealing flap of the blank against the glue roller so that the latter applies glue to the outer face of said sealing flap. After the sealing flap has passed the glue and pressure rollers, the pressure roller is moved away from the glue roller and retained against movement toward the same until the side sealing flap of the next blank passes between said rollers. The glue applying mechanism is thus rendered inoperative when no blank is fed thereto while, at the same time, gumming of the pressure roller and the inner face of the side sealing flap, are prevented.

The glue applying mechanism comprised by the glue roller 302 and the pressure roller 303 (Figs. 12 to 16), is preferably operated and mounted as follows. Fixed on the tape driving shaft 216 at one end thereof, is a sprocket 304 around which passes a chain 305. The chain 305 also passes around a sprocket 306 which is fixed on one end of a short shaft 307 extending transversely of the machine and journaled in a suitable bearing on a bracket 308. This bracket 308 is of general L-shaped configuration, and its vertical arm is bolted or otherwise suitably secured at 309 on a support 310. The support 310 extends transversely of the machine and is bolted or otherwise suitably secured to the frame members 26, 27, at the forward ends thereof. Fixed on the end of the shaft 307 opposite that carrying the sprocket 306, is a glue wheel 311 which runs in a quantity of glue contained in a box 312 carried by the bracket 308. This glue box is supported on a shelf 313 (Fig. 13) provided on its underside with spaced apertured bosses 314 which receive a bolt 315 that extends through an elongated, vertical slot 316 formed in an extension 317 of the brackets 308. The shelf 313 is provided on the inner end thereof, with a clamp 318 which bears against the inner side of the glue box 312 and clamps the latter against the bracket extension 317. For this purpose, the bolt 315 carries on its opposite end, a nut 319 which, when tightened, clamp the glue box and its supporting shelf securely to the bracket extension 317. The glue box 312 and its supporting shelf 313 may be adjusted vertically, through the medium of the bolt 315 and the nut 319.

The glue wheel 311 serves to apply glue to the periphery of the glue roller 302 which, as clearly shown in Fig. 12 is arranged in a horizontal plane and runs in contact with the inner side of said glue wheel. The glue roller 302 is fixed on the lower end of a vertical shaft 320 that is journaled in a suitable bearing on the inwardly and horizontally extending arm of the bracket 308. Said glue roller has secured to or formed integrally therewith, a bevel gear 321 which meshes with a similar gear 322 that is fixed on the shaft 307. The shaft 307 through the described driving connections therefor with the shaft 320, thus serves to drive the latter and the glue roller 302. Fixed on the upper end of the shaft 320, is a spur gear 323 which meshes with a similar gear 324 that is fixed on the upper end of a short vertical shaft 325. This shaft 325 carries on its lower end the pressure roller 303, and is journaled in a suitable bearing on a rocker arm 326. The rocker arm 326 is pivotally mounted at 327, on a bracket 328 carried by the cross member 329 which extends transversely of the machine and is bolted or otherwise suitably secured to the brackets 330. The bracket 328 has a bolt and slot connection 331, 332 with the cross member 329, whereby said bracket 328, the arm 326, and the parts carried by the latter, may be adjusted along the cross member 329 and secured thereto in any desired position of adjustment.

The pressure roller 303 is rocked toward and away from the glue roller 302 at proper intervals, by a cam operated link 333 one end of which is pivotally connected at 334 with the arm 326. The pressure roller 303 is only rocked a slight distance, and the gears 323, 324 are therefore preferably maintained continuously in mesh regardless of the rocking movement of said pressure roller. The end of the link 333 opposite that connected with the arm 326, is pivotally connected at 334' with an arm 335. The arm 335 is fixed on the upper end of a vertical rock shaft 336 that is journaled in suitable bearings on the frame member 27. Fixed on the lower end of the rock shaft 336 is an arm 337 which carries a roller 338. A spring 339 (Fig. 12), the opposite ends of which are connected with the arm 326 and the bracket 308, respectively, acts to continuously maintain the roller 338 in engagement with a cam 339' that is fixed on the continuously rotating cam shaft 84. The cam 339' thus acts through the described parts operated thereby, to swing the pressure roller 303 so that said pressure roller is moved away from the glue roller 302 when the side sealing flap of the blank enters therebetween. Said pressure roller is then moved toward the glue roller to engage said flap with the latter. After the side sealing flap 19 has been glued by the glue roller, the pressure roller is moved away from the glue roller to enable the side sealing flap 19 of the next blank to pass between said rollers. The side sealing flap of the last mentioned blank is then acted on, as before described, and glued in a manner that will be obvious from the foregoing description.

If, for any reason, a blank is not fed to the glue applying mechanism, a detent 340 (Figs. 12 and 14), which is mounted on the arm 326, engages a pin 341 secured at 342 on the bracket 308, thus preventing the cam operated link 333 from moving the pressure roller 303 toward the glue roller 302. The detent 340 thus insures that no glue will be applied to the pressure roller 303 upon failure of the blank feeding mechanism to feed a blank to the glue applying mechanism. When a blank is fed to the glue applying mechanism, however, said blank engages a detector finger 343 and swings said finger upwardly out of the path of travel of the blank. Upward swinging movement of the detector finger 343 rocks the detent 340 upwardly above the pin 341 so that the cam operated link 333 may be actuated to swing the pressure roller 303 toward the glue roller 302 and press the side sealing flap of the blank against the latter. The detector finger 343 is fixed on a rock shaft 344 mounted horizontally in a bearing 345 which is carried by the arm 326 and extends at right angles to the pivot 327 therefor. Said detector finger is provided with a weight 346 that normally tends to rock the shaft 344 so that the detent 340 carried thereby is swung downwardly in line with the pin 341. The detent 340 is fixed on the end of the rock shaft 344 opposite that carrying the finger 343, and rocking movement of the shaft 344 and the parts carried thereby is limited in both directions by shoulders 347 that are formed on the bearing 345 at one end thereof. The shoulders 347 are adapted to be engaged by shoulders 348 formed on the hub of the detent 340.

To insure against the application of excessive amounts of glue to the side sealing flaps of the blank, and also to maintain the glue in circulation and of proper consistency in the glue box 312, said glue box and the wheel 311 running therein are, in accordance with the present invention, preferably constructed as follows (Figs. 17, 18 and 19). Secured to or formed integrally with the longitudinal side walls of the glue box 312, and arranged in spaced relation with the end walls and the bottom of said glue box, is an L-shaped partition 349. This partition is provided in the bottom thereof with openings 350 through which water may circulate in the spaces between the box 312, the partition 349, and the glue receptacle 351. The glue receptacle 351 has secured to or formed integrally therewith legs 352 which support said receptacle on the bottom of the partition 349 and in spaced relation therewith. In order to overcome the tendency of the glue receptacle to move forwardly on rotation of the glue wheel 311, the box 312 is provided near its forward end with inwardly projecting stops 353 for the forward end of said glue receptacle.

Extending longitudinally of the glue receptacle, at opposite sides of the wheel 311, and in spaced relation with the side and end walls of said receptacle, are a pair of vertical, L-shaped partitions 354, 355. The partition 354 is preferably stationary and secured at 356 to the bottom of the glue receptacle 351. The partition 355, however, is mounted on the bottom of the glue receptacle for adjustment toward and away from the glue wheel 311, as by pin and slot connections 357, 358. The partition 355 has adjustably secured thereto, as by pin and slot connections 359, 360, a scraper 361 which extends in proximity to one side of the wheel 311. This side of the wheel contacts the glue roller 302, and by adjusting the partition 355, the scraper 361 will remove excess glue from said side of the wheel 311 and insure application by said wheel of the proper amount of glue to the glue roller 302. A scraper 362 (Fig. 16) may also be provided to remove or scrape the glue from the side of the wheel 311 opposite that acted upon by the scraper 361. This scraper 362 is bolted or otherwise suitably secured to the extension 317 of bracket 308.

Rotation of the glue wheel 311 in the glue receptacle 351, will cause the glue to circulate therein in the direction of the arrows shown in Fig. 17, thus maintaining a proper consistency of the glue and preventing the same from separating into its heavier and lighter constituents. The glue is further maintained of proper consistency by heating and circulating water in the box 312. For this purpose, said box is provided on the bottom thereof with an open ended housing 363 that is riveted or spot-welded to the box 312. Arranged within the housing 363 is an electrical heater 364 which serves to heat the water in the box 312 and thus maintain the glue in the receptacle 351 in proper condition for application to the side sealing flap 19 of the carton blank. This heater 364 may be connected by lead lines 365, 366, with any suitable source of electrical current (not shown).

*High speed feed rollers, blank stopping and registering devices, and carton form conveyor, Figs. 1 to 2a, inclusive, 4, 6, 10, and 20 to 22, inclusive*

After the side sealing flap 19 of the carton blank has received adhesive from the described glue applying mechanism, said blank is received from the feed and drop rollers 276, 277, by high speed rollers to be presently described. These high speed rollers advance the blank at accelerated speed to devices that register it lengthwise and sidewise with respect to one of a series of forms about which the blank is wrapped or folded into a carton. The high speed rollers above referred to are preferably operated and mounted as follows.

Fixed on the tape driving shaft 212 (Fig. 10) is a sprocket 367 around which passes a chain 368 that also passes around a sprocket 369. The sprocket 369 is fixed on a shaft 370 that extends transversely of the machine and is journaled in suitable bearings on brackets 371 that are bolted or otherwise suitably secured to the frame members 26, 27. Fixed on the shaft 370 to be driven therewith from the shaft 212, are a series of high speed rollers 372 that are spaced apart longitudinally of the shaft 370 as clearly shown in Fig. 10. A series of drop rollers 373 cooperate with the rollers 372 to feed the blank at high speed onto a table 374 (Figs. 1 and 20). This table 374 extends horizontally between the frames 30 and 31 and is mounted thereon as hereinafter described.

The drop rollers 373 are fixed on a shaft 375 which is rocked upwardly for entry of the blanks between the rollers 372 and 373. Thereafter, said shaft is rocked downwardly to grip the blank between the rollers 372 and 373 which then act to feed the blanks forwardly onto the table 374. The shaft 375 is journaled in suitable bearings on arms 376 that are loosely mounted on the rock shaft 290 and prevented from endwise displacement relative thereto by any suitable means for this purpose. The shaft 375 and the rollers 373 thereon are positively driven through the medium of a gear 377 that is fixed on the shaft 375 and meshes with a gear 378 which is fixed on the shaft 370.

When the blank has been fed by the feed rollers 276 and the drop rollers 277, between the feed rollers 372 and the rollers 373, the drop rollers 277 are raised by the cam operated arm 301, thereby rocking the bell cranks 289 in a counter-clockwise direction (Fig. 10). These bell cranks have secured to or formed integrally therewith forwardly extending arms 379 that carry pins 380. When the bell cranks 289 are rocked in the direction above stated, the arms 379 are rocked in the same direction so that the pins 380 press downwardly on the arms 376 to likewise press the rollers 373 and the carton blank against the feed rollers 372. The rear of the blank passes out of the rollers 372, 373 at about the time the leading edge of the next blank enters between the low speed rollers 276 and the drop rollers 277. The drop rollers 277 are then lowered to feed the last mentioned blank past the glue applying mechanism, lowering movement of said drop rollers relieving the pressure on the rollers 373 to facilitate the entry of said blank between these rollers and the rollers 372 after it has been fed past the glue applying mechanism.

The table 374 (Figs. 2a and 20) is preferably made in two parts extending in spaced relation horizontally and transversely of the machine and each provided with apertured lugs or bosses 381. Extending through the apertures of said lugs or bosses, are machine screws 382 that are threaded in the walls of suitable openings formed in the frames 30 and 31 and thus serve to support the table 374 thereon. As the blank is fed across the table 374, said blank engages a pair of registering devices 383 which are moving longitudinally in the same direction as the blank to prevent rebound thereof when the same engages said devices. The registering devices 383 are bolted or otherwise suitably secured at 384 on horizontal slides 385 that are arranged for reciprocating movement in suitable guides 386 formed in the table 374. The top horizontal surfaces of the slides 385 are flush with the top surface of the table 374 and together with the latter support the blank thereon.

The blank, when fed horizontally over the table 374 into engagement with the registering devices 383, is moved past a registering position lengthwise with respect to one of a series of travelling forms 387 about which the blank is subsequently folded to form a carton. When the blank is fed past said registering position, the registering devices 383 are moved forwardly of the machine. Thereafter the registering devices 383 move rearwardly of the machine and push the blank in the same direction to the registering position lengthwise with respect to one of the forms 387. The blank, when passing to the table 374 from the high speed rollers, moves under a pair of stop members 388 which are lifted by the blank as it moves forwardly across the path of travel of the form 387. The stop members 388 are lowered after the blank passes the same, and when said blank is pushed rearwardly by the registering devices 383, said stop members engage the rear edge of the blank to prevent it from travelling rearwardly beyond its aforesaid registering position lengthwise with respect to the form about which the blank is subsequently folded. The stop members 388 are pivoted at 390 on vertically disposed brackets 391 that depend from the cross member 329 and are bolted or otherwise suitably secured thereto at 392. The stop members 388 are normally swung downwardly by springs 393 the opposite ends of which are connected in any suitable manner to the brackets 391 and the rear extremities of said stop members.

The registering devices 383 are reciprocated to receive and register the blank as aforesaid, by cam operated links 394, the rear ends of which are pivotally connected at 395 with the forward extremities of the slides 385. The forward ends of the links 394 are pivotally connected at 396 with arms 397 that are fixed on a rock shaft 398. This rock shaft extends transversely of the machine and is journaled in suitable bearings on the rear, vertical guide way 399 for the forms 387. The rock shaft 398 has fixed thereon an arm 400 that is pivotally connected with one end of a link 401. The opposite end of the link 401 is pivotally connected with the upper extremity of an arm 402, (see Fig. 4) the lower extremity of which is pivotally mounted at 403 on the cross member 44.

The arm 402 has journaled thereon a roller 404 which is engaged in the groove of a closed cam 405 that is fixed on a shaft 406 extending transversely of the machine and journaled in suitable bearings on the frames 30, 31 thereof. Fixed on the shaft 406 is a sprocket 407 around which passes a chain 408 that also passes around a sprocket 409 and an idler sprocket 410. The idler sprocket 410 is journaled on an arm 411 that is adjustably mounted in any suitable manner on the machine framework. This idler sprocket serves to maintain the desired tension on the chain 408. The sprocket 409 is fixed on a shaft 412 which extends transversely of the machine and is journaled in suitable bearings on the frames 33, 33' at the tops thereof. Fixed on the shaft 412 are sprockets 413 around which pass chains 414. The chains 414 also pass around sprockets 415 which are fixed on the shaft 59. The shaft 59 thus serves through the described connections therefor with the rock shaft 398, to rock the latter shaft and reciprocate the blank registering devices 383.

After the blank has been registered lengthwise with respect to one of the forms 387, said blank is registered sidewise or laterally with respect to said form. For this purpose, a side registering plate 416 engages one side edge of the blank and pushes the same horizontally to engage its opposite side edge with normally stationary stops 417 that are adjustably mounted at 418 on the table 374. The plate 416 is bolted or otherwise suitably secured to a slide 420 that is arranged for horizontal reciprocating movement in a guide 421. The guide 421 extends laterally of the machine and is bolted or otherwise suitably secured to the table 374 at the underside thereof. The guide 421 is provided in the bottom thereof with a diagonally extending, dove-tailed slot 422 in which is engaged the dove-tailed extension 423 of a block 424. The block 424 extends transversely of the guide 421 and is rigidly secured in any suitable manner on one end of a bent link 425. The opposite end of the link 425 is pivotally connected at 426 with one of the links 394. The side register plate 416 thus receives its motion from the same mechanism that operates the registering devices 383. The dove-tailed connections 422, 423 act when the registering devices 383 are moved forwardly, to move the side registering plate 416 outwardly and horizontally toward one side of the machine. On the other hand, when the registering devices 383 are moved rearwardly to register the blank lengthwise of the form, said dovetailed connections act to move the plate 416 inwardly and horizontally so that the blank is pushed horizontally by said plate against the stops 417 and registered sidewise with respect to the form.

The blank having been properly registered on the horizontally extending table 374, one of the horizontally extending forms 387 engages said blank and forces it between horizontally disposed rollers 427 that act to fold the panels 8, 9 and 10 on said form as the latter passes with the blank between said rollers. A suitable opening 428 is provided in the table 374 for the passage of the form and blank therethrough, the rollers 427 being mounted at opposite sides of said opening in suitable bearings provided by brackets 429 that are bolted or otherwise suitably secured to the table 374 at the under side thereof.

The forms 387 are mounted on base plates 430 which are bolted or otherwise suitably secured to chains 431. In accordance with the present invention, the blank is registered with respect to the form while said blank is disposed horizontally, and the long opposed reaches of the chains 431 extend in vertical planes so that when each form reaches the table 374 said form is projected horizontally from the chains to engage the horizontally disposed blank. This arrangement of the parts just referred to avoids the necessity for turning the blank from a horizontal to a vertical position in order to bring the blank into the path of travel of a vertical form and register said blank with respect thereto. The chains 431 pass around sprockets 432, 433, which are fixed on shafts 434, 435, respectively. The shafts 434, 435 extend transversely of the machine and are journaled in suitable bearings on the frames 30, 31 at the top thereof. The chains 431 also pass around sprockets 436, 437 that are fixed on a shaft 438 and the shaft 412, respectively. The shaft 412, as previously explained, is driven from the shaft 59 which thus serves to continuously drive the chain 431 and the forms 387 carried thereby. Said chains and said forms are guided during movement thereof in vertical planes, by the way 399 and a way 439. The ways 399, 439 are secured together by brackets 46 and a brace 439', said brace being secured to the cross members 39, 40. The ways 399, 439 extend vertically in parallel spaced relation between the frames 30, 31 and 32, 32'. The machine is provided near the top and bottom thereof with short horizontal ways 440, 441 which also serve to guide the chains 431 and the form 387. The way 440 is mounted on brackets carried by shafts 434, 435 which project loosely therethrough. The way 441 is secured to the cross members 39, 40 (Fig. 1).

As each form travels downwardly through the opening 428 in table 374, a blank that has been previously fed onto the table and registered with respect to said form, is forced thereby downwardly through the rollers 427 which fold the panels 8, 9, 10 of the blank around the form, as previously described. When the blank is thus folded around the form, the side sealing flap 19 of said blank is folded onto the top side of said form near one corner thereof, so that the glued surface of said flap is disposed outwardly (Fig. 23). The panel 7 of the blank, at this time, stands in a substantially vertical position above the form which then acts to force the blank downwardly between guide fingers 442 that are arranged immediately below the table 374 and at opposite sides of the path of travel of the form 387. These guide fingers (Figs. 1, 2, 23, and 37) are mounted for adjustment toward and away from each other, and have lugs 443 which project through suitable openings in supports 444. The guide fingers are adjustably mounted on said supports and retained against displacement therefrom, by nuts 445 threaded on the ends of the lugs 443 and engaging opposite sides of said supports. The lugs 443 are secured to or formed integrally with the guide fingers 442 and project horizontally therefrom through the supports 444, as clearly shown in Fig. 23. The supports 444 extend rearwardly and horizontally from the conveyor way 399 and are bolted or otherwise suitably secured thereto, as at 446 (Fig. 1). One set of the fingers 442, as clearly shown in Fig. 23, is shorter than the opposite set, and just before the form 387 passes the shorter set of fingers, the panel 7 of the blank is folded downwardly onto the form and glued to the side sealing flap 19 of the blank by one of a plurality of panel folders which are preferably operated and constructed as follows.

*Panel folders, Figs. 1, 2, 4, and 23 to 27, inclusive*

The panel folders are driven from the shaft 406 (Fig. 4) which, for this purpose, has fixed thereon a bevel gear 447 that meshes with a similar gear 448. The bevel gear 448 is fixed on a short shaft 449 which extends longitudinally of the machine and centrally thereof. This shaft 449 is journaled in suitable bearings on the cross member 44 and a pair of brackets 450 (Figs. 2 and 23), said bracket projecting inwardly and horizontally from the frame 30 and being bolted or otherwise suitably secured thereto. Fixed on the shaft 449 at the end thereof opposite that carrying the bevel gear 448, is a sprocket 451 around which passes a chain 452. The chain 452 also passes around a sprocket 453 which is fixed on a stub shaft 454. The stub shaft 454 is disposed vertically below the shaft 449, said stub shaft being journaled in a suitable bearing on the bracket 450. Bolted or otherwise suitably secured to the chain 452, as at 455, are a plurality of folder supports 456 that are spaced equal distances apart on the chain 452 and have grooves 457 (Fig. 25) in which said chain is received. During movement of the supports 456 with the chain 452, said supports are guided by ways 458. The ways 458 are preferably formed by plates that are bolted or otherwise suitably secured to the opposite, vertical sides of the shaft bearings on the bracket 450. The supports 456 have bolted or otherwise suitably secured thereto, as at 459, brackets 460 which run between the plates of the ways 458 and are provided with laterally extending apertured bosses 461.

Extending through suitable openings provided in the bosses 461, are shafts 462 that project loosely through the apertured bosses 463 of the panel folders 464 and are fixed against rotation, as by pins 475 in the bosses 461. The panel folders 464 have secured to or formed integrally with the opposite ends thereof, folding arms 465 on the free ends of which are journaled folding rollers 466. The panel folders 464 also have secured to or formed integrally therewith between the arms 465, folding arms 467 on the free ends of which are journaled folding rollers 468. Mounted on the shafts 462 are springs 469 the corresponding ends of which are anchored in suitable openings formed in said shafts. The opposite ends of the springs 469 are anchored in suitable openings formed in the panel folders 464. Springs 480, hereinafter referred to, provide for yielding movement of the panel folders when the rollers 466, 468 engage the panels 7 of the blanks and fold them onto the forms 387, as hereinafter described.

Secured to or formed integrally with the panel folders 464, are arms 470 that are provided in their free ends with slots 471. Extending through the slots 471 are bolts 472 that also extend through suitable openings formed in lugs 473 that project from arms 474. The arms 474 are loosely mounted on the shafts 462, at the ends thereof opposite those carrying the springs 469, and said arms are retained in endwise displacement from said shafts by any suitable means for this purpose. Interposed between the lugs 473 and the arms 470, are springs 480 which are mounted on the bolts 472 and retained therewith against displacement from the arms 470, 474, by nuts 481 that are threaded on the shanks of said bolts. By tightening and loosening the nuts 481, tension may be increased or decreased on the springs 480 to thereby pivotally adjust the panel folders with respect to the forms 387 and thus insure proper folding of the blank panels 7 onto said forms. Journaled on the arms 474 are rollers 482 which, during travel of the folders 464 with the chain 452, are maintained, by springs 469, in engagement with a cam 483 that is mounted on bracket 450. This cam 483 extends transversely of the machine from the frame 30, and when each panel folder 464 travels upwardly and inwardly to an upper, curved portion 484 on the inner side of said cam, the roller 482 on the arm 474 engages the cam portion 484 and the panel folder is swung into engagement with the panel 7 of a blank on one of the downwardly moving forms 387. Thereafter, the panel folder travels past the portion 485 of the cam, said portion engaging the roller 482 on arm 474 to swing the arms 465, 467 of the folder outwardly and downwardly so that the panel 7 is folded by the rollers 466, 468 onto the corresponding form 387 and engaged with, and sealed to, the side sealing flap 19 of the carton on said form. As the panel folder and the form continue their downward movement, the roller 482 engages a portion 486 of the cam 483 and the spring 469 swings the panel folder clear of the form and panel with which it has been engaged. In the meantime, the roller 482 of another panel folder 464 has travelled over the cam 483 to the cam portion 484, so that said folder engages another panel 7 of a blank on the next form 387. Thereafter, the last named roller 482 of the panel folder travels over the cam portions 485, 486, as the form 387 moves downwardly, so that said folder folds the corresponding panel 7 on to the form and sealing flap 19 of the carton thereon, swings clear of said form, and then moves upwardly to fold the panel 7 of a carton on another form, as previously described These operations are repeated by the panel folders 464, as the forms 387 with carton blanks folded around three sides thereof, successively pass said panel folders.

After each panel folder 464 has operated to fold a panel 7 as aforesaid, the carton is engaged by a side press mechanism which acts to press the free edge of said panel on the adjacent sealing flap 19. The side press mechanism clamps the carton onto opposite sides of the carton form so that the panel 7 is pressed into engagement with the sealing flap 19 a sufficient length of time to enable the glue to set and thus insure permanent side sealing of said carton. This side press mechanism is preferably operated and constructed as follows.

*Side press mechanism, Figs. 1, 2, 4, and 27 to 36, inclusive*

The side press mechanism is preferably driven from the shaft 412 which, for this purpose, has fixed thereon a bevel gear 487 (Fig. 2). The bevel gear 487 meshes with a similar gear 488 that is fixed on a shaft 489 extending longitudinally of the machine. The shaft 489 is journaled in suitable bearings on brackets 490 (Fig. 27) which are bolted or otherwise suitably secured to and between the frames 32', 33'. Fixed on the shaft 489 is a sprocket 491 around which passes a chain 492 that also passes around a sprocket 493. The sprocket 493 is fixed on a shaft 494 which extends longitudinally of the machine above the shaft 489. The shaft 494 is journaled in suitable bearings formed in brackets 495, which, together with said shaft are mounted for vertical adjustment on brackets 496 that are bolted or otherwise suitably secured to and between the frames 31, 32'. The brackets 496 carry lugs 497 which extend through elongated vertical slots 498 formed in the brackets 495. Threaded on the ends of the lugs 497 are nuts 499 that clamp the brackets 495 to the brackets 496. The nuts 497 and the slots 498 provide for vertical adjustment of the brackets 495 to thereby raise or lower the shaft 494 and the sprocket 493 and increase or decrease the tension on the chain 492, as desired.

Extending transversely of the machine and bolted or otherwise suitably secured to the intermediate frames 32, 32' thereof, is a cross-member 500 (Fig. 1). Bolted or otherwise suitably secured to the cross-member 500 and extending longitudinally of the machine is a short, inverted T-beam 501 (Fig. 27), which projects between and supports a pair of conveyor ways 502. The conveyor ways 502 have bolted or otherwise suitably secured thereto, spacer members 503, 504, 505, the spacer member 503 resting on the top of the T-beam 501 which thus acts to support said conveyor ways from the cross-member 500. The ways 502 are arranged vertically of the machine in spaced relation, and serve as guides for the chain 492 and plates 506, 507 that are bolted or otherwise suitably secured to said chain in alternating relation at intervals along the same. The side press mechanism comprises a plurality of sets of opposed, cam operated carton gripping and clamping jaws 508, 509 that are carried by the chain 492, the jaws 508 being mounted on the plates 506, and the jaws 509 being mounted on the plates 507. The construction and operation of each jaw 508 being identical, it is only necessary to describe one of the same.

Each jaw 508 (Figs. 27 to 33) has secured to or formed integrally therewith lugs 510, 511, 512 which are spaced apart and project inwardly from said jaw. The lug 511 extends between lugs 513 which are secured to or formed integrally with a bracket 514 that is bolted or otherwise suitably secured, as at 515, to one of the plates 506. The lugs 510—513 are provided with suitable alined openings for a shaft 516 that extends through said openings so that the jaw 508 is pivoted on the lugs 513 on bracket 514. The jaw 508 is retained on the shaft 516, by a set screw 517 which is threaded through a suitable opening of the lug 511 and engages the shaft 516. Secured to or formed integrally with the lug 512 and the jaw 508, at one end of the latter, is a plate 518 provided on its forward edge with an angular extension 519. Adjustably mounted in a suitable threaded opening of the extension 519, is a set screw 520 that projects rearwardly of said extension and is retained in any desired position of adjustment thereon by nuts 521. Bearing against the inner end of the set screw 520 is the nose 522 of a rocker arm 523 that is mounted on the shaft 516 and retained against end-wise displacement therefrom in any suitable manner. The rocker arm 523 is provided at the end thereof opposite that having the nose 522, with an apertured boss 524 in which is mounted a stud 525. Rotation of the stud in said boss is prevented by a key 526 on the former which engages in a suitable groove 527 of the latter. The stud 525 is retained in position on the boss 524 by a nut 528 which engages a threaded end 529 of the stud and bears against one end of said boss. A roller 530, which is journaled on the stud 525, engages a cam hereinafter described, to operate the arm 523 so that the nose 522 engages the set screw 520 to swing the jaw 508 when the latter and its companion jaw 509 have travelled to a point where said jaws grip a side sealed carton on one of the forms 387 and clamp said carton to said form.

In order to compensate for wear of the roller 530, and to insure engagement of the nose 522 with pin 520 to swing the jaw 508, the plate 523 is provided in its inner edge portion, with an elongated slot 531 which receives a pin 532 (Fig. 30) that is threaded through a suitable opening formed in the plate 518 at the inner edge thereof. Threaded on the shank end of the pin 532, is a nut 533 which normally bears against one side of the plate or rocker arm 523 and clamps the latter to the plate 518. When the nut 533 is loosened, the rocker arm 523 and the plate 518 may be adjusted relatively, whereupon said nut is tightened to secure said rocker arm and said plate together in the desired position of adjustment.

Each lower jaw 508 preferably has associated therewith a cam operated plate 534 which is moved into engagement with the side portion of a carton and form when the jaw 508 engages the same. This plate 534 prevents bulging of the carton when it is clamped on the form by the press jaws, and said plate is preferably secured, as at 535, 536, to arms 537 and 538, respectively (Figs. 30 and 33). The arm 537 extends between the lugs 512, 513 and is provided with a suitable opening through which extends the shaft 516. The arm 538 is also provided with a suitable opening through which extends the shaft 516, said arm bearing against the lug 510 at the outer side thereof. Threaded in a suitable opening formed in the end of the shaft that carries the arm 538, is a screw 539 which, together with a washer 540, serves to secure an arm 541 on the shaft 516 in cooperative relation with the arm 538. The arm 541 is provided with a suitable opening for the shaft 516 and a suitable recess for the washer 540. Secured to or formed integrally with the arm 538, and projecting outwardly from one side thereof, is a pin 542 that extends through an arcuate shaped slot 543 formed in the arm 541. The arm 541 has journaled thereon a roller 544 which, when engaged by a cam hereinafter described, causes a set screw 545 on said arm to engage the pin 542 on arm 538 so that the arms 537, 538 are swung in one direction to bring the plate 534 into engagement with the side of a form 387 and a carton carried thereby. The screw 545 is threaded through a suitable opening in the arm 541, and wear on the roller 544 may be compensated for by adjusting the screw 545 which also insures that the plate 534 will properly engage the side of the form and the carton thereon.

The jaws 509 (Figs. 34 and 35) are identical in construction and operation and it is therefore only necessary to describe one of the same. Each jaw 509 has bolted thereto, as at 546, a plurality of inner yieldable strips 547 and a strip 548. When the jaw 509 is swung into engagement with a carton on one of the forms 387, the strip 548 yieldably engages the side sealing flap 19 of said carton through the yielding action of the strips 547. Secured to or formed integrally with the jaw 509, are lugs 549, 550, 551 that are arranged in spaced relation and project rearwardly from said jaw. The lug 550 extends between lugs 552 that are secured to or formed integrally with a bracket 553. The bracket 553 is bolted or otherwise suitably secured, as at 554, to one of the plates 507. A shaft 555, which extends through suitable alined openings in the lugs 549—552, serves to pivotally support the jaw 509 on the bracket 553. Said jaw is secured to said shaft, by a set screw 556 which is threaded through a suitable opening in the lug 550 and engages the shaft 555.

Secured to or formed integrally with the jaw 509, is a plate 557 that extends inwardly from the jaw and is provided on its forward part with an angular extension or nose 558. Threaded through a suitable opening in the nose 558, is a stop pin 559 which projects rearwardly of said nose and is secured in any desired position of adjustment thereon, by a nut 560. Engaged with the inner end of the pin 559 is the nose 561 of a rocker arm 562 that is provided with an apertured lug 563 through which extends the shaft 555. The arm 562 has journaled thereon a roller 564 which is engaged by a cam, hereinafter described, to rock said arm so that the latter through engagement of its nose 561 with the pin 559, swings the jaw 509 into engagement with one of the forms 387 and the side sealing flap 19 of a carton thereon. Wear on the roller 564 is compensated for by adjusting the arm 562 relative to the plate 557. This adjustment, together with that provided by the pin 559, also insures proper operation of the jaw 509 to engage the carton and form, and with the jaw 508, securely grip or clamp said carton on said form. Adjustment of the arm 562 is preferably effected by a set screw 565 which extends through an elongated opening 566 formed in the arm 562. This set screw is threaded in a suitable opening formed in the plate 557 and normally clamps said plate to the arm 562.

The cams above referred to, that engage the rollers 530, 564, 544 to swing the jaws 508, 509 and the plate 534, are preferably arranged and constructed as follows. Bolted or otherwise suitably secured to the outer edges of the ways 502, are U-shaped brackets 567 (Fig. 27) that extend transversely of said ways in parallel spaced relation. These brackets 567 have bolted or otherwise suitably secured to the opposite ends thereof spaced, parallel, vertically extending guide rails 568, 569 for the rollers 544, 564 and the roller 530, respectively, (Figs. 27, 28, 30 and 35). Bolted or otherwise suitably secured to the ways 502, as at 570, are lower cam plates 571, 572 with suitable alined openings for the shaft 489 and through which the latter extends. The cam plates 571, 572 are disposed at opposite sides of the path of travel of the press jaws, respectively, the cam plate 571 being provided with a cam groove 573 for the rollers 544, 564, and the cam plate 572 being provided with a cam groove 574 for the rollers 530. Mounted on the shaft 494 between the ways 502 and the brackets 495, are cam plates 575, 576, respectively. The cam plates 575, 576 are adjustable vertically with the shaft 494 and the sprocket 493, the adjustment of these elements, together with the brackets 495, being effected by loosening the nuts 497 and turning set screws 577. The set screws 577 bear against the under sides of the brackets 495 and are threaded in suitable openings formed in bosses 578 secured to or formed integrally with the brackets 496. The parts adjusted by the set screws 577 having been moved to the desired position thereby, nuts 497 and set screws 579 are tightened to hold said parts in said position. The set screws 579 are threaded through suitable openings in the cam plates 575, 576, and normally engage the outer side edges of the way 502. The cam plate 575 is provided on the top thereof with a curved guide surface 580 for the rollers 544, 564, and the cam plate 576 is provided with a cam groove 581 for the rollers 530. As the sets of press jaws 508, 509 travel with the chain 492, said sets of jaws are opened and closed in succession to receive and grip the successive forms 387 and the cartons thereon, travel with said forms and cartons, and thereafter release the same. The sets of press jaws travel continuously in a closed path and operate in conjunction with the continuously moving forms 387, to embrace said forms at the opposite sides thereof and press the panels 7 and the side sealing flaps 19 of the cartons together to insure setting of the glue and production of efficiently side sealed cartons. All of the sets of press jaws operate to press the cartons on the successive forms 387 in like manner and it is therefore only necessary to describe in detail, the operation of one set of said press jaws.

The set of press jaws at the top of the press mechanism, for example, has been moved by the chain 492 so that the press jaw 508 is engaged with the underside of the adjacent, downwardly traveling form 387 and the panel 9 of the carton thereon (Fig. 27). At this time, the press jaw 509 of the set has reached a point substantially in the vertical plane of the shaft 494. During continued movement of the chain 492 and the forms 387, the rollers 530, 544 travel over the curved surfaces of the groove 581 and plate 575 respectively, onto the pair of guide rails 568, 569 that are disposed nearest to the path of travel of the form 387 (Fig. 35). The jaw 508 and the plate 534 are thus thrown squarely into engagement with the bottom and one side of the corresponding form 387, so that the carton on said form is securely held thereon at the sides engaged by said members. In the meantime, the roller 564 travels over the curved surface 580 of the plate 575, onto the guide rail 568 that is nearest the path of travel of the form 387. The jaw 509 is thus swung onto the top of the corresponding form 387 immediately after the folding arm 464 has folded the panel 7 down onto the side sealing flap 19 (Fig. 27). Jaw 509 therefore presses the panel 7 onto the side sealing flap 19 and together with the jaw 508 presses and grips the carton on the form and travels therewith until the glue joint between the panel 7 and the flap 19 has set a sufficient length of time to insure the production of a perfect side sealed carton.

As the set of press jaws and the corresponding form 387 travel downwardly in the machine, they pass the lower cam plates 571, 572 that act to open the press jaws and move them away from the form 387 which continues its downward travel for a certain distance with the side sealed carton thereon. Opening of the jaw 508 and movement of the same away from the form 387 is effected by movement of the chain 492, and travel of the roller 530 in the groove 574 of cam plate 572. When the jaw 508 is disengaged from the form 387 and the carton thereon, the plate 534 is likewise disengaged from said form and carton, and moved away from the same. This is also effected by movement of the chain 492, and travel of the roller 544 in the groove 573 of cam plate 571. The jaw 509 is disengaged and moved away from the form at about the same time as the jaw 508. Disengagement of, and movement of the jaw 509 away from, the form 387 is effected by movement of the chain 492, and travel of the roller 564 in the groove 573 of the cam plate 571. The jaws 508, 509 thereafter travel with the chain 492 upwardly around the sprockets 491, 493 to a position where they are again closed in engagement with another form 387 and carton thereon, as previously described. During upward travel of the press jaws, they are held open through engagement of the rollers 530, 564 with straight guide surfaces provided by the cam plates 571, 572 and a pair of the guide rails 568, 569. At the same time, the press plate 534 is swung a short distance inwardly toward the chain 492, through engagement of the roller 544 with straight guide surfaces provided by the cam plate 571 and one of the guide rails 568.

The forms 387 with side sealed cartons thereon, travel in succession past end flap tucking devices, end flap spreading and gluing devices, and end flap folding devices, that act in the order named to tuck in the end flaps 12, 16, spread and apply adhesive to the end flaps 14, 18, and fold said last named end flaps over the tucked in flaps and onto each other to bottom seal the carton. The end flaps 12, 16 are preferably tucked in during the operation of the press mechanism, and the end flap tucking devices are preferably operated and constructed as follows.

*End flap tucking devices, Figs. 1, 1a, 4, 27, 37 and 38*

Fixed on the driven shaft 412 is a closed cam 582 in the groove of which is engaged a roller 583 (Fig. 4). The roller 583 is journaled on one end of an arm 584 that is pivoted at 585 on a stationary part of the machine. The end of the arm 584 opposite that carrying the roller 583, is pivotally connected at 586 with one extremity of a rod 587. The opposite extremity of the rod 587 has secured to or formed integrally therewith a rack 588 that is arranged for reciprocating movement in a guide 589 (Figs. 4 and 27). The guide 589 is bolted or otherwise suitably secured to the frame 32'. Riveted or otherwise suitably secured to the inner wall of the guide 589 is a spring 590 which bears against the rack 588 and maintains the same continuously in engagement with a spur gear 591 that is fixed on a shaft 592. This shaft 592 extends transversely of the machine and is journaled in suitable bearings on the frames 32, 32' at the rear thereof. Fixed on the shaft 592 is an arm 593 which, through the described connections therefor with the cam 582, is rocked up and down at proper intervals during the operation of the machine. The arm 593 has secured to or formed integrally with the free end thereof a yoke 594 (Figs. 37 and 38) the arms 595 of which carry a shaft 596. Journaled on the shaft 596 between the arms 595 of the yoke 594, is a sleeve 597 which has secured to or formed integrally therewith a yoke 598. Journaled on the arms of the yoke 598, is a flap tucking roller 599 that moves with the arm 593 and tucks in the end flaps 12 of the cartons as the forms 387 carrying the same travel in succession past the swinging arm 593. The roller 599 tucks each end flap 12 between the side flaps 14, 18 and forces said end flap against the end of the corresponding form 387. In order to prevent shock to the roller 599 through its action of pressing the end flaps 12 against the end of the forms 387, the pivotal connection 596 is provided for the roller carrying yoke 598, and a spring 598' is interposed between the yoke 594 and a lug 599' on the sleeve 597. One end of the spring 598' is anchored in a recess on an inclined surface 600 of the yoke 594 (Fig. 38), the opposite end of said spring being guided on and held in position by a pin 601 that is secured to or formed integrally with the lug 599'.

The tucking device for the end flaps 16 of the cartons is preferably comprised by the upper end or nose 602 of a plate 603 (Figs. 1 and 37). The nose 602 of said plate acts to tuck in the flap 16 of each carton after the flap 12 has been tucked in and during travel of the carton carrying form downwardly past the plate 603. This plate 603 is positioned vertically a slight distance to the rear of the forms 387, said plate being provided with hooks or brackets 604, 605 that project rearwardly and upwardly from the plate. The hook 604 is adjustably secured, as by a nut 606 threaded thereon, to the cross member 500. The hook 605 is adjustably secured, as by a nut 607 threaded thereon to a cross member 608 that is bolted to the frames 32, 32' rearwardly thereof and below the shaft 59. The vertical portions of the hooks 604, 605 extend upwardly through suitable openings formed in the cross members 500 and 608 respectively, the nuts 606, 607 engaging the top of said cross members and providing for vertical adjustment of the plate 603 and its tucking nose 602, as desired.

The end flaps 14, 18 project from the panels 8, 10 substantially in the planes thereof when the end flaps 12, 16 are tucked between the first named end flaps, as above described. Immediately after the end flaps 12, 16 of each carton are tucked between the end flaps 14, 18 thereof, the last named flaps engage outwardly curved portions 609 of the plate 603. The plate portions 609 engage the end flaps 14, 18 and spread them out substantially at right angles to the panels 7, 10 of the carton. The plate 603 thereafter acts to hold the flaps 12, 16 tucked in and the flaps 14, 18 spread outwardly, as the form 387 travels downwardly to mechanism for applying glue to the spread out flaps 14, 18.

*End flap gluing mechanism, Figs. 1, 1a, 4 and 37*

The mechanism for applying glue to the spread out end flaps 14, 18 of the carton, is preferably operated and constructed as follows. Fixed on the shaft 59 is a spur pinion 610 (Fig. 4) which meshes with a spur gear 611 that is fixed on a shaft 612. The shaft 612 extends transversely of the machine and is journaled in suitable bearings on the frames 32, 32' at the rear thereof. Fixed on the shaft 612 are a pair of glue wheels 613 between which and a pair of pressure rollers 614, the carton flaps 14, 18 pass to receive glue from said glue wheels. Pressure rollers 614 are journaled on the lower ends of arms 615 that are pivotally mounted at 616 in suitable spaced bearings carried by the cross member 500. Springs 617 which have their opposite ends connected with the arms 615 and brackets 618 on the frames 32, 32' urge the pressure rollers 614 toward the glue wheels 613 so as to maintain the end flaps 14, 18 in engagement with said glue wheels. The pressure rollers are held in spaced relation with the glue wheels by stop lugs 616', 616' formed on the upper portions of arms 615, 615 adjacent the pivots 616, 616. The lugs 616', 616' engage adjustable set screws that are supported in any suitable manner on the frames 32, 32'. The springs 617 yield sufficiently to enable the flaps 14, 18 to pass between said pressure rollers and said glue wheels.

The glue wheels 613 run in a glue receptacle 619 which contains glue or other adhesive that adheres to the peripheries of said wheels as they rotate in said receptacle. This glue receptacle 619 is mounted on brackets 620 that are bolted or otherwise suitably secured to the frames 32, 32' and 33, 33' at the rear thereof (Figs. 1 and 1a). Mounted in any suitable manner on the brackets 620, is a support 621 that extends transversely of the machine rearwardly of the gear 611 and the glue wheels 613. Bolted or otherwise suitably secured to the support 621 are depending guides 622 (Fig. 1a) in which are mounted for vertical reciprocating movement, slides 623 having secured to or formed integrally therewith racks 624. Meshing with the racks 624 are spur pinions 625 that are fixed on a shaft 626 journaled in suitable bearings on the bracket 620. The shaft 626 is provided with a hand wheel 627 that may be rotated to raise or lower the slides 623 and the glue receptacle 619 mounted thereon. For this purpose, slides 623 are provided with horizontally extending arms 628 connected together by a cross piece 629. The cross piece 629 has bolted or otherwise suitably secured thereto, a clip comprising four arms 630 extending at right angles to each other and engaged over the sides of the glue receptacle 619 near the bottom thereof. In order to remove the glue receptacle, the hand wheel 627 is turned to lower the slides 623 until the glue wheels 613 clear the top of said receptacle. The glue receptacle may then be removed from the above mentioned clip, filled with glue, and replaced in said clip. Thereafter, the hand wheel 627 may be turned in the proper direction to raise the slides 623 until the glue wheels 613 dip into the glue in said receptacle.

Slidably mounted on the cross member 621 are blades 631 which engage the sides and circumferences of the glue wheels 619 to scrape the surplus glue therefrom. These scraper blades 631 have threaded connections with screw shafts 632 which are journaled in suitable bearings on the cross member 621. The bearings for the screw shafts 632 are constructed to prevent endwise movement of said screw shaft, while at the same time providing for rotation thereof. Fixed on the screw shafts 632, are hand wheels 633 which may be rotated to adjust the scrapers 631 toward or away from the glue wheels 613 and thereby regulate the amount of glue carried on the peripheries of said glue wheels.

Forms 387 with cartons thereon pass the glue wheels 613 which apply glue to the end flaps 14, 18 of said carton, as before described. After the forms and cartons pass the glue wheels, the end flaps 12, 16 of said cartons are held in engagement with the forms by a curved guide rail 634 (Figs. 1, 4, 37 and 39) arranged in the line of travel of the forms so as to engage the end flaps 12, 16 therewith, as aforesaid. The guide rail 634 is supported on brackets 635, 636 that are bolted or otherwise suitably secured to cross members 637 and 638, respectively. The cross members 637, 638, in turn, are bolted or otherwise suitably secured to the frames 33, 33' at the rear and bottom thereof, respectively. The lower, forward end of the guide rail 634, is cut away, as at 639, to provide for the operation of devices that fold in the end flaps 14, 18 of the carton on to the tucked in end flaps 12, 16 thereof. These end flap folding devices are preferably operated and constructed as follows:

*End flap folders, Figs. 1, 2, 4, and 39 to 42, inclusive*

Fixed on the shaft 412 is a sprocket 640 around which passes a chain 641 that also passes around a sprocket 642 (Fig. 4). The sprocket 642 is fixed on a shaft 643 which extends transversely of the machine at the bottom thereof and is journaled in suitable bearings on brackets carried by the cross member 638. Tension on the chain 641 may, if desired, be maintained by an idler sprocket 644 that is adjustably mounted in a bracket 645 (Fig. 1) bolted or otherwise suitably secured to the cross member 35 and the cross member 638. Fixed on the shaft 643 at the opposite ends thereof, are bevel gears 646 which mesh with similar gears 647 that are fixed on short vertical shafts 648 near the upper ends thereof. The shafts 648 are journaled in suitable bearings on brackets carried by the cross member 638. Fixed on the shafts 648 near the lower ends thereof, are sprockets 649 around which pass chains 650 that also pass around sprockets 651. It will be observed, upon inspection of Figs. 1, 4 and 39 of the drawings, that one of the chains 650 is longer than the other. This difference in length of the two chains results from the location of one of the end flap folders in advance of the other so that they fold in the end flaps 14, 18 successively, in the order named.

The end flap folders are operated by connections therefor with the sprockets 651. These sprockets 651 are adjustably mounted at 652 (Fig. 40) on the upper faces of plates 653 that are fixed on short vertical shafts 654 at the lower ends thereof. The adjustment provided for the sprockets 651 and 652, enable said sprockets to be turned in either direction about the shafts 654 to get the end flap folders in timed relation with the machine. Thereafter, the sprockets 651 are secured in position on the plates 653 to rotate with the latter and the shafts 654 through the driving action of the chains 650. The shafts 654 are provided near the upper ends thereof with collars 655 that support said shafts in suitable bearings formed in sleeves 656 that depend from cam plates 657 and are preferably formed integrally therewith. The cam plates 657 are supported on brackets 658 which are bolted or otherwise suitably secured to the frames 33, 33' and extend inwardly of the machine from the bottom thereof. Said cam plates may be adjusted laterally of the machine by pin and slot connections 659, 660 between the cam plates and the brackets 658. The cam plates 657 are therefore held stationary on the brackets 658, the shafts 654 rotating in the bearings provided by the sleeves 656 of said plates.

Fixed on the upper ends of the shafts 654 to rotate therewith, are arms 661 provided therein with elongated slots 662. The slotted ends of the arms 661 engage over rollers 663 which are journaled on slides 664 and depend therefrom into the cam grooves 665 of cam plates 667. The slides 664 move both transversely and longitudinally of the machine, and their outer ends project through elongated slots 666 formed in the frames 33, 33'. The slides 664 are arranged for transverse reciprocating movement in guides 667 that also extend transversely of the machine. The guides 667, however, are mounted for reciprocating movement longitudinally of the machine with the slides 664, on rods 668 carried by ears 669 extending upwardly from the brackets 658 and secured to or formed integrally therewith. The slides 664 are provided at their inner ends with screw threaded openings which receive bolts 670 that clamp wedge blocks 671, 672, and bars 673, 677 on said inner ends of the slides 664, (Figs. 41 and 42). Said blocks, and bars are provided with suitable openings for the bolts 670, and the blocks 671 have downwardly extending flanges 674 which engage over the opposite side edges of the slides 664. The blocks 671 are open, frame like structures, the top surfaces of which are inclined at 675 to engage the correspondingly inclined surfaces 676 of the wedge blocks 672. The blocks 671, 672 are wedged between the opposed surfaces of the slides 664 and the bars 677. The bars 673, which extend transversely of the slides 664, rest on the bars 677 and are secured thereto by the bolts 670. The arms 678 have downwardly extending flanges 678' which engage the opposite ends of the blocks 671, 672. One set of arms 678 has journaled thereon knife edge folding rollers 679 that fold in the end flap 14, of the carton when said rollers are reciprocated transversely and longitudinally of the machine with one of the slides 664. The other set of arms 678 has journaled thereon a roller 679' that folds in the end flap 18 when said roller is reciprocated transversely and longitudinally of the machine with the other slide 664.

Secured to or formed integrally with the bars 673, are blocks 680 in which are slidably mounted rods 681. The rods 681 therefore move transversely and longitudinally of the machine with the slides 664 and the rollers 679, 679'. The rods 681 project inwardly beyond said rollers, and carry plates 682. The plates 682 engage the sides of the forms 387 and cartons thereof, and thus prevent bulging of said cartons while the flaps 14, 18 thereof are being successively folded in to close the ends of the cartons. In order to avoid the possibility of shock to the plates 682 incident to engagement of the same with the carton carrying forms 387, said plates and the rods 681 are yieldably mounted on the blocks 680 as follows. Threaded into suitable openings in the bars 673, are vertical pins 683 to which to which are secured the inner ends of springs 684. The outer ends of said springs are secured to collars 685 that are keyed on the rods 681 at the outer ends thereof. Rigidly secured in any desired position of adjustment on the rods 681, and intermediate the opposite ends thereof, are collars 686 which, through the action of the springs 684, normally engage the outer ends of the blocks 680 and thus maintain the plates 682 at proper distances inwardly of the machine and in advance of the folding rollers 679. When the plates 682 are engaged with the forms 387 and the cartons thereon, however, said plates move outwardly of the machine a slight distance relative to the slides 664, and against the action of the springs 684. This outward yielding action of the plates 682 avoids this possibility of damage to said plates and the cartons when the plates are moved into engagement with said cartons and the forms carrying the same.

During the operation of the machine, the slides 664, through the described connections therefor with the rotating arms 661 and the stationary cams 667, are reciprocated transversely and longitudinally of the machine and thus impart like motion to the plates 682 and the folding rollers 679, 679'. When a form 387 with a carton thereon passes the glue wheels 613, said wheels apply glue to the corresponding surfaces of the outwardly spread flaps 14, 18 of said carton. In the continued travel of the form and carton beyond the glue wheels 613, the tucked in end flaps 12, 16 of the carton are held in position against the end of the form by the guide rail 634. When the form and carton thereon reach the cutaway portion 639 of said guide rail, the slide 664 of the rearmost end flap folding mechanism moves inwardly until the plate 682 thereon engages the panel 8 of the carton and presses it against the form 387 carrying the same. The end folding rollers 679 of said mechanism, however, continue to move inwardly under the action of its slide 664, thus engaging the glued end flap 14 of the carton and folding it in and sealing it on the tucked in end flaps 12, 16 thereof. During the pressing and folding action of the plate 682 and the rollers 679 on the carton panel 8 and the end flap 14, said plate and rollers move forwardly of the machine with the form 387 and carton thereon, until the folding of the flap 14 of said carton is completed.

Thereafter the slide 664, through the described connections therefor with the cam plate 657 and the corresponding shaft 654, moves outwardly and rearwardly of the machine as indicated by dot and dash lines $a$ and $b$ (Fig. 39), thus carrying the presser plate and folding rollers away from the form and back to a position from which they may be moved inwardly and forwardly of the machine to press and fold the panel 8 and flap 14 respectively of the carton on the next form 387. In the meantime, the preceding form with three end flaps of a carton thereon folded in, reaches the foremost end flap folding mechanism the slide 664 of which moves inwardly of the machine so that the plate 682 of said mechanism engages the panel 10 of the carton and presses it on the same. The folding rollers 679' of this mechanism continue to move inwardly a slight distance and then forwardly with the plate 682, as in the case of the first named end flap folding mechanism. The inward and forward movement of the presser plate and folding rollers 679' of the foremost end flap folding mechanism, causes said rollers to fold in the glued end flap 18 of the carton onto the folded in flap 14 thereof.

Thereafter, the plate and rollers of the foremost end flap folding mechanism are moved outwardly and rearwardly to a position from which they may be engaged with the carton on the next form to clamp the panel 10 and fold in the flap 18 of said carton on said form. It will thus appear, that as the forms 387 travel in succession past the end flap folding devices, the cartons on said forms are successively bottom sealed. The forms 387 and bottom sealed cartons thereon, after travelling past the end flap folders, are engaged at the ends by a curved guide 687 the lower extremity of which is cut away at 688 to provide for operation of the foremost end flap folding mechanism, as just described. The guide 687 is bolted or otherwise suitably secured to the machine framework, and holds the glued flaps of the cartons together as they travel with the forms 387 along said guide. Thereafter, the sealed ends of the cartons are pressed against the forms to insure perfect sealing, by an end press mechanism which extends vertically of the machine at the front thereof. This end press mechanism, together with means for blowing the cartons off the form, will now be described in detail.

*End press mechanism, and carton blower, Figs. 1, 2, and 4*

Fixed on the shaft 438 is a sprocket 689 around which passes a chain 690 that also passes around a sprocket 691. This sprocket 691 is fixed on a short shaft 692 that is journaled in suitable bearings on the lower end of a vertical press frame 693 (Fig. 1). The press frame 693 is supported on cross members 694 which extend transversely of the machine and are bolted or otherwise suitably secured to the frames 30, 32 at the forward ends thereof. The press frame 693 is yieldably mounted on the cross bars 694, as by bolts 695 and springs 696 (Fig. 2). The bolts 695 extend loosely through suitable openings formed in the cross bars 694 and the frame 693, the headed ends of said bolts bearing against the rear and front faces of said frame and said cross bars, respectively. The springs 696 are arranged on the bolts 695 between said cross bars and said press frame.

Fixed on the shaft 692 is a spur gear 697 which meshes with a similar gear 698 that is fixed on a shaft 699. The shaft 699 is journaled in suitable bearings on the press frame 693 at the lower end thereof. Fixed on the shaft 699 is a pulley 700 around which passes a belt 701. The belt 701 also passes around a pulley 702 that is fixed on a shaft 703. The shaft 703 is journaled in suitable bearings on the frame 693 at the top thereof, and may be adjusted vertically with the pulley 702 by any suitable means for this purpose, to thereby maintain the proper tension on the belt 701. The press frame 693 has journaled thereon at intervals along the same, a series of rollers 704 that bear against the rearmost reach of the belt 701 and press it against the ends of the sealed cartons as the latter and the forms 387 carrying the same successively pass upwardly in engagement with said belt.

The forms 387 are channeled out longitudinally thereof to provide air ducts through which air is blown to eject the cartons from the forms as they pass the upper end of the belt 701. The means for blowing the cartons from the forms is preferably driven from the shaft 53 which, for the purpose, has fixed thereon a large spur gear 705 (Fig. 4). The spur gear 705 meshes with a spur pinion 706 that is fixed on a fan shaft 707 carrying a fan 708. The fan 708 is enclosed in a fan housing 709 having bearings for the shaft 707 and an outlet 710. The fan housing 709 has secured to or formed integrally therewith brackets 711 that are bolted or otherwise suitably secured to cross members 712. The cross members 712 extend transversely of the machine and are bolted or otherwise suitably secured to the frames 30, 31 on the tops thereof. The fan 708 delivers an air blast through the outlet 710 past which the base plates 430 of the forms 387 travel upwardly beyond the press belt 701. The base plates 430, as well as the forms 387, having openings therein through which blasts of air are directed from the fan outlet 710 to blow the bottom sealed cartons off the forms into a chute 713 (Figs. 1 and 4.) This chute 713 delivers the bottom sealed cartons to any suitable point or points for subsequent filling, weighing and top sealing of said cartons.

During travel of the forms 387 and cartons along the end press mechanism 701, 704, the cartons are pressed onto the sides of the forms by rollers 713ª (Figs. 1 and 2). The rollers 713ª are journaled on the forward ends of brackets 713ᵇ that extend horizontally from the conveyor way 439 and are bolted or otherwise suitably secured thereto at 713ᶜ. The rollers 713ª press the cartons against the opposite sides of the forms 387 to insure engagement of the end flaps 13, 17 of said cartons with the following described means for bending out said flaps against the sides of the cartons. Bending of the flaps 13, 17 removes the "spring" therefrom, enables the cartons to be more readily handled and filled, and eliminates the necessity for having to bend said flaps by hand to insure proper delivery of goods into said cartons during filling and weighing of the same. As the forms 387 with bottom sealed cartons thereof, travel upwardly past the end press belt 701 and rollers 704, 713ª, the end flaps 13, 17 of the cartons (which extend in proximity to the bases of said forms) are preferably folded out against the side panels 8, 10 of the cartons by stationary folders 714 (Figs. 1 and 2). The folders are inclined upwardly and forwardly of the machine and their lower ends are provided with curved, flap engaging noses 715. The folders 714 are mounted on brackets 716, 717 which project forwardly from the conveyor way 439 and are bolted or otherwise suitably secured thereto. The flap engaging noses 715 of the folders 714 are engaged by the flaps 13, 17 of the cartons, and as the forms 387 carrying said cartons travel upwardly in the machine said flaps are folded outwardly against the sides of the forms and cartons by the folders 714. Thereafter, the forms with the cartons thereon, travel upwardly past the upper end of the press belt 701 and are blown off the forms into the chute 713, as previously described.

As the cartons are blown off of the forms 387, the latter continue their travel upwardly and rearwardly of the machine, and then downwardly through the table 374 to successively engage blanks thereon that are folded around and sealed on the forms, as previously described. The various movable parts of the machine may be controlled by the previously described manually operated mechanism for starting and stopping the machine. A separate and independent manual control for the pile elevator is also provided and this, together with automatic control mechanism for the entire machine, will now be described in detail.

*Control mechanism Figs. 1 to 4 inclusive, 6, 7, 10 and 37*

The pile feeder 6 may be stopped for reloading or other purposes, without having to stop the operation of the entire machine. The mechanism for thus stopping the pile feeder provides for again starting and automatically operating it, as previously described. Said mechanism is preferably manually controlled, and operated and constructed as follows. Pivotally mounted, as at 718, on the extension or bracket 156 of the yoke 145, is an arm 719 provided at its free end with a cam 720 (Figs. 2a, 3 and 7). The arm 719 normally stands in a forwardly and downwardly inclined position so that the cam 720 is disposed below and in spaced relation with the inner side face 721 of a collar 722 on the shaft 142. This collar 722 is provided circumferentially thereof with the groove 151 which receives the pins 152 of the clutch operating lever 154. The clutch member 150 operated by said lever, is secured to or formed integrally with the sleeve 152 that carries the collar 722.

Pivotally connected, as at 723, with the arm 719 is one extremity of a link 724. The opposite extremity of the link 724 is pivotally connected as at 725, with an arm 726 that is fixed on a shaft 727. This shaft 727 extends transversely of the machine and is journaled in suitable bearings on the frames 26, 27 thereof. The opposite ends of the shaft 727 project outwardly beyond the frames 26, 27 and carry handles 728 for rocking said shaft to impart like motion to the arm 719 and the cam member 720 carried thereby. When the arm 719 is rocked in one direction, the cam 720 engages the face 721 of the collar 722 and forces the latter, together with the clutch member 150 and the sleeve 152, to the left (Fig. 7) so that said clutch member is disengaged from the clutch member 148. In this event, the pile feeder 6 can no longer be operated automatically, and is thus rendered temporarily inoperative with respect to the remainder of the machine. The pile elevator, however, can under these conditions, be lowered manually, as by turning the hand wheel 97', whereupon the pile feeder may be reloaded and elevated by turning said hand wheel to bring the pile of sheets in proper position for subsequent separation of the sheets and automatic elevation of the pile, as previously described.

When automatic separation and feeding of the blanks and stack is to be resumed, the arm 719 is lowered out of engagement with the collar 722, by turning either of the handles 728 in the proper direction. The arm 719 and the parts connected therewith, are held in their inoperative and operative positions, respectively, by a spring detent 729 (Fig. 1a) the bent, free end of which is adapted to engage one or the other of a pair of notches 730 formed on the upper extremity of an arm 731 that is fixed on the shaft 727. The arm 731 is preferably mounted on the end of the shaft 727 that projects outwardly from the frame 26. This frame has bolted or otherwise suitably secured thereto a block 732 that carries the spring detent 729.

In accordance with the present invention, improved means are provided for automatically stopping the machine in case of a jam or double feed of blanks by the separator roll 141 to the stop fingers 217, or in the event a bottom sealed carton is not blown off the forms 387 carrying it, or in case a bottom sealed carton is only partially blown off the form and tends to travel beyond the chute 713 with said form. The means for automatically stopping the machine, under the conditions stated, are preferably controlled by the blank or carton, as the case may be, and are preferably operated and constructed as follows. Extending transversely of the machine and journaled in suitable bearings on the forward ends of the frame 26, 27, is a shaft 733 (Figs. 1a and 4). This shaft 733 has fixed thereon an arm 734 the lower free end of which is pivotally connected with one extremity of a bent link 735. The opposite extremity of the link 735 is pivotally connected with the upper free end of an arm 736 that is fixed on a shaft 737 (Figs. 1a and 2a). This shaft 737 extends transversely of the machine over the shaft 225 that carries the stop fingers 217, the shaft 737 being journaled in suitable bearings on the brackets 225'. Fixed on the shaft 737 are forks 738 which are arranged in vertical alinement with the stop fingers 217. The fingers 217 move upwardly between the forks 738 to stop the sheet as before described, and said forks are normally disposed in a plane spaced with respect to the plane of the lower reaches of the conveyor tapes 213 so as to provide for the passage of a single blank only past said forks. If a blank is crowded or jammed between the fingers 217 and the forks 738, or if more than one blank at a time is fed between said fingers and forks, the latter are lifted and thus rock the shaft 737 so that the link 735 is moved rearwardly of the machine. Rearward movement of the link 735 causes the arm 734 to swing rearwardly, thus rocking the shaft 733 so that a detent 739 fixed thereon is moved upwardly out of engagement with a notch 740 formed in the upper end of a lever 741. This lever 741 is pivoted at 742 on a bracket 743 that is bolted or otherwise suitably secured to a cross member 744 (Fig. 1). The cross member 744 extends transversely of the machine, and is bolted or otherwise suitably secured to the frames 30, 31 at the rear thereof. The lever 741 has connected therewith above its pivot 742, one extremity of a spring 745. The opposite extremity of the spring 745 is connected with a small bracket 746 bolted or otherwise suitably secured to the frame 31 at the bottom and rear thereof. In the normal operation of the machine, the spring 745 is under constant tension and holds the notch 740 of the lever 741 in engagement with the detent 739. When the detent 739 is lifted, however, the spring 745 rocks the lever 741 in a clockwise direction (Fig. 4) so that a fork 747 on said lever engages a block 748 on the rod 66 and shifts said rod to swing the lever 64, disconnect the clutch 60, 68, and stop the operation of the machine. When the trouble in the machine has been remedied, and it is desired to resume or start the operation of said machine, the rod 66 is shifted manually to rock the lever 64, engage the clutch parts 60, 68, and thus set the machine in operation. The lever 741 is thus rocked in a counterclockwise direction (Fig. 4) so that a curved guide 749 which has supported the detent 739 in its raised position, moves in said direction until said detent drops into the notch 740 of said lever. It is obvious that when the lever 741 is reset to again engage the detent 739, tension will be created on the spring 745 to hold the parts in the position thereof shown in Fig. 4. The shaft 733 and parts carried thereby, the shaft 737 and parts carried thereby, and the connections between said shafts, are spring balanced as hereinafter described, so that when the clutch 60, 68 is engaged, the lever 741 is rocked to engage the notch 740 with the detent 739 and move said shafts and parts to the full line positions thereof shown in the drawings. The blanks may then be fed singly in succession to and past the stop fingers 217 and the forks 738.

In accordance with the present invention, the automatic control or detector mechanism just described, has connected with the clutch operating mechanism thereof, means for automatically throwing out the clutch and stopping the machine in the event a sealed carton is not blown off the form carrying it, into the chute 713. This means, which prevents sealed cartons from traveling back through the machine and consequently causing possible damage thereto, is preferably operated and constructed as follows. Fixed on the shaft 733 is an arm 749' having pivotally connected therewith, as at 750, one extremity of a link 751. This link 751 extends forwardly of the machine and has its opposite extremity pivotally connected, as at 752, with a horizontally extending arm 753. The arm 753 is fixed on a rock shaft 754 that is journaled in suitable bearings on a bracket 755 (Fig. 1) bolted or otherwise suitably secured to one of the upper, horizontally extending conveyor ways 440. Connected with the arm 753 is one end of a spring 756 the opposite end of which is connected with a bracket 757 bolted or otherwise suitably secured to one of the conveyor ways 440. This spring 756 acts, through the described connections therefor with the shafts 733 and 737, to balance said shafts so that the detent 739 is normally held downwardly in engagement with the lever 741, and the forks 738 are normally held downwardly in position to permit the passage of blanks singly in succession to and past said forks and the stop fingers 217.

Fixed on the shaft 754 is a finger 758 that is normally projected by the spring 756 into grooves 759 of the forms 387 that travel past said finger. In the event a carton is not blown off one of the forms, said carton engages the finger 758 and forces the same outwardly to thus rock the shaft 754 and the shaft 733 so that the detent 739 is lifted out of engagement with the notch 740 in the lever 741. The spring 745 then acts, as before described, to swing the lever 741, shift the rod 66, rock the lever 64, and disconnect the clutch 60, 68 to stop the operation of the machine. The carton that has engaged the finger 758 is then removed from the form carrying said carton, whereupon the machine may again be started by shifting the rod 66 to connect the clutch parts 60, 68. It will thus appear, that by the mechanism just described, cartons which have been bottom sealed but not blown off the forms carrying them, are prevented from reentering the machine to cause possible jamming or defective operation thereof.

In accordance with the present invention, the clutch operating mechanism connected with the forks 738 and finger 758, is also connected with means at the entrance to the chute 713, that acts in the event of a jam at said chute caused by failure of the carton to be completely blown off the form, to stop the operation of the machine immediately. Said means is preferably operated and constructed as follows. Pivotally connected at 752 with the arm 753, is one extremity of a link 751'. The opposite extremity of the link 751' is bent into a hook 760 or the like that is connected with a vertically extending plate 761 formed on or secured to a horizontally extending section 762 of the chute 713. The chute section 762 is pivoted, as at 763, on the chute 713 at the top thereof, and a carton that is only partially blown off a form into said chute acts, in the continued upward travel of the form and carton, to swing the chute section 762 upwardly and pull the link 751' forwardly. The arm 753 is thus rocked forwardly and acts, through the described connections for said arm with the shaft 733, to rock said shaft and lift the detent 739 out of engagement with the notch 740 of the lever 741. The spring 745 and the lever 741 then act to disengage the clutch 60, 68 and stop the operation of the machine. When the jammed carton at the chute 713 has been removed, the machine may be started by shifting the rod 66 to connect the clutch 60, 68.

It will of course be understood, that when the rod 66 is shifted to connect the clutch 60, 68 the lever 64 acts through the rod 66 and the block 748, to swing the lever 741, create tension on the spring 745, and provide for reengagement of the detent 739 with the notch 740 in the upper end of said lever.

Operation

The operation of the machine will be clearly understood from the foregoing and may be briefly summarized as follows. The carton blanks 5 are supported in a vertical stack or pile such as indicated at 131 which is fed upwardly by the automatically operated elevator 6. Said blanks are fed laterally in succession flatwise from the top of the stack, by the feed roller 141. As each blank is removed from the stack, it passes between the feed and drop rollers 192, 193. These rollers deliver the blank between the inner, opposed reaches of the series of horizontally disposed upper and lower carrier tapes 210, 213 which convey the blank horizontally and flatwise to the fingers 217. These fingers momentarily stop the blank to get it in timed relation with the machine, and thereafter release said blank which is then carried forwardly by the tapes 210, 213 to the fingers 233. The fingers 233 momentarily stop the blank, and the latter is side registered by the plate 245, with respect to the flap benders 259, 268. Said flap bender then turns up the side sealing flap 19 of the blank angularly with respect to the body thereof, whereupon the fingers 233 release the blank which is then carried forwardly by the tapes 210, 213 to the low speed feed rollers 276, 277. These rollers feed the blanks slowly past the rollers 302, 303 which act to apply adhesive to one side of the bent up side sealing flap 19.

After the side sealing flap 19 of the blank has been glued, said blank is seized by the high speed rollers 372, 373 and fed flatwise and horizontally onto the table 374. The registering devices 383, 416 then act to register the blank longitudinally and sidewise with respect to one of the downwardly moving forms 387, after which said form forces the blank between the rollers 427 so that the panels 8, 9 and 10 of the blank are folded around the form. As the form with the blank thereon continues its downward movement, one of the panel folders 465 engages the panel 7 of the blank and swings said panel downwardly onto the form and in engagement with the glued surface of the side sealing flap 19. A set of the travelling press jaws 508, 509 then embraces the form and carton thereon, pressing the opposite sides of the form and carton so that the panel 7 is securely sealed to the sealing flap 19. The form and press jaws continue to move downwardly, past the flap tuckers 599, 602 which tuck in the flaps 12, 16 of the carton.

After the carton flaps 12, 16 are tucked in by the tuckers 599, 602, the plate 603 acts during continued downward travel of the form and carton, to spread out the carton flaps 14, 18 which then have adhesive applied to them by the glue wheels 613. The form and carton then travel past the rearmost and foremost end flap folder and pressers 679, 682 which successively fold in the flaps 14, 18 of the carton and seal the end thereof on the form 387, as before described. The form, with the bottom sealed carton thereon, then engages the end press belt 701 and rollers 704, which act to press the end sealed carton on the form as the latter travels therepast. While the form and carton are travelling in engagement with the press belt 701 and rollers 704, rollers 713ᵃ engage the opposite sides of the form and carton and the flap folders 714 act to fold out the flaps 13, 17 of the carton against the sides thereof. The form and carton then travel past the fan outlet 710 and the chute 713, at which time the bottom sealed carton is blown off the form into said chute by the fan 708. The bottom sealed carton is then delivered by the chute 713 to a suitable point for subsequent filling, weighing and top sealing thereof. Blanks successively separated from the stack by the separator 141 are, in like manner, acted upon as just described, to successively and continuously produce bottom sealed cartons delivered by the machine one after the other into the chute 713.

It is to be expressly understood that the terms "carton blank" and "carton" employed in the foregoing description and the appended claims, are to be construed broadly enough to cover various forms of blanks and containers other than those herein particularly described and illustrated.

It is further to be expressly understood that while one embodiment of the inventive idea is herein illustrated and described with more or less particularity, the invention is not limited to said embodiment, or otherwise than by the terms of the appended claims.

What is claimed is:

1. In a carton making machine, a plurality of traveling forms, means for feeding carton blanks having side panels and end flaps across the path of travel of said forms, an endless driven element movable in a plane other than the plane of movement of said traveling forms, and a plurality of devices carried by said element and each movable thereon to fold a side panel of a blank on a side of one of said forms.

2. In a carton making machine, a plurality of traveling forms, means for feeding carton blanks having side panels and end flaps across the path of travel of said forms, an endless driven element movable in a plane other than the plane of movement of said traveling forms, a plurality of blank folding devices carried by said element and each movable thereon to fold a side panel of a blank on a side of one of said forms, and means for operating said devices during travel of the same with the endless driven element.

3. In a carton making machine of the type adapted to form cartons by folding a carton blank having side panels and end flaps about a form, an endless driven element independent of the form, a movable side panel folding device mounted thereon and traveling therewith, cam means for moving the side panel folding device in one direction, and spring means for moving said side panel folding device in the opposite direction, the movement of said device folding a carton side panel about the form during travel of said element and device.

4. In a carton making machine, a series of movable forms, means for folding the side panels of carton blanks around said forms including a driven endless element having movement independent of but synchronized with said traveling forms and a plurality of side panel folders pivoted thereon and movable therewith, and means for swinging said side panel folders in opposite directions into and out of engagement with carton side panels folded thereby around said forms.

5. In a carton making machine, a movable form on which a carton is side sealed, an endless driven element arranged adjacent the path of travel of said form independently thereof, and means mounted on and traveling with said element and adapted to press the side sealed portion of the carton on the form.

6. In a carton making machine, a movable form on which a carton is side sealed, an endless driven element arranged adjacent the path of travel of said form independently thereof, and means for pressing the side sealed portion of the carton on the form and comprising a pair of devices mounted on and traveling with said element and adapted to be engaged with and disengaged from the carton and the form.

7. In a carton making machine, a plurality of movable forms on which cartons are side sealed, an endless driven element arranged adjacent the path of travel of the forms independently thereof, and means for pressing the side sealed portions of the cartons on the forms and comprising a plurality of sets of devices mounted on and traveling with said elements and adapted to be engaged with and disengaged from the cartons and the forms.

8. In a carton making machine, a movable form on which a carton is side sealed, an endless driven element arranged adjacent the path of travel of said form independently thereof, means for pressing the side sealed portion of the carton on the form and comprising a pair of devices pivoted on and traveling with said element, means for swinging said devices toward each other to engage them with the carton and the form at opposite sides thereof, and means for swinging the devices away from each other to disengage them from said carton and said form.

9. In a carton making machine, a plurality of traveling forms on which cartons are side sealed, a driven endless element arranged adjacent the path of travel of the form independently thereof, means for pressing side sealed portions of the cartons on the forms and comprising a plurality of pairs of devices movably mounted on and traveling with said endless element, means for moving each pair of devices toward each other to engage the same with a traveling carton and form, and means for moving each pair of devices away from each other to disengage them from a traveling carton and form.

10. In a carton making machine, a movable form on which a carton is side sealed, an endless driven element arranged adjacent the path of travel of said form independently thereof, means mounted on and traveling with the endless driven element and adapted to press a side sealed portion of the carton on the form, and means mounted on and traveling with said elements and adapted to press another portion of the carton on the form.

11. In a carton making machine, a plurality of movable forms on which cartons are side sealed, an endless driven element arranged adjacent the path of travel of the forms independently thereof, means for pressing side sealed portions of the cartons on the forms and comprising a plurality of sets of devices mounted on and traveling with said element and adapted to be engaged with and disengaged from the cartons and the forms, and means for pressing other portions of the cartons on the forms and comprising a plurality of members mounted on the endless driven element and movable into and out of engagement with said cartons and said forms.

12. In a carton making machine, a movable form adapted to carry a side sealed carton, an endless driven element arranged adjacent the path of travel of the form independently thereof, means for clamping the sealed side and an opposite side of the carton on the form and comprising a pair of devices pivoted on the endless driven element and adapted to be engaged with and released from said sides of the carton on the form, a pair of members pivoted on said endless driven element and adapted to swing said devices into and out of engagement with the carton and the form, and means for operating said members.

13. In a carton making machine, a movable form, an endless driven element arranged adjacent the path of travel of said form independently thereof, means for clamping a sealed side and an opposite side of a carton on the form and comprising a pair of devices pivotally mounted on the endless driven element and adapted to be engaged with and disengaged from said sides of the carton on the form, a pair of members pivotally mounted on said endless driven element and adapted to swing said devices into and out of engagement with the carton and the form, rollers mounted on the members, and cams engaging said rollers to operate said members.

14. In a carton making machine, a movable form, an endless driven element arranged adjacent the path of travel of said form independently thereof, means acting on sealed, opposite, and intermediate sides of a carton on the form and comprising a pair of clamping jaws and a pressing device pivotally mounted on said endless driven element and movable into and out of engagement with said sides of the carton on the form, and means for rocking said jaws and said pressing device to engage the same with and disengage the same from said carton and said form.

15. In a carton making machine, a movable form, an endless driven element arranged adjacent the path of travel of the form independently thereof, means acting on a sealed side and an opposite side of a carton on the form and comprising a pair of carton clamping jaws arranged in spaced relation and pivotally mounted on the endless driven element, a carton pressing device pivotally mounted on said endless driven element and extending between said jaws to act on an intermediate side of the carton, and means for rocking the clamping jaws and the pressing plate to engage the same with and disengage the same from said sides of the carton on said form.

16. In a carton making machine, a movable form, an endless driven element arranged adjacent the path of travel of the form independently thereof, means for clamping the sealed side and an opposite side of a carton on the form and comprising a pair of jaws pivoted on the endless driven element, means for pressing an intermediate side of the carton on the form and comprising a plate extending between the jaws and pivotally mounted on said endless driven element, arms pivoted on the endless driven element and adapted to operate said jaws and said plate, and means for swinging said arms to engage the jaws and plate with and disengage the same from said sides of the carton on said form.

17. In a carton making machine, a plurality of movable forms, an endless driven element arranged adjacent the path of travel of the forms independently thereof, a plurality of carton side sealing and clamping jaws pivotally mounted on the endless driven element, and means for swinging said jaws into and out of engagement with cartons side sealed on said forms.

18. In a carton making machine, a plurality of movable forms, an endless driven element arranged adjacent the path of travel of the forms independently thereof, a plurality of sets of carton side sealing and clamping devices pivotally mounted on the endless traveling element, a plurality of carton side pressing devices pivotally mounted on said endless traveling elements, and means for swinging said clamping and pressing devices into and out of engagement with cartons on said forms.

19. In a press mechanism for carton making machines, an endless traveling element, a carton engaging member pivoted on said element and provided with a lug or extension, an arm pivoted on the endless traveling element and adapted to engage said lug or extension, and means for rocking said arm to swing said member.

20. In a press mechanism for carton making machines, an endless traveling element, a pair of carton engaging members pivotally mounted thereon, lugs or extensions formed on or secured to the members, arms pivoted on said endless traveling element and adapted to engage said lugs or extensions, and means for rocking said arms to swing said member.

21. In a press mechanism for carton making machines, an endless traveling element, a carton pressing plate pivoted thereon, an arm pivotally mounted on said endless traveling element and adapted to swing said plate, and means for rocking said arm in opposite directions.

22. In a press mechanism for carton making machines, an endless traveling element, a member pivoted thereon, a lug or extension formed on or secured to the member, an arm pivoted on said endless traveling element and adapted to engage said lug or extension, a roller journaled on the arm, and a cam engaging the roller to rock said arm and swing said member.

23. In a press mechanism for carton making machines an endless traveling element, a member pivoted thereon, an arm for swinging said member, means for rocking said arm, and means for compensating for wear of said rocking means including means for connecting said arm to said member in a plurality of different positions.

24. In a press mechanism for carton making machines, an endless traveling element, a member pivoted thereon and provided with a lug or extension, a device pivotally mounted on said endless traveling element and adapted to engage said lug or extension to swing the pivotally mounted member, means adjustably connecting the device with said member, a roller journaled on the device, and a cam engaging said roller to rock said device and member.

25. In a carton making machine, a movable carton carrying device, and means for tucking or folding in an end flap of a carton on said device, said means comprising a pivotally mounted arm having a yoke at its free end, a roller carrying member pivotally and yieldably mounted on said yoke, and a roller journaled on said member, and means for rocking said pivotally mounted arm and the parts carried thereby.

26. In a carton making machine, a carton carrying device arranged to travel in a closed path and move vertically in a part thereof, means for feeding a blank horizontally to the device for folding thereon into a carton as the device moves vertically, and means for spreading flaps of the carton carried by said device while the latter travels in said path.

27. In a carton making machine, a movable carton carrying device arranged to travel in a closed path and move vertically in a part thereof, means for feeding a carton blank horizontally to the device for folding thereon into a carton as the device moves vertically, and means for folding or tucking in end flaps of a carton carried by said device while the latter moves in said path, said means comprising a stationary flap folder, a pivoted flap folder having a flap engaging roller, and means for rocking said pivoted flap folder.

28. In a carton making machine, a movable carton carrying device arranged to travel in a closed path and move vertically in a part thereof, means for feeding a carton blank horizontally to the device for folding thereon into a carton as the device moves vertically, and means for folding or tucking in end flaps of a carton carried by said device while the latter moves in said path, said means comprising a stationary flap folder, a pivoted arm having a flap engaging roller, means providing for yielding movement of said roller, and means for rocking said pivoted flap folder.

29. In a carton making machine, a movable carton carrying device arranged to travel in a closed path and move vertically in a part thereof, means for feeding a carton blank horizontally to the device for folding thereon into a carton as the device moves vertically, a vertically extending stationary element, means for folding or tucking in end flaps of a carton carried by said device while the latter moves in said path, said means comprising a flap folder on the upper end of the vertically extending stationary element and a swinging arm provided with a flap engaging roller, and means on said stationary element for spreading other end flaps of said carton while the device carrying it moves in said path.

30. In a carton making machine, an endless driven conveyor, a carton carrying device thereon, and means for folding in end flaps of a carton carried by said device, said means comprising a pair of horizontally arranged end flap folders mounted below said conveyor, one in advance of the other, and means for reciprocating said end flap folders forwardly and rearwardly and toward and away from the carton carrying device.

31. In a carton making machine, movable carton carrying means, a movable support, a device on said support adapted to engage one side of a carton on said carrying means, a device on the support for folding an end flap of said carton, and means for moving the support to engage said devices with and disengage the same from said side of the carton and said end flap respectively.

32. In a carton making machine, movable carton carrying means, a movable support, a pair of devices on the movable support successively adapted to engage one side of the carton on the carrying means and fold an end flap of said carton, and means for moving the support to engage said devices with and disengage the same from said side of the carton and said end flap respectively.

33. In a carton making machine, movable carton carrying means, a movable support, a device yieldably mounted on said support and adapted to yieldably engage one side of the carton on said carrying means, a device on the support for folding an end flap of said carton, and means for moving the support to engage said devices with and disengage the same from said side of the carton and said end flap respectively.

34. In a carton making machine, movable carton carrying means, a movable support, a device slidably mounted on the support and adapted to engage one side of the carton on said carrying means, yieldable connections between the support and said device, a device mounted on said support for folding an end flap of said carton, and means for moving the said support to engage said devices with and disengage the same from said side of the carton and said end flap respectively.

35. In a carton making machine, movable carton carrying means, a movable support, a device adapted to engage one side of the carton on said carrying means, a device for folding an end flap of said carton, means removably connecting one of said devices with the support and carrying the other device, and means for moving the support to engage said devices with and disengage the same from said side of the carton and said end flap respectively.

36. In a carton making machine, movable carton carrying means, a movable support, a device adapted to be engaged with and disengaged from one part of a carton on said carrying means, a bolt and wedge block connection between the device and the movable support, and means for moving said support to engage said device with and disengage the same from said part of the carton.

37. In a carton making machine, carton carrying means arranged to travel in a closed path and move vertically in a part thereof, means for feeding a carton blank horizontally to the carton carrying means to be formed thereon into a carton while said carton carrying means travels vertically in one direction in said path, means for sealing one end of a carton on the carrying means, and a device for pressing the sealed end of the carton while its carrying means travel vertically in the opposite direction in said path, said device comprising a vertically extending endless belt.

38. In a carton making machine, carton carrying means arranged to travel in a closed path and move vertically in a part thereof, means for feeding a carton blank horizontally to the carton carrying means to be formed thereon into a carton while said carton carrying means travels vertically in one direction in said path, means for sealing one end of a carton, and means for pressing the sealed end of the carton while its carrying means is traveling vertically in the opposite direction in said path, said pressing means comprising a vertically extending endless belt and a plurality of rollers extending between the reaches thereof.

39. In a carton making machine, movable carton carrying means, means for folding and sealing flaps at one end of a carton carried by said means, and stationary means for spreading and bending back flaps at the other end of said carton and arranged in the path of travel of the movable carton carrying means.

40. In a carton making machine, movable carton carrying means, means for folding and sealing flaps at one end of a carton carried by said means, and a pair of stationary devices at opposite sides of the path of travel of the carton carrying means and adapted to spread and bend back flaps at the other end of said carton as the carton carrying means travels between said stationary devices.

41. In a carton making machine, carton carrying means, devices for folding and sealing flaps at one end of a carton carried by said means, a pair of stationary inclined members arranged at opposite sides of the path of travel of the carrying means and adapted to spread and bend back flaps at the opposite end of said carton, and curved means on corresponding ends of said members and adapted to initially engage the last named flaps.

42. In a carton making machine, means for carrying cartons, means for delivering carton blanks thereto, devices operating on said blanks to form them into cartons on said carrying means, a clutch controlling the operation of the carton carrying means, the blank delivering means, and said carton forming devices, blank controlled means controlling the clutch, and carton controlled means controlling said clutch.

43. In a carton making machine, means for carrying cartons, means for delivering carton blanks thereto, devices operating on the blanks to form them into cartons on said carrying means, a clutch controlling the operation of the carton carrying means, the blank delivering means, and said carton forming devices, a manually operated clutch controlling element, blank operated means controlling the clutch through the manually operated element, and carton controlled means controlling said clutch through said element.

44. In a carton making machine, carton carrying means, devices for transporting and gluing carton blanks delivered to said carrying means, blank folders for forming said blanks into cartons on the carrying means, a clutch controlling the operation of the carton carrying means, the blank transporting and gluing devices, and said blank folders, blank control means controlling the clutch, and carton controlled means controlling said clutch.

45. In a carton making machine, carton carrying means, blank carrying means delivering carton blanks thereto, means for forming the blanks into sealed cartons on said carrying means, a clutch controlling the operation of the carton and blank carrying means and said forming means, blank controlled means controlling the clutch, and carton controlled means controlling said clutch.

46. In a carton making machine, a plurality of carton carrying members movable in a closed path, means for forming carton blanks into cartons on said members, a conduit past which said members travel and into which the completed cartons are delivered from said members, a clutch controlling the operation of said machine, a movable carton controlled member arranged adjacent the entrance of said conduit, and clutch operating means connected with said carton controlled member and controlled thereby.

47. In a carton making machine, a plurality of carton carrying members movable in a closed path, means for forming carton blanks into cartons on said members, a conduit past which said members travel and into which the completed cartons are delivered from said members, a clutch controlling the operation of said machine, a pivoted member forming part of said conduit and adapted to be moved when a carton is improperly delivered to or carried past the same, and clutch operating means connected with said pivoted member and controlled thereby.

48. In a carton making machine, carton carrying means, a conduit adjacent thereto, means for transferring cartons from the carrying means into said conduit, a clutch controlling the operation of the carton carrying means, a member movable by a carton upon failure of transfer of the same into the conduit, and means connected with said member and controlling the operation of said clutch.

49. In a carton making machine, mechanism for operating the same, a clutch controlling the operation of said mechanism, a movable clutch controlling member, a pivoted element adapted on swinging movement thereof, to operate the clutch controlling member, a detent normally preventing swinging movement of the pivoted element, means for releasing the detent from said pivoted element, said means being operable from a plurality of different stations of said machine, and means for swinging said element when said detent is released therefrom.

50. In a carton making machine, mechanism for operating the same, a clutch controlling the operation of said mechanism, a movable clutch controlling member having an abutment thereon, a pivoted element having a fork or the like extending over the clutch controlling member and adapted to engage said abutment, a device normally preventing movement of said pivoted element and adapted to be engaged therewith and released therefrom, means for releasing said device from engagement with said element, said means being operable from a plurality of different stations of said machine, and means for swinging the pivoted element when said device is released therefrom whereby said fork engages said abutment and operates said movable clutch controlling member.

51. In a carton making machine, mechanism for operating the same, a clutch controlling the operation of said mechanism, clutch controlling devices including a normally stationary pivoted element provided with a notch and having an arcuate shaped support, a member normally engaging said notch and adapted, when released therefrom, to rest on said arcuate shaped support, means operable from a plurality of different stations of said machine for releasing said member from said notch, and means for thereafter swinging said pivoted element to operate said clutch controlling device.

52. In a carton making machine, mechanism for operating the same, a clutch controlling the operation of said mechanism, clutch controlling devices including a movable clutch operating member and a pivoted element adapted on swinging movement thereof, to operate said member, a detent normally engaging the pivoted element to prevent swinging movement thereof, means operable from a plurality of different stations of said machine for releasing the detent from the pivoted element, and a spring for thereafter swinging said pivoted element.

53. In a carton making machine, means from which carton blanks are delivered in succession thereto, mechanism controlling the operation of said means and including a clutch, a pivotally mounted member having a cam, and manually operated means for swinging said member to engage said cam with the clutch and disconnect the parts thereof.

54. In a carton making machine, means from which carton blanks are delivered in succession thereto, mechanism controlling the operation of said means and including a clutch, a pivoted yoke, and devices controlled by said yoke and automatically connecting and disconnecting the parts of the clutch, a member pivoted on said yoke and provided with a cam, and manually operated means for swinging said member to engage said cam with the clutch and disconnect the parts thereof.

55. In a carton making machine, means from which carton blanks are delivered in succession thereto, a clutch controlling the operation of said means, mechanism for automatically connecting and disconnecting the parts of said clutch and including a pivotally mounted yoke, and means for manually disconnecting the parts of said clutch and comprising a cam pivotally mounted on said yoke, and a member for swinging said cam into and out of engagement with the clutch.

56. In a carton making machine of the type embodying carton carrying means movable vertically and horizontally along a closed path, means for spreading flaps of cartons on the carton carrying means, and means for applying adhesive to said flaps while the carton carrying means is traveling vertically in said path, said last named means comprising a pair of glue wheels extending in vertical planes and past which the cartons move vertically, a pair of horizontally pivoted arms depending from the machine framework, and rollers on said arms for pressing the flaps against said glue wheels.

57. In a carton making machine of the type embodying carton carrying means movable vertically and horizontally along a closed path, means for spreading flaps of cartons on the carton carrying means, and means for applying adhesive to said flaps while the carton carrying means is traveling vertically in said path, said last named means comprising a pair of glue wheels extending in vertical planes and past which the cartons move vertically, a pair of horizontally pivoted arms depending from the machine framework, grooved horizontally extending rollers mounted on said arms and adapted to press the flaps against said glue wheels, and springs connected with the arms to urge the latter and the grooved rollers toward the glue wheels.

58. In a carton making machine of the type adapted to form cartons by folding a carton blank having side panels and end flaps about a traveling form, an endless driven element movable in a plane other than the plane of movement of said traveling form, a folder support secured to said element, a folder arm pivotally mounted on said support and adapted to fold a side panel of the blank on one side of the form, a fixed cam mounted adjacent the path of movement of said support and folder arm, and means operatively associated with said folder arm and coacting with said cam for moving said arm about its pivot and into folding engagement with said side panel during travel of said arm with said endless element.

59. In a carton making machine of the type adapted to form cartons by folding a carton blank having side panels and end flaps about a traveling form, an endless driven element movable in a plane other than the plane of movement of said traveling form, a folder support secured to said element, a folder arm pivotally mounted on said support and adapted to fold a side panel of the blank on one side of the form, a fixed cam mounted adjacent to and with its plane parallel to the plane of the path of movement of said support and folder arm, and a cam follower member operatively associated with said folder arm and coacting with said cam for moving said arm about its pivot and into folding engagement with said side panel during travel of said arm with said endless element.

60. In a carton making machine of the type adapted to form cartons by folding a carton blank having side panels and end flaps about a traveling form, an endless driven element movable in a plane other than the plane of movement of said traveling form, a folder support secured to said element, a folder arm pivotally mounted on said support and adapted to fold a side panel of the blank on one side of the form, a fixed cam mounted adjacent the path of movement of said support and folder arm, a second arm pivotally mounted on said support and carrying a cam follower member adapted to coact with said cam, and means for transmitting the cam actuated movements of said second arm to said folder arm whereby the latter is moved into folding engagement with said side panel during travel of said arm with said endless element.

61. In a carton making machine of the type adapted to form cartons by folding a carton blank having side panels and end flaps about a traveling form, an endless driven element movable in a plane other than the plane of movement of said traveling form, a folder support secured to said element, a folder arm pivotally mounted on said support and adapted to fold a side panel of the blank on one side of the form, a fixed cam mounted adjacent the path of movement of said support and folder arm, a second arm pivotally mounted on said support and carrying a cam follower member adapted to coact with said cam, and a yieldable connection between said second arm and said folder arm for transmitting the cam actuated movements of the former to the latter whereby the latter is moved into folding engagement with said side panel during travel of said arm with said endless element.

62. In a carton making machine of the type adapted to form cartons by folding a carton blank having side panels and end flaps about a traveling form, an endless driven element movable in a plane other than the plane of movement of said traveling form, a folder support secured to said element, a folder arm pivotally mounted on said support and adapted to fold a side panel of the blank on one side of the form, a fixed cam mounted adjacent to and with its plane parallel to the plane of the path of movement of said support and folder arm, a second arm pivotally mounted on said support and carrying a cam follower member adapted to coact with said cam, and an adjustable connection between said second arm and said folder arm for transmitting the cam actuated movements of the former to the latter whereby the latter is moved into folding engagement with said side panel during travel of said arm with said endless element.

CHARLES F. RICHARD.